(12) United States Patent
Cieplinski et al.

(10) Patent No.: US 11,972,043 B2
(45) Date of Patent: Apr. 30, 2024

(54) USER DETECTION BY A COMPUTING DEVICE

(71) Applicant: Apple Inc., Cupertino, CA (US)

(72) Inventors: Avi E. Cieplinski, San Francisco, CA (US); Jeffrey Traer Bernstein, San Francisco, CA (US); Julian Missig, Burlingame, CA (US); May-Li Khoe, San Francisco, CA (US); Bianca Cheng Costanzo, Malmö (SE); Myra Mary Haggerty, San Mateo, CA (US); Duncan Robert Kerr, San Francisco, CA (US); Bas Ording, San Francisco, CA (US); Elbert D. Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/816,314

(22) Filed: Jul. 29, 2022

(65) Prior Publication Data

US 2022/0365595 A1 Nov. 17, 2022

Related U.S. Application Data

(63) Continuation of application No. 17/123,000, filed on Dec. 15, 2020, now Pat. No. 11,556,171, which is a
(Continued)

(51) Int. Cl.
*G06F 3/01* (2006.01)
*G06F 3/0485* (2022.01)
(Continued)

(52) U.S. Cl.
CPC ............ *G06F 3/013* (2013.01); *G06F 3/0485* (2013.01); *G06F 3/1423* (2013.01);
(Continued)

(58) Field of Classification Search
CPC ....... G06F 3/01–013; G06F 3/14–1462; G06F 3/048–04812; G06F 3/04817;
(Continued)

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |

(Continued)

FOREIGN PATENT DOCUMENTS

| | | | |
|---|---|---|---|
| EP | 0816983 | A2 | 1/1998 |
| EP | 1530115 | A2 | 5/2005 |

(Continued)

OTHER PUBLICATIONS

Final Office Action received for U.S. Appl. No. 14/531,874, dated Nov. 4, 2016, 10 pages.
(Continued)

*Primary Examiner* — Nathan Danielsen
(74) *Attorney, Agent, or Firm* — Kubota & Basol LLP

(57) ABSTRACT

In some embodiments, an electronic device optionally identifies a person's face, and optionally performs an action in accordance with the identification. In some embodiments, an electronic device optionally determines a gaze location in a user interface, and optionally performs an action in accordance with the determination. In some embodiments, an electronic device optionally designates a user as being present at a sound-playback device in accordance with a determination that sound-detection criteria and verification criteria have been satisfied. In some embodiments, an electronic device optionally determines whether a person is further or closer than a threshold distance from a display device, and optionally provides a first or second user interface for display on the display device in accordance with the determination. In some embodiments, an electronic device
(Continued)

optionally modifies the playing of media content in accordance with a determination that one or more presence criteria are not satisfied.

13 Claims, 36 Drawing Sheets

Related U.S. Application Data continuation of application No. 16/881,599, filed on May 22, 2020, now Pat. No. 11,307,657, which is a continuation of application No. 15/644,639, filed on Jul. 7, 2017, now Pat. No. 10,664,048, which is a continuation of application No. 14/531,874, filed on Nov. 3, 2014, now Pat. No. 9,766,702.

(60) Provisional application No. 62/014,541, filed on Jun. 19, 2014.

(51) Int. Cl.
  *G06F 3/14* (2006.01)
  *H04N 21/41* (2011.01)
  *H04N 21/422* (2011.01)
  *H04N 21/442* (2011.01)
  *H04N 21/45* (2011.01)
  *H04N 21/485* (2011.01)
  *H04L 67/10* (2022.01)

(52) U.S. Cl.
  CPC ... *H04N 21/4126* (2013.01); *H04N 21/41265* (2020.08); *H04N 21/422* (2013.01); *H04N 21/42201* (2013.01); *H04N 21/42203* (2013.01); *H04N 21/44218* (2013.01); *H04N 21/4532* (2013.01); *H04N 21/485* (2013.01); *H04N 21/4852* (2013.01); *H04L 67/10* (2013.01)

(58) Field of Classification Search
  CPC ..... G06F 3/0482; G06F 3/0484–04842; G06F 3/04847–04855; G06F 2203/04801; G06F 2203/04804; G06F 2203/04806; H04L 67/10; H04L 67/24; H04N 21/4126; H04N 21/41265; H04N 21/422–42203; H04N 21/42218; H04N 21/4532; H04N 21/485; H04N 21/4852; G06V 40/16–173; G06V 40/179
  See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,078,310 A | 6/2000 | Tognazzini | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,134,130 B1 | 11/2006 | Thomas | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,706,579 B2 | 4/2010 | Oijer | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,341,541 B2 | 12/2012 | Holecek et al. | |
| 8,381,135 B2 | 2/2013 | Hotelling et al. | |
| 8,479,122 B2 | 7/2013 | Hotelling et al. | |
| 8,593,558 B2 | 11/2013 | Gardiner et al. | |
| 8,724,856 B1* | 5/2014 | King | H04W 12/065 340/5.82 |
| 8,793,729 B2* | 7/2014 | Adimatyam | H04N 21/4755 725/40 |
| 8,896,632 B2 | 11/2014 | Macdougall et al. | |
| 9,189,611 B2* | 11/2015 | Wässingbo | H04N 21/4532 |
| 9,348,458 B2 | 5/2016 | Hotelling et al. | |
| 9,619,519 B1 | 4/2017 | Dorner | |
| 9,829,708 B1 | 11/2017 | Asada | |
| 9,933,937 B2 | 4/2018 | Lemay et al. | |
| 10,565,448 B2 | 2/2020 | Bell et al. | |
| 10,678,403 B2 | 6/2020 | Duarte et al. | |
| 10,732,721 B1 | 8/2020 | Clements | |
| 11,720,171 B2 | 8/2023 | Pastrana Vicente et al. | |
| 2002/0015024 A1 | 2/2002 | Westerman et al. | |
| 2002/0065778 A1 | 5/2002 | Bouet et al. | |
| 2003/0038754 A1 | 2/2003 | Goldstein et al. | |
| 2004/0104806 A1 | 6/2004 | Yui et al. | |
| 2005/0044510 A1* | 2/2005 | Yi | G06F 1/1684 345/169 |
| 2005/0175218 A1 | 8/2005 | Vertegaal et al. | |
| 2005/0190059 A1 | 9/2005 | Wehrenberg | |
| 2006/0017692 A1 | 1/2006 | Wehrenberg et al. | |
| 2006/0028400 A1 | 2/2006 | Lapstun et al. | |
| 2006/0033724 A1 | 2/2006 | Chaudhri et al. | |
| 2006/0197753 A1 | 9/2006 | Hotelling | |
| 2006/0256083 A1 | 11/2006 | Rosenberg | |
| 2007/0259716 A1 | 11/2007 | Mattice et al. | |
| 2008/0181502 A1* | 7/2008 | Yang | G06V 10/242 382/181 |
| 2009/0146779 A1 | 6/2009 | Kumar et al. | |
| 2010/0177049 A1 | 7/2010 | Levy et al. | |
| 2010/0269145 A1* | 10/2010 | Ingrassia | H04H 60/74 455/142 |
| 2011/0098029 A1 | 4/2011 | Rhoads et al. | |
| 2011/0156879 A1 | 6/2011 | Matsushita et al. | |
| 2011/0175932 A1 | 7/2011 | Yu et al. | |
| 2012/0066638 A1 | 3/2012 | Ohri | |
| 2012/0075496 A1* | 3/2012 | Akifusa | G06T 5/50 348/222.1 |
| 2012/0124525 A1 | 5/2012 | Kang | |
| 2012/0131631 A1 | 5/2012 | Bhogal et al. | |
| 2012/0184372 A1 | 7/2012 | Laarakkers et al. | |
| 2013/0027860 A1* | 1/2013 | Masaki | G06F 3/147 361/679.01 |
| 2013/0190044 A1 | 7/2013 | Kulas | |
| 2013/0293456 A1 | 11/2013 | Son et al. | |
| 2013/0300648 A1 | 11/2013 | Kim et al. | |
| 2013/0300654 A1 | 11/2013 | Seki | |
| 2014/0049462 A1 | 2/2014 | Weinberger et al. | |
| 2014/0068692 A1 | 3/2014 | Archibong et al. | |
| 2014/0126782 A1* | 5/2014 | Takai | G06F 3/04842 382/116 |
| 2014/0139426 A1 | 5/2014 | Kryze et al. | |
| 2014/0168453 A1 | 6/2014 | Shoemake et al. | |
| 2014/0247210 A1 | 9/2014 | Henderek et al. | |
| 2014/0268054 A1 | 9/2014 | Olsson et al. | |
| 2014/0304612 A1 | 10/2014 | Collin | |
| 2015/0009118 A1 | 1/2015 | Thomas et al. | |
| 2015/0077335 A1 | 3/2015 | Taguchi et al. | |
| 2015/0082180 A1 | 3/2015 | Ames et al. | |
| 2015/0095844 A1 | 4/2015 | Cho et al. | |
| 2015/0128075 A1 | 5/2015 | Kempinski | |
| 2015/0212576 A1 | 7/2015 | Ambrus et al. | |
| 2015/0331240 A1 | 11/2015 | Poulos et al. | |
| 2015/0370323 A1 | 12/2015 | Cieplinski et al. | |
| 2016/0026243 A1 | 1/2016 | Bertram et al. | |
| 2016/0357266 A1 | 12/2016 | Patel et al. | |
| 2017/0236332 A1 | 8/2017 | Kipman et al. | |

(56) References Cited

U.S. PATENT DOCUMENTS

| | | |
|---|---|---|
| 2017/0308163 A1 | 10/2017 | Cieplinski et al. |
| 2018/0157332 A1 | 6/2018 | Nie |
| 2019/0018498 A1 | 1/2019 | West et al. |
| 2019/0279407 A1 | 9/2019 | Mchugh et al. |
| 2019/0332244 A1 | 10/2019 | Beszteri et al. |
| 2019/0362557 A1 | 11/2019 | Lacey et al. |
| 2020/0026349 A1 | 1/2020 | Fontanel et al. |
| 2020/0225746 A1 | 7/2020 | Bar-zeev et al. |
| 2020/0285314 A1 | 9/2020 | Cieplinski et al. |
| 2020/0371673 A1 | 11/2020 | Faulkner |
| 2021/0103333 A1 | 4/2021 | Cieplinski et al. |
| 2021/0303107 A1 | 9/2021 | Pla I Conesa et al. |
| 2022/0100270 A1 | 3/2022 | Pastrana Vicente et al. |
| 2023/0152889 A1 | 5/2023 | Cieplinski et al. |
| 2023/0259265 A1 | 8/2023 | Krivoruchko et al. |
| 2023/0333646 A1 | 10/2023 | Pastrana Vicente et al. |

FOREIGN PATENT DOCUMENTS

| | | |
|---|---|---|
| EP | 2551763 A1 | 1/2013 |
| EP | 3249497 A1 | 11/2017 |
| JP | H6-4596 A | 1/1994 |
| JP | 2000-163031 A | 6/2000 |
| JP | 2002-342033 A | 11/2002 |
| JP | 2006-107048 A | 4/2006 |
| JP | 2006-295236 A | 10/2006 |
| JP | 2011-203880 A | 10/2011 |
| JP | 2014-21565 A | 2/2014 |
| JP | 2014-59840 A | 4/2014 |
| JP | 2014-99184 A | 5/2014 |
| JP | 2015-56173 A | 3/2015 |
| JP | 2016-96513 A | 5/2016 |
| JP | 2018-41477 A | 3/2018 |
| JP | 2019-40333 A | 3/2019 |
| JP | 2019-175449 A | 10/2019 |
| JP | 2019-536131 A | 12/2019 |
| WO | 2011/008638 A1 | 1/2011 |
| WO | 2013/169849 A2 | 11/2013 |
| WO | 2014/105276 A1 | 7/2014 |
| WO | 2014/203301 A1 | 12/2014 |
| WO | 2015/195216 A1 | 12/2015 |
| WO | 2018/046957 A2 | 3/2018 |

OTHER PUBLICATIONS

Final Office Action received for U.S. Appl. No. 15/644,639, dated Sep. 19, 2019, 12 pages.
International Search Report received for PCT Patent Application No. PCT/US2015/029727, dated Nov. 2, 2015, 6 pages.
International Search Report received for PCT Patent Application No. PCT/US2021/022413, dated Aug. 13, 2021, 7 pages.
Letter Restarting Period for Response received for U.S. Appl. No. 15/644,639, mailed on Sep. 28, 2018, 8 pages.
Non-Final Office Action received for U.S. Appl. No. 14/531,874, dated May 18, 2016, 11 pages.
Non-Final Office Action received for U.S. Appl. No. 15/644,639, dated Apr. 12, 2019, 11 pages.
Non-Final Office Action received for U.S. Appl. No. 15/644,639, dated Sep. 10, 2018, 9 pages.
Non-Final Office Action received for U.S. Appl. No. 16/881,599, dated Apr. 28, 2021, 8 pages.
Non-Final Office Action received for U.S. Appl. No. 17/123,000, dated Nov. 12, 2021, 8 pages.
Notice of Allowance received for U.S. Appl. No. 14/531,874, dated Mar. 28, 2017, 9 pages.
Notice of Allowance received for U.S. Appl. No. 15/644,639, dated Jan. 16, 2020, 16 pages.
Notice of Allowance received for U.S. Appl. No. 16/881,599, dated Dec. 17, 2021, 7 pages.
Notice of Allowance received for U.S. Appl. No. 17/123,000, dated May 27, 2022, 8 Pages.
Supplemental Notice of Allowance received for U.S. Appl. No. 14/531,874, dated Jul. 26, 2017, 5 pages.
Bohn, Dieter, "Rebooting WebOS: How LG Rethought The Smart TV", The Verge, Available online at: <http://www.theverge.com/2014/1/6/5279220/rebooting-webos-how-lg-rethought-the-smart-tv>, Jan. 6, 2014, 5 pages.
Fatima et al., "Eye Movement Based Human Computer Interaction", 3rd International Conference on Recent Advances In Information Technology (RAIT), Mar. 3, 2016, pp. 489-494.
Grey, Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Non-Final Office Action received for U.S. Appl. No. 17/202,034, dated Jul. 20, 2022, 38 Pages.
International Search Report received for PCT Patent Application No. PCT/US2021/071518, dated Feb. 25, 2022, 7 pages.
Non-Final Office Action received for U.S. Appl. No. 17/479,791, dated May 11, 2022, 18 pages.
Notice of Allowance received for U.S. Appl. No. 17/123,000, dated Sep. 19, 2022, 7 pages.
Notice of Allowance received for U.S. Appl. No. 17/479,791, dated Nov. 17, 2022, 9 pages.
Corrected Notice of Allowability received for U.S. Appl. No. 17/479,791, dated May 19, 2023, 2 pages.
Final Office Action received for U.S. Appl. No. 17/202,034, dated May 4, 2023, 41 pages.
Notice of Allowance received for U.S. Appl. No. 17/479,791, dated Mar. 13, 2023, 9 pages.
International Search Report received for PCT Application No. PCT/US2023/060052, dated May 24, 2023, 6 pages.
WISD81, Simple Modal Window With Background Blur Effect, Available online at: <http://web.archive.org/web/20160313233427/https://www.cssscript.com/simple-modal-window-with-background-blur-effect/ , Mar. 13, 2016, 5 pages.
Yamada, Yoshihiro, "How to generate a modal window with ModalPopup control", Available online at: <http://web.archive.org/web/20210920015801/https://atmarkit.itmedia.co.jp/fdotnet/dotnettips/580aspajaxmodalpopup/aspajaxmodalpopup.html , Sep. 20, 2021, 7 pages (official copy only). See attached Communication 37 CFR § 1.98(a)(3).

* cited by examiner

1300

1302 — Determine whether a person is further than a threshold distance from a display device or closer than the threshold distance from the display device

1304 / 1306 — Determining whether the person is further than the threshold distance from the display device or closer than the threshold distance from the display device is based on information received from one or more optical sensors

1308 — In accordance with a determination that the person is further than the threshold distance from the display device, provide a first user interface for display on the display device

1310 — The first user interface includes a user interface element at a first size

1312 — The first user interface includes summary information about a first quantity

1314 — The first user interface includes a first set of user interface elements

1316 — In accordance with a determination that the person is closer than the threshold distance from the display device, provide a second user interface for display on the display device

1318 — The second user interface is different than the first user interface

1320 — The second user interface includes the user interface element at a second size, smaller than the first size

1322 — The second user interface includes detailed information about the first quantity The second user interface includes the first set of user interface elements and a second set of user interface elements

FIG. 13A (A)

USER DETECTION BY A COMPUTING DEVICE

CROSS REFERENCE TO RELATED APPLICATIONS

This application is a continuation of U.S. application Ser. No. 17/123,000, filed Dec. 15, 2020 and published on Apr. 8, 2021 as U.S. Publication No. 2021-0103333, which is a continuation of U.S. application Ser. No. 16/881,599, filed May 22, 2020 and issued on Apr. 19, 2022 as U.S. Pat. No. 11,307,657, which is a continuation of U.S. application Ser. No. 15/644,639, filed on Jul. 7, 2017 and issued on May 26, 2020 as U.S. Pat. No. 10,664,048, which is a continuation of U.S. application Ser. No. 14/531,874, filed on Nov. 3, 2014 and issued on Sep. 19, 2017 as U.S. Pat. No. 9,766,702, which claims priority to U.S. Provisional Application No. 62/014,541, filed on Jun. 19, 2014, which are hereby incorporated herein by reference in their entireties for all purposes.

FIELD OF THE DISCLOSURE

This relates generally to electronic devices that are capable of detecting one or more attributes relating to user presence at a device.

BACKGROUND OF THE DISCLOSURE

User interaction with devices such as computers and other electronic computing devices has increased significantly in recent years. These devices can be devices such as computers, tablets, televisions, multimedia devices, and the like.

Interaction with such devices can be performed using various input devices, such as touch screen displays, touch-sensitive surfaces, remote controls, mice and other input devices. However, there are instances where user interaction with the computing devices would be enhanced if the user were not required to physically provide input to the computing devices, but rather if the computing devices were to take certain actions autonomously based on user detection. This latter consideration is particularly important where input devices are battery-operated.

SUMMARY OF THE DISCLOSURE

The embodiments described in this disclosure are directed to one or more devices that optionally perform facial identification, gaze determination, audio-based presence detection, distance determination, and presence determination with respect to one or more users of the devices, and one or more actions that the devices optionally perform in response to the above. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 13A-13D are flow diagrams illustrating a method of providing different user interfaces at different distances in accordance with some embodiments.

DETAILED DESCRIPTION

Figure 1A:
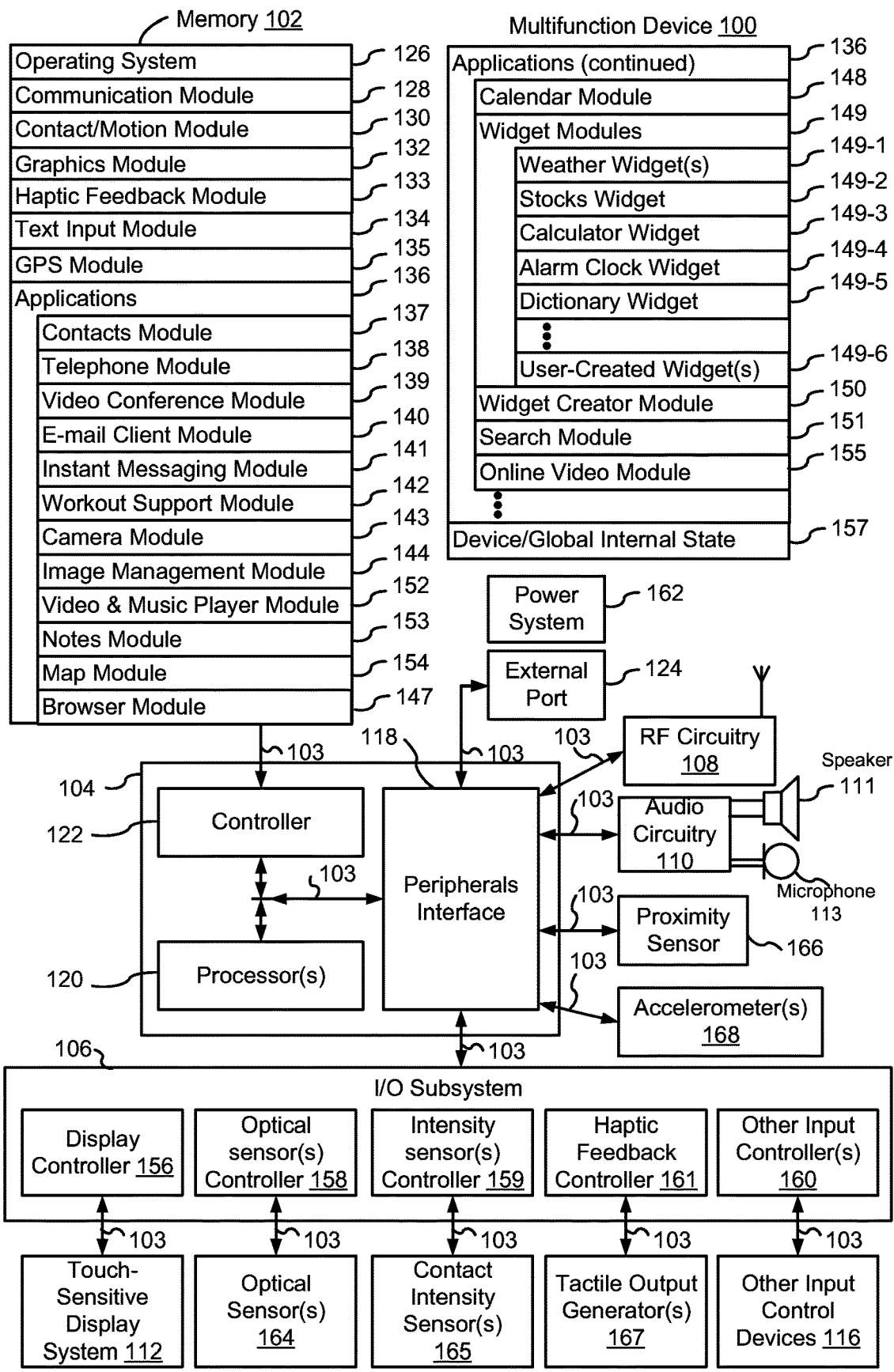
FIG. 1A is a block diagram illustrating a multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
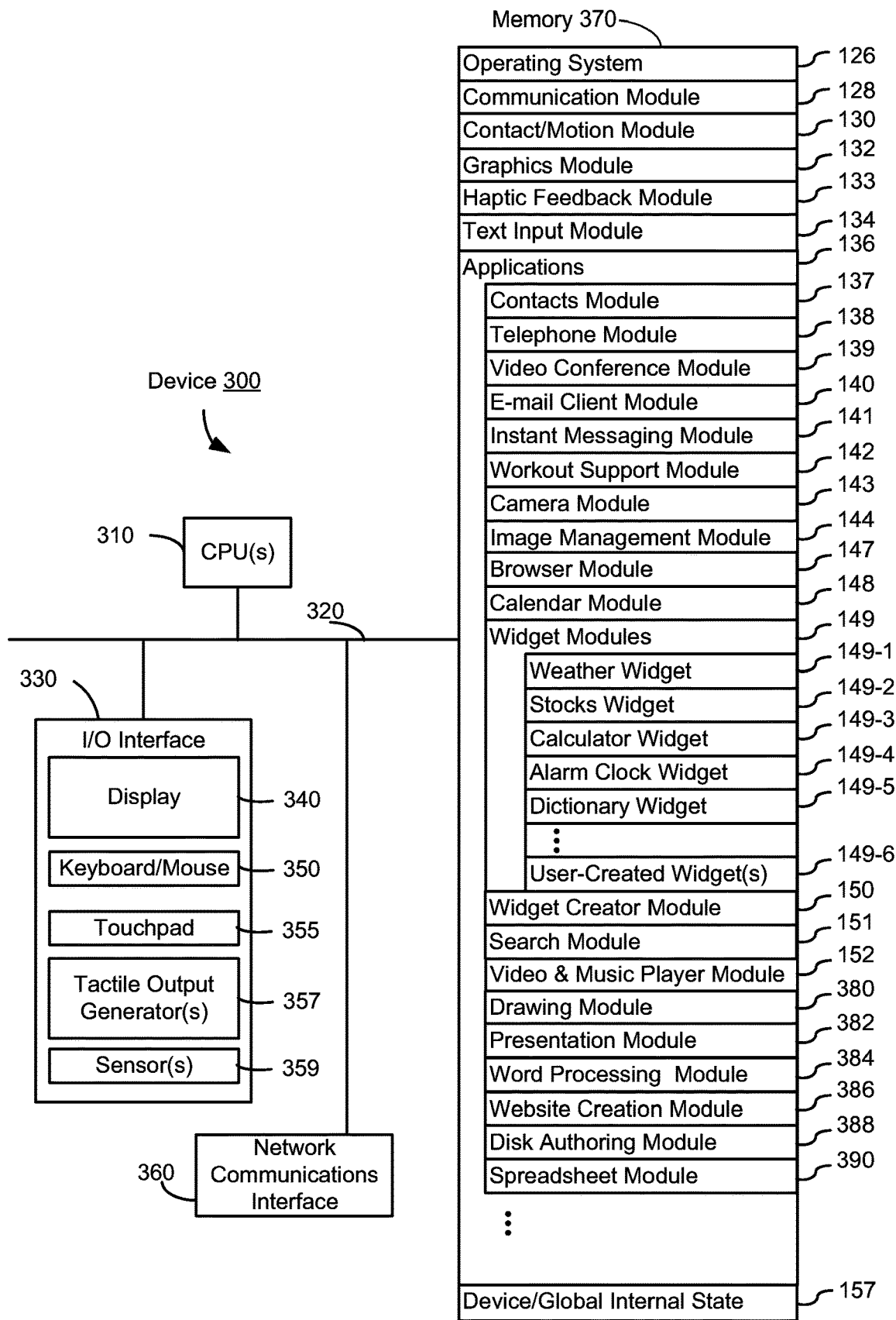
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154;
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
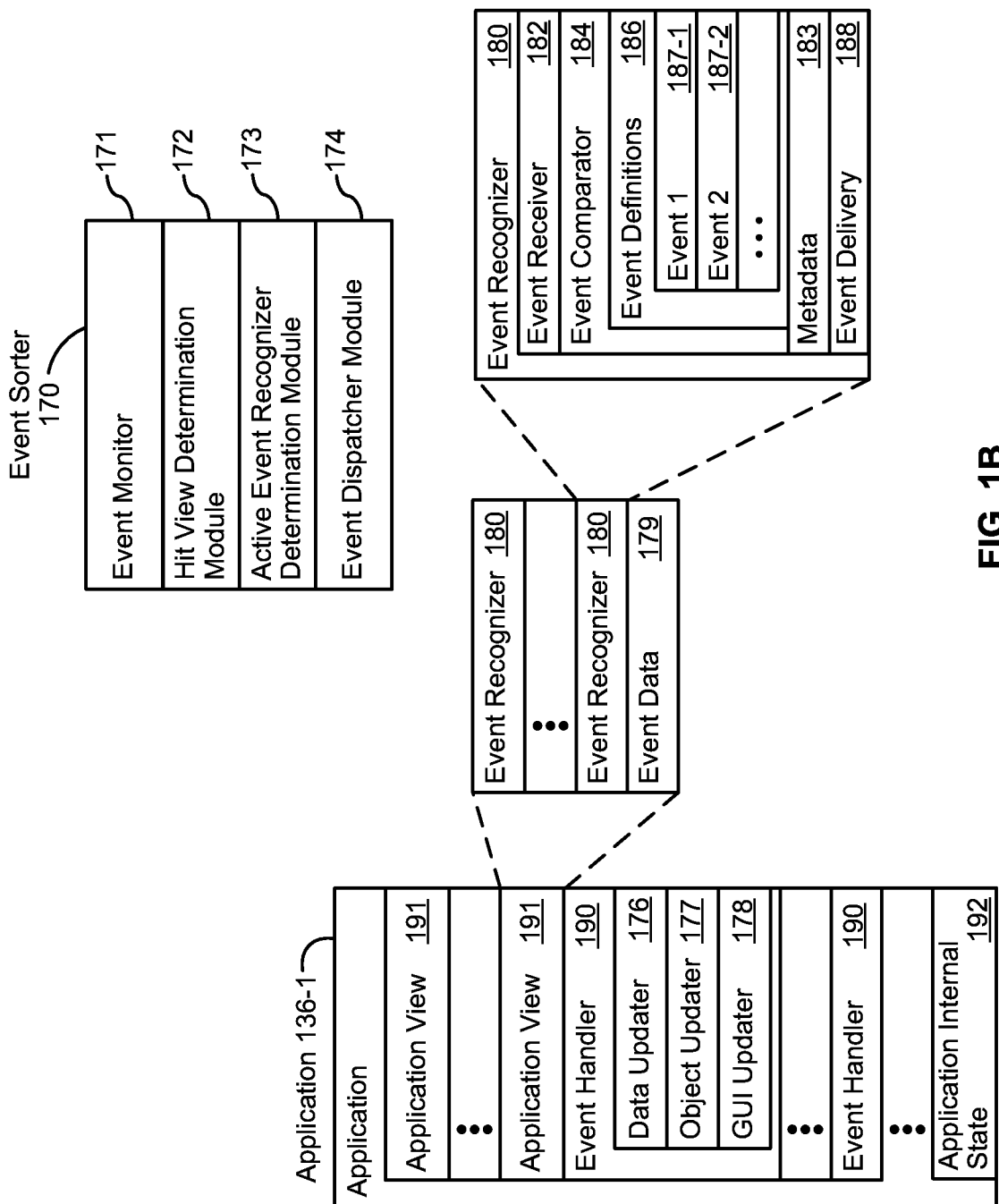
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
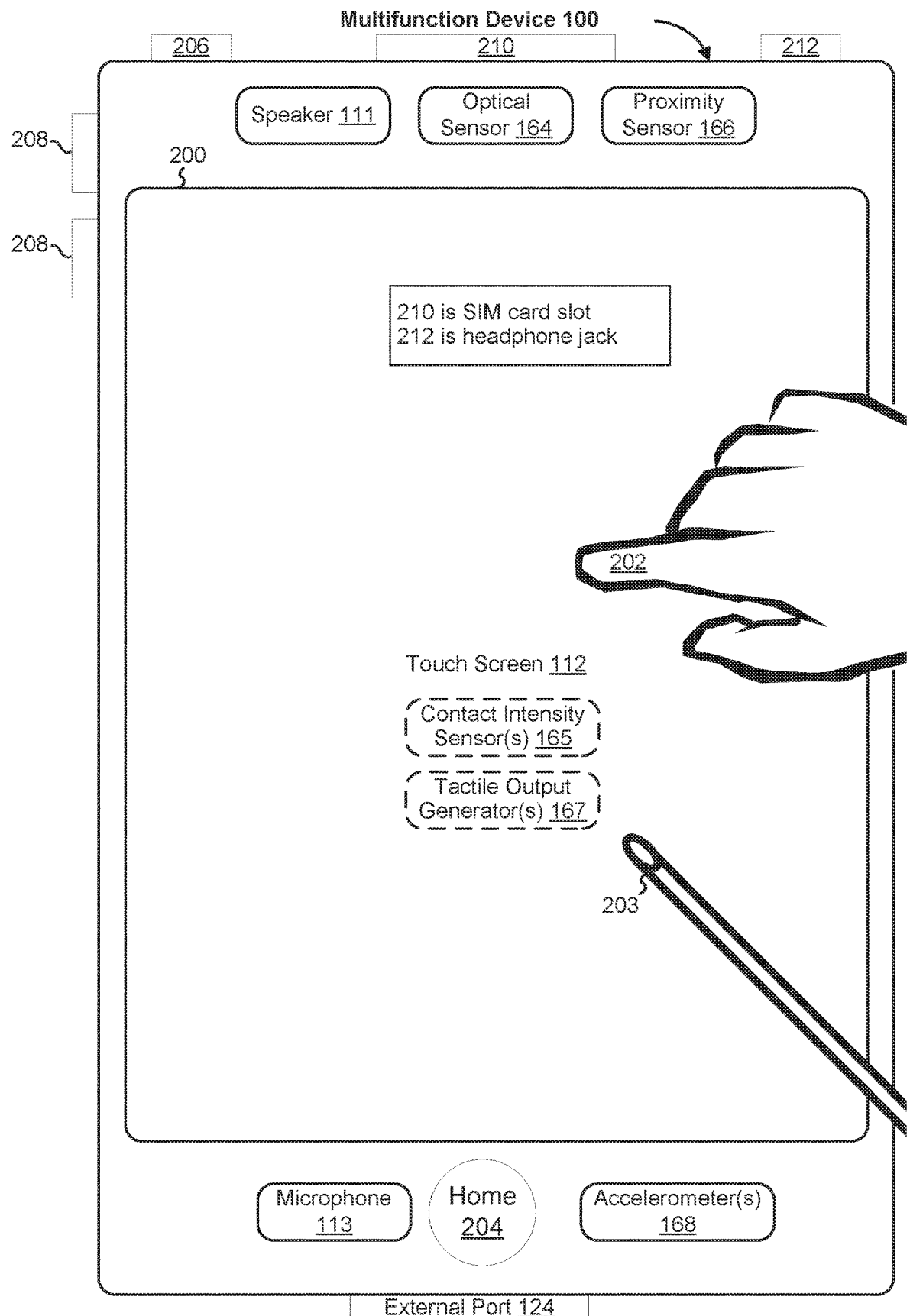
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
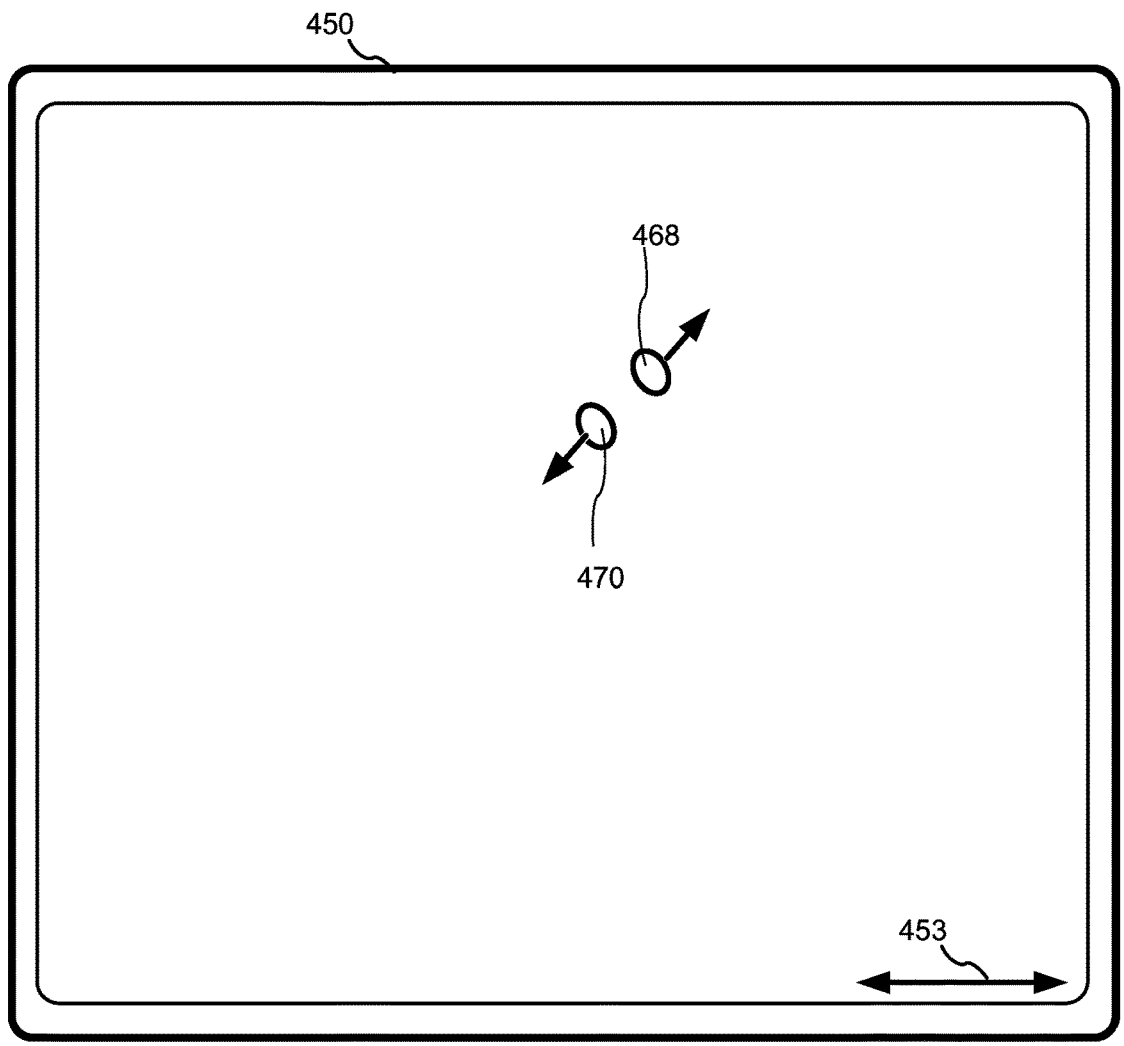
FIG. 4 illustrates an exemplary user interface for a multifunction device with a touch-sensitive surface that is separate from the display in accordance with some embodiments.
Figure 4:
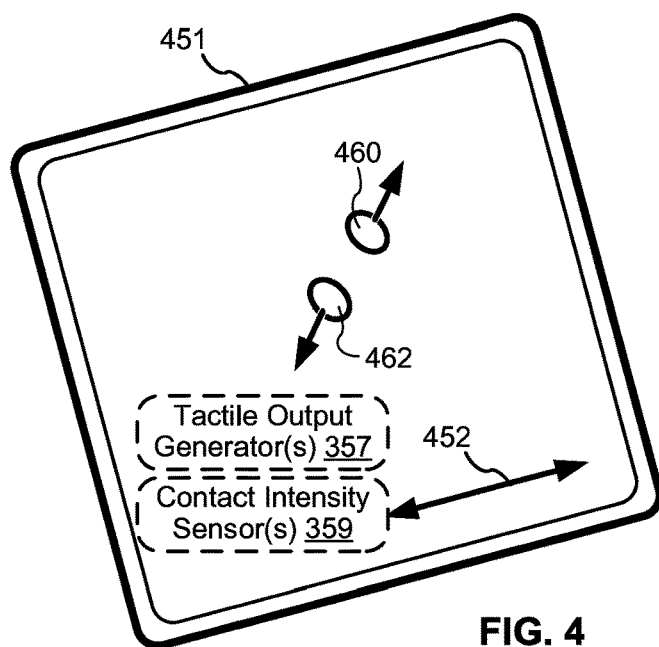

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
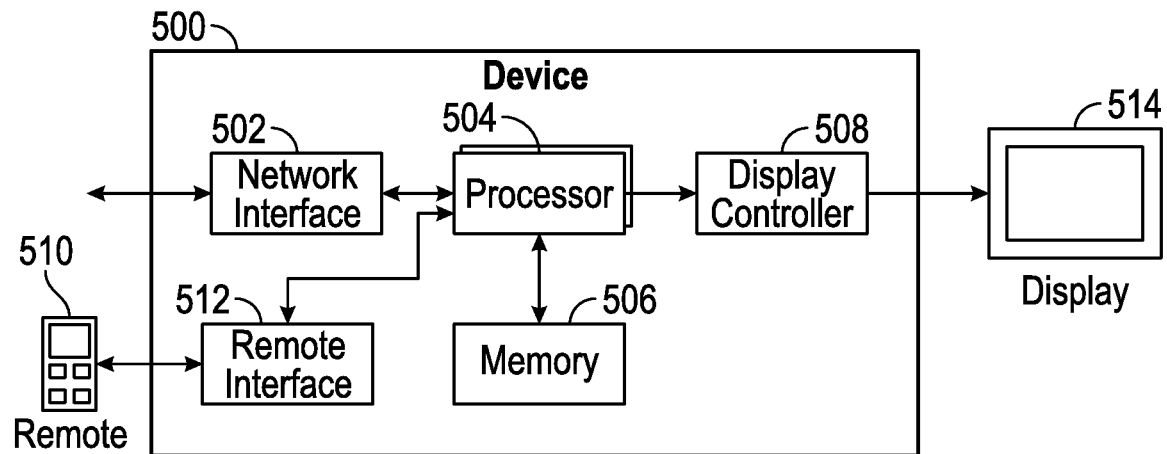
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, and/or 1500).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

User Interfaces and Associated Processes

Facial Identification

People interact with electronic devices in many ways, such as running applications and performing various tasks. These interactions can be enhanced by identifying the faces of the people interacting with the devices and performing various actions in accordance with the identifications—in some cases, without requiring additional input from the people. The embodiments described below provide ways to enhance the above interactions. Enhancing interactions with a device reduces the amount of time needed by a person to perform operations, and thus reduces the power usage of the device and increases battery life for battery-powered devices.

FIGS. 6A-6D illustrate exemplary ways in which interactions with electronic devices are enhanced based on facial identification in accordance with some embodiments of the disclosure. The embodiments in these figures are used to illustrate the processes described below, including the processes described with reference to FIGS. 7A-7E.

Figure 6A:
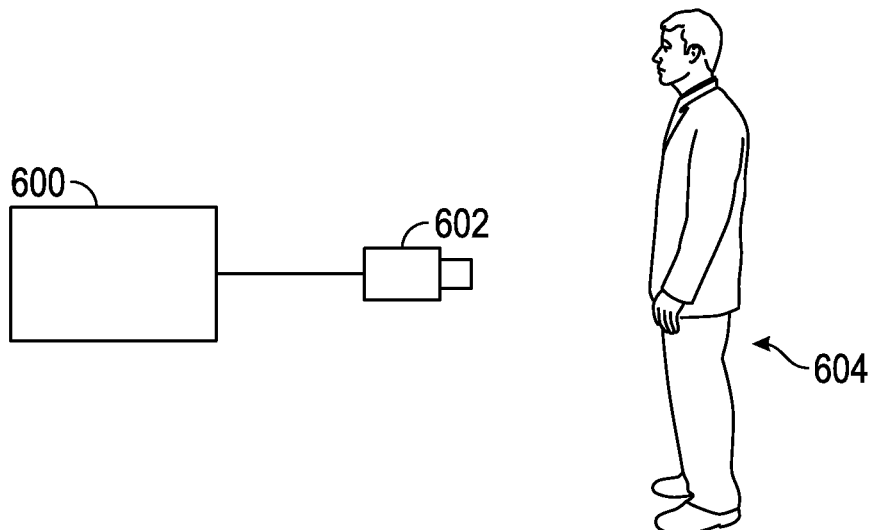
FIGS. 6A-6D illustrate exemplary ways in which interactions with electronic devices are enhanced based on facial identification in accordance with some embodiments of the disclosure.

FIG. 6A illustrates an exemplary use configuration for electronic device 600 according to embodiments of the disclosure. In some embodiments, electronic device 600 is optionally device 500 as described above with reference to FIG. 5, including a set top box or other user interface generating device that is in communication with a remote control and a display device. Optionally, electronic device 600 is coupled to a camera 602. Camera 602 is optionally included in electronic device 600; in some embodiments, the camera is external to the electronic device, for example, in a display device to which the electronic device is coupled. In some embodiments, camera 602 optionally corresponds to any one of optical sensor(s) 164 in FIG. 1A and sensors (359) in FIG. 3. Camera 602 optionally includes any type of image sensor, such as a red-green-blue (RGB) image sensor, a depth image sensor, and an infrared (IR) image sensor. Electronic device 600 optionally receives sensed image data from camera 602. In the embodiment illustrated, a first person 604 is located in front of camera 602 such that the camera is able to capture an image of the first person. It is understood that people use devices. When a person uses a device (e.g., device 600), that person is optionally referred to as a user of the device. Thus, in this disclosure, references to a "person" or "people" are optionally interchangeable with references to a "user" or "users", and references to a "user" or "users" are optionally interchangeable with references to a "person" or "persons".

Figure 6B:
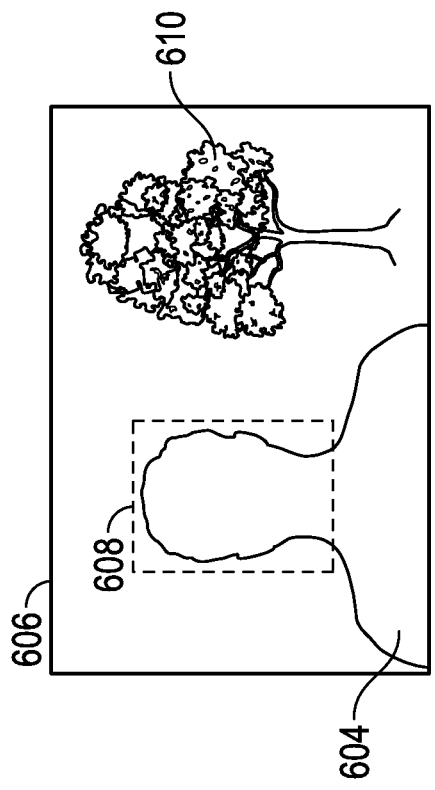

FIG. 6B illustrates an exemplary first image 606 provided by camera 602 to electronic device 600. In some embodiments, first image 606 includes first person 604 and other people or things 610. In some embodiments, electronic device 600 identifies the face 608 of first person 604 from first image 606. Identifying the face 608 of first person 604 optionally includes determining the shape and/or location of the face in the image, and not necessarily the identity of the person to whom the face belongs, though both are within the scope of the disclosure. Electronic device 600 optionally performs an action in accordance with the identification of the face 608 of first person 604, as will be described in more detail below.

Figure 6C:
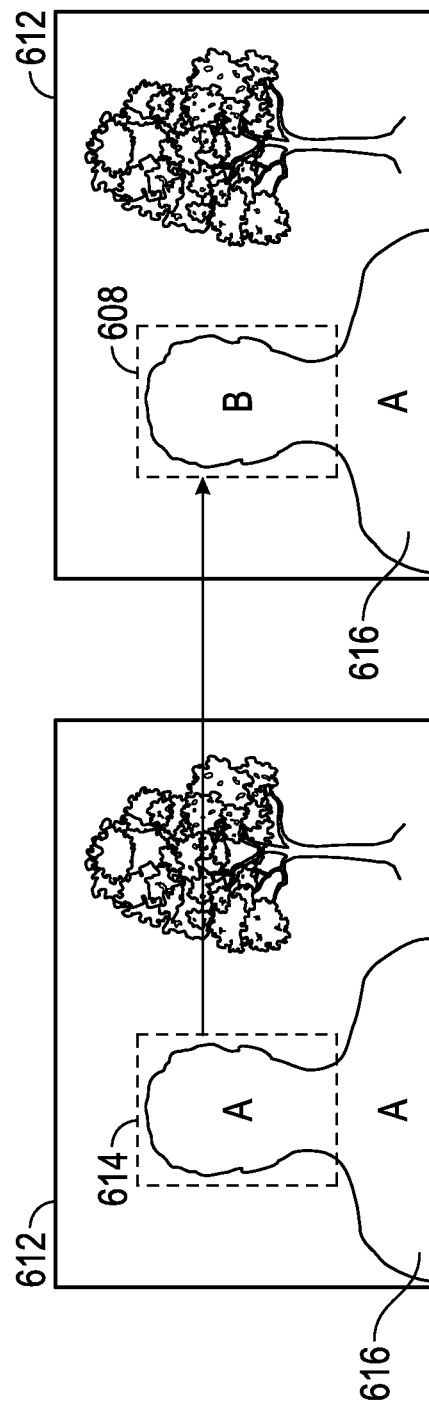

FIG. 6C illustrates an exemplary action performed by electronic device 600 in accordance with the identification of the face 608 of first person 604. In some embodiments, electronic device 600 generates a user interface for display on a display device, such as a television. In some embodiments, the user interface includes second image 612 that includes the face 614 of a second person 616, where the face 614 of the second person 616 is different from the face 608 of first person 604 (e.g., second image 612 is an image of a person different than first person 604). Electronic device 600 optionally identifies the face 614 of the second person 616 from second image 612. Identifying the face 614 of the second person 616 optionally includes determining the shape and/or location of the face in the image, and not necessarily the identity of the person to whom the face belongs, though both are within the scope of the disclosure. In the illustrated embodiment, electronic device 600 replaces the face 614 of the second person 616 in second image 612 with the face 608 of first person 604 from first image 606, thus providing a simple and automatic way of replacing one person's face with another person's face in an image.

Figure 6D:
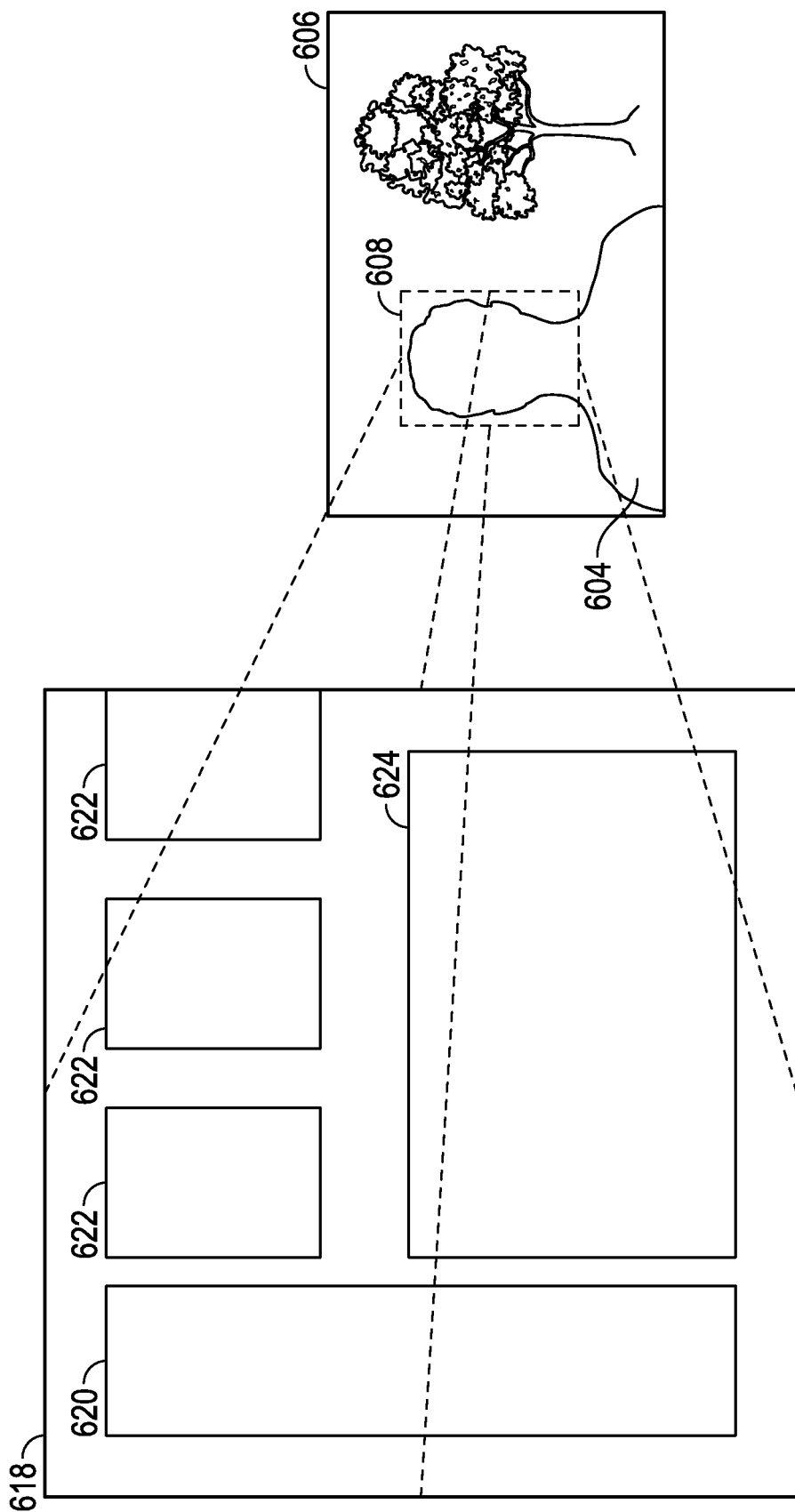
Figure 7A:
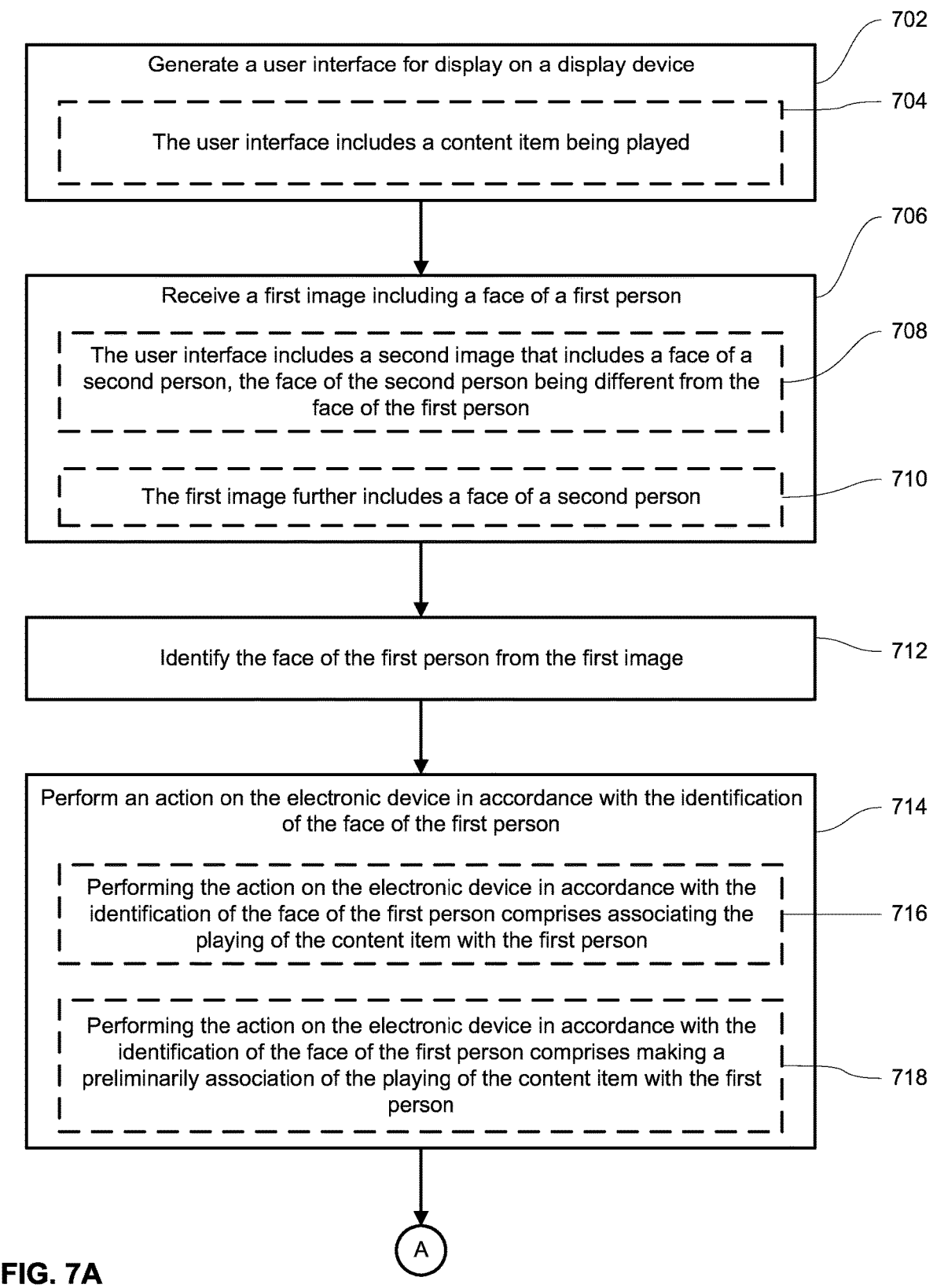
FIGS. 7A-7E are flow diagrams illustrating a method of performing an action based in part on identification of a face in an image in accordance with some embodiments.
Figure 7B:
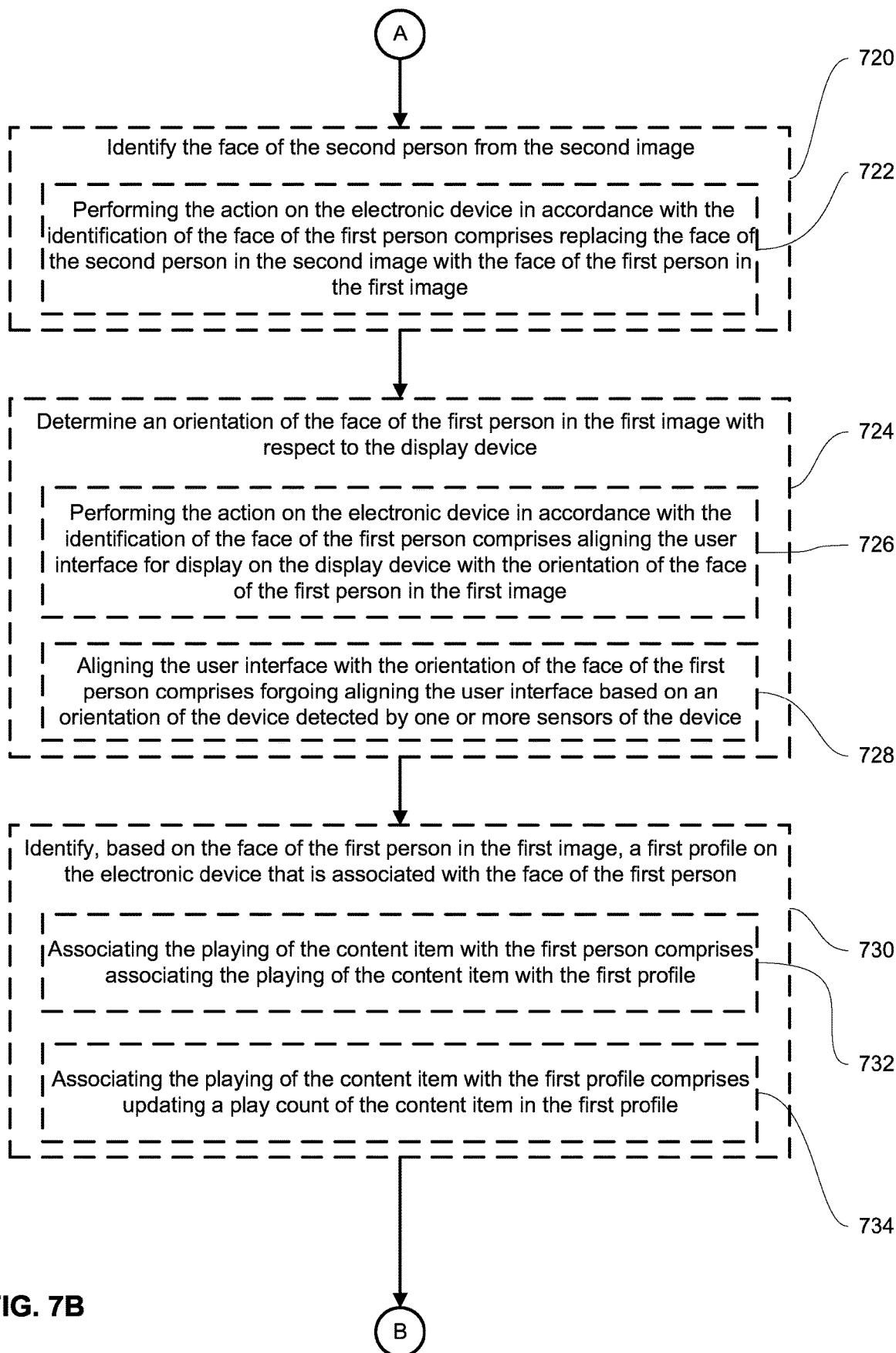
Figure 7C:
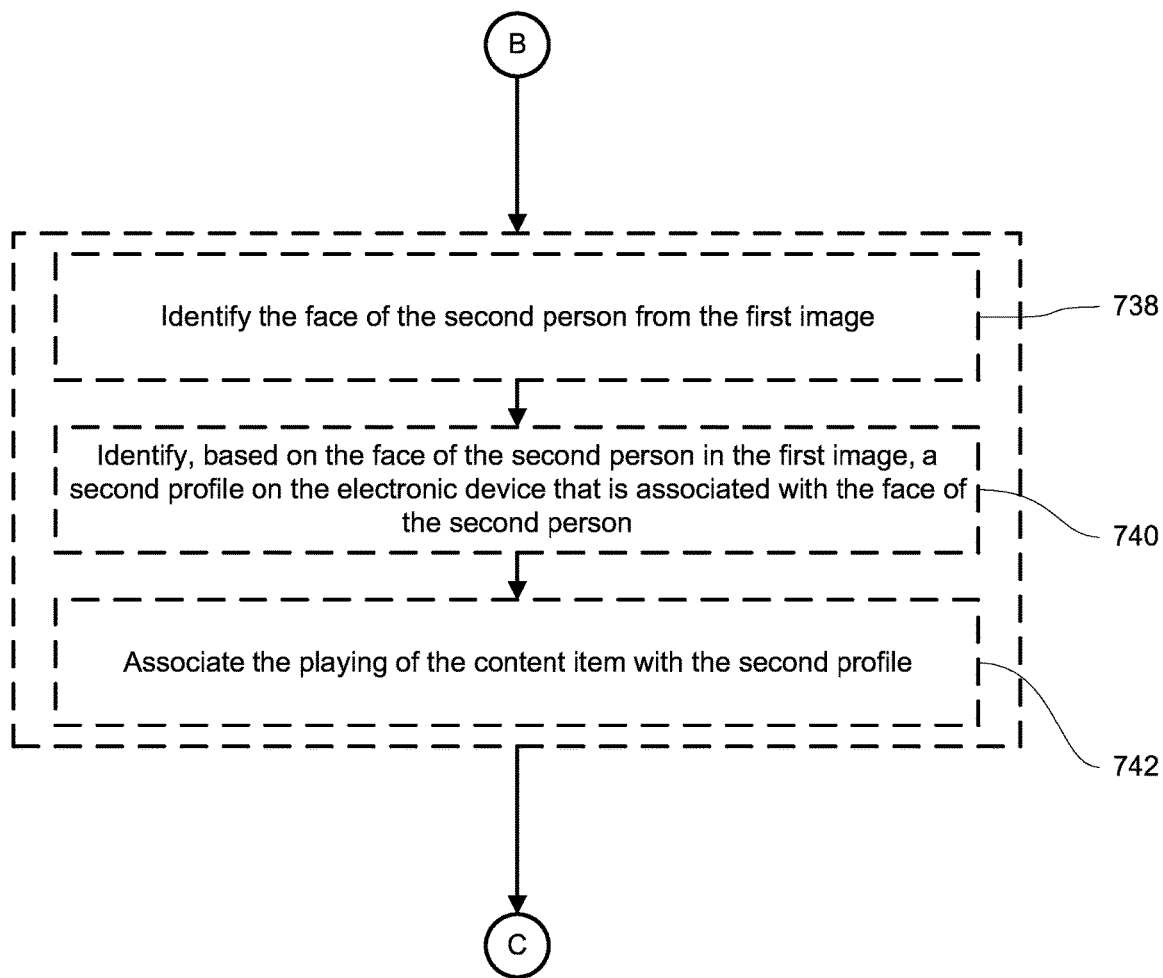
Figure 7D:
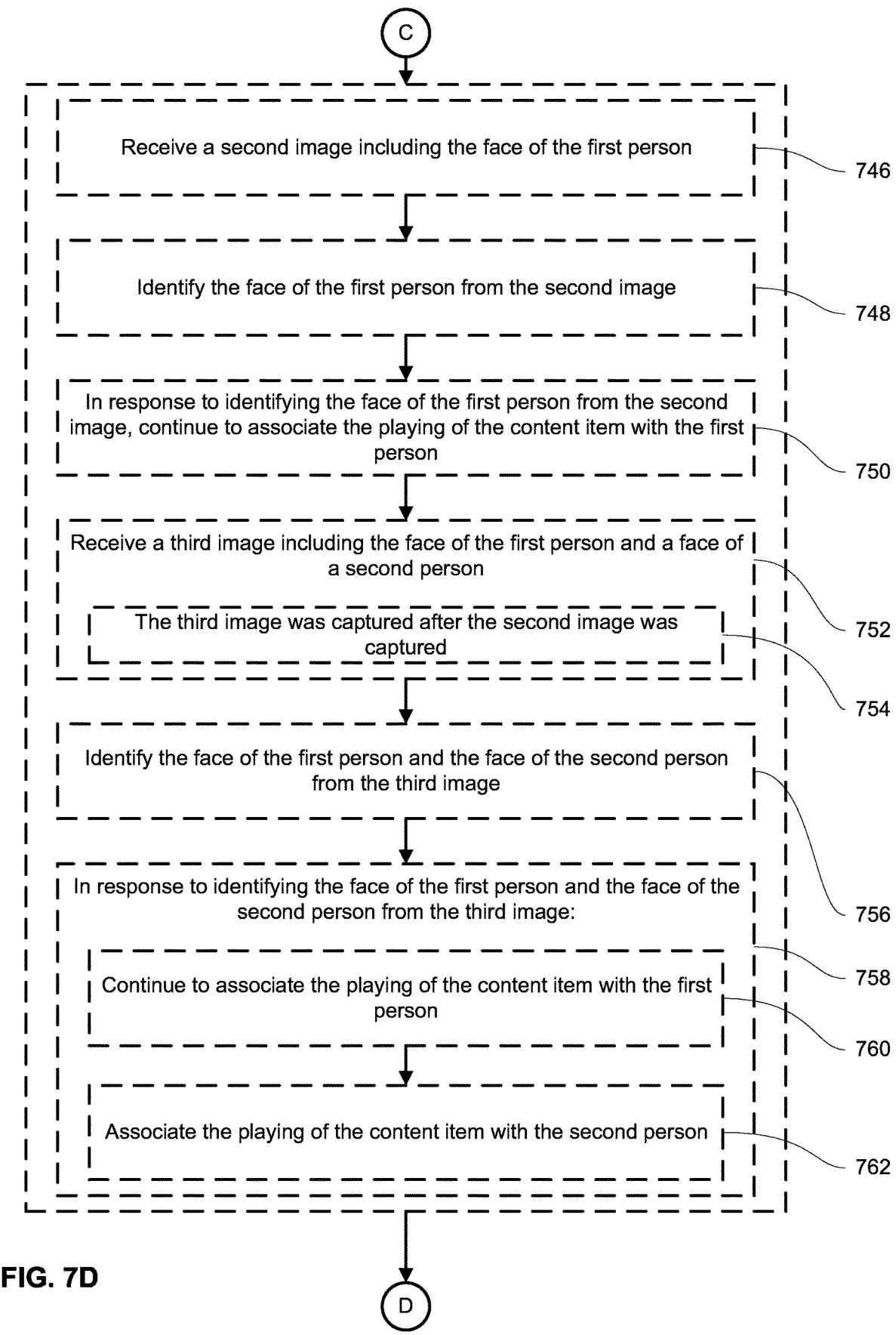
Figure 7E:
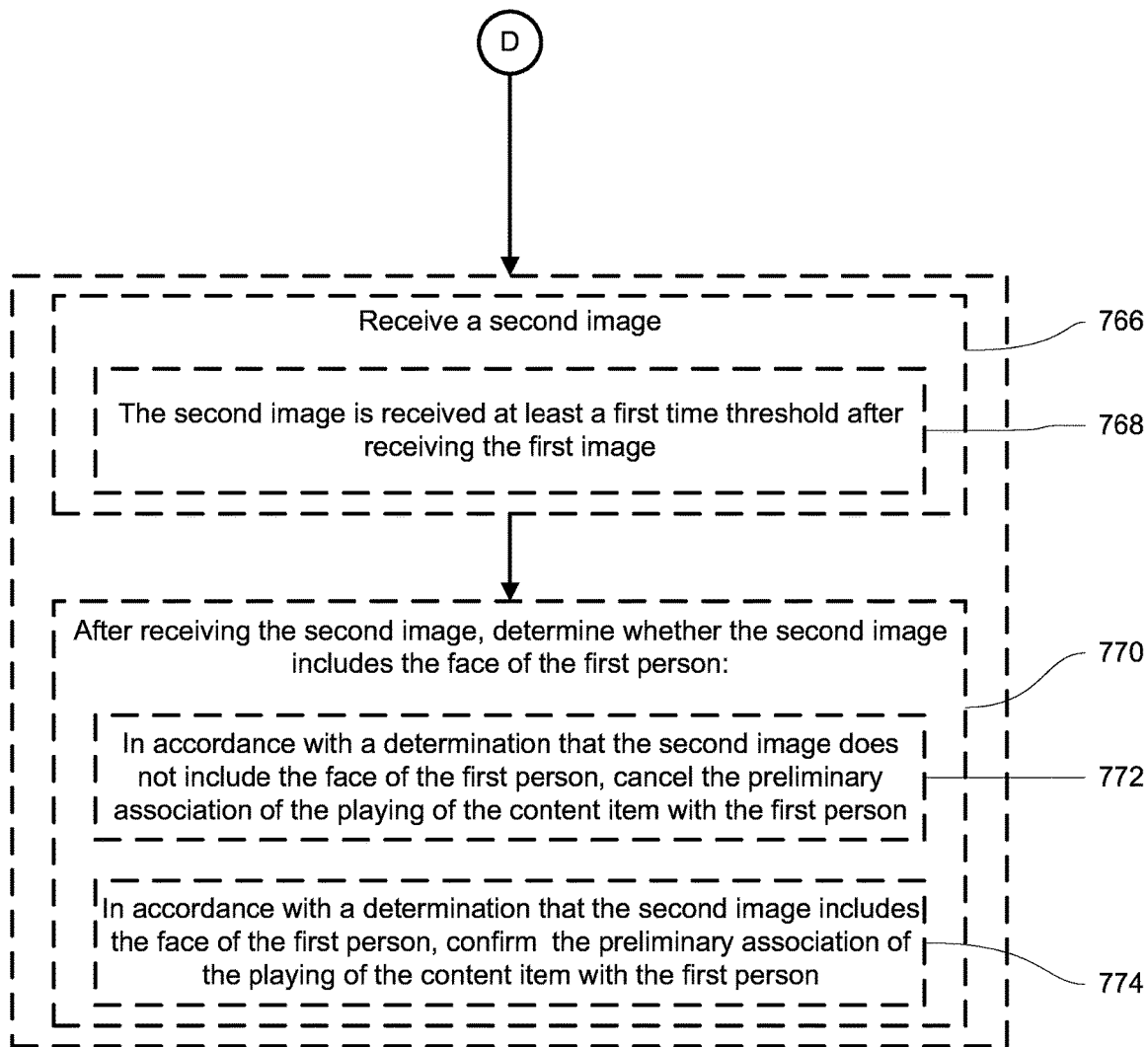

FIG. 6D illustrates another exemplary action performed by electronic device 600 in accordance with the identification of the face 608 of first person 604. As described above, in some embodiments, electronic device 600 generates a user interface 618 for display on a display device, such as a television. User interface 618 optionally includes one or more user interface elements 620, 622 and 624, which optionally include things such as images, buttons, toolbars, media content, icons, application windows, etc. Electronic device 600 optionally determines an orientation of face 608 of first person 604 in first image 606 with respect to the display device. Determining an orientation of face 608 of first person 604 with respect to the display device optionally includes determining whether first person's 604 face 608 aligns with the display device (e.g., the top of the person's face aligns with the top of the display device, the bottom of the person's face aligns with the bottom of the display device, etc.). In some embodiments, electronic device 600 aligns user interface 618 for display on the display device with the orientation of face 608 of first person 604 in first image 606. Aligning user interface 618 optionally includes lining up the user interface with the first person's 604 face 608 by, for example, rotating a user interface element (e.g., image, toolbar, media content, icon, application window, etc.) such that one or more of the top/bottom/left/right of the user interface element align with one or more of the top/bottom/left/right of the face 608 of the first person 604 in the first image 606, as illustrated.

In some embodiments, aligning user interface 618 with the first person's 604 face 608 includes forgoing aligning user interface 618 based on an orientation of the electronic device 600 detected by one or more sensors of the electronic device. For example, even if a mobile phone is being held sideways with respect to gravity as detected by one or more accelerometers or an inertial measurement unit, the mobile phone optionally does not rotate the user interface on the mobile phone if the person in front of the mobile phone is also sideways, e.g., looking at the phone while laying down on his/her side. For example, in some circumstances, the default behavior of the device optionally is to align the user interface so that a bottom edge of the user interface is aligned with the edge of the device that is oriented down (e.g., closest to the floor), but if a face is detected, this default behavior is optionally overridden so that even if a first edge of the device is closest to the floor, the user interface will optionally be aligned with a second edge that causes the user interface to be oriented so that it appears right-side-up for the user.

In some embodiments, the user interface includes a content item being played (e.g., a movie, a television show, a game, a song, a radio show), and performing the action on the electronic device in accordance with the identification of the face of the first person optionally includes associating the playing of the content item with the first person (e.g., tracking the person's viewing or other activity history without requiring the person to manually login to the electronic device, or marking notifications as read by the user only if the user is in front of the display when the notifications are displayed on the display, even if the user is logged in and the device is not asleep). In some embodiments, the electronic device identifies, based on the face of the first person in the first image, a first profile on the electronic device that is associated with the face of the first person (e.g., actually identifying the person). In such embodiments, associating the playing of the content item with the first person optionally includes associating the playing of the content item with the first profile. In some embodiments, the electronic device updates a play count of the content item in the first profile.

In some embodiments, two or more people might be captured in an image taken by the camera. In such instances, the first image optionally further includes a face of a second person. In addition to identifying the face of the first person in the first image, the electronic device optionally identifies the face of the second person from the first image, identifies, based on the face of the second person in the first image, a second profile on the electronic device that is associated with the face of the second person (e.g., actually identifying the second person), and associates the playing of the content item with the second profile. In other words, the electronic device optionally associates the playing of the content item with both the first person and the second person.

In some embodiments, the second person might join the first person after the first person has started playing the content item. In such instances, the electronic device optionally receives a second image including the face of the first person (e.g., a second image including just one person), identifies the face of the first person from the second image, and in response to identifying the face of the first person from the second image, continues to associate the playing of the content item with the first person (e.g., while the face of the first person continues to be detected, continuing to associate the playing of the content item with the first person). The electronic device optionally receives a third image including the face of the first person and a face of a second person (e.g., a third image including both the first person and the second person), where the third image was captured after the second image was captured (e.g., the second person arrives at the display device while the first person is watching the content item). In some embodiments, the electronic device identifies the face of the first person and the face of the second person from the third image (e.g., identifying both people at the display device), and in response to identifying the face of the first person and the face of the second person from the third image, continues to associate the playing of the content item with the first person (e.g., while the face of the first person continues to be detected, continuing to associate the playing of the content item with the first person), and associates the playing of the content item with the second person (e.g., starts associating the playing of the content item with the second person when the face of the second person is identified).

In some embodiments, the electronic device verifies that the first person is identified for longer than a certain time period before finally associating the playing of the content item with the first person. In such instances, as described above, the user interface generated by the electronic device optionally includes a content item being played (e.g., a movie, a television show, a game, a song, a radio show). Performing the action on the electronic device in accordance with the identification of the face of the first person optionally includes making a preliminarily association of the playing of the content item with the first person (e.g., tracking the person's viewing or other activity history without requiring the person to manually login to the electronic device, or marking notifications as read by the user only if the user is in front of the display when the notifications are displayed on the display, even if the user is logged in and the device is not asleep). In some embodiments, the electronic device receives a second image at least a first time threshold (e.g., 1, 15, or 30 seconds) after receiving the first image. After receiving the second image, the electronic device optionally determines whether the second image includes the face of the first person. In accordance with a determination that the second image does not include the face of the first person, the electronic device optionally cancels the preliminary association of the playing of the content item with the first person. In accordance with a determination that the second image includes the face of the first person, the electronic device optionally confirms the preliminary association of the playing of the content item with the first person (e.g., to ensure that first person is "present" for long enough to associate the content item with that person).

FIGS. 7A-7E are flow diagrams illustrating a method 700 of performing an action based in part on identification of a face in an image in accordance with some embodiments (e.g., as described above with reference to FIGS. 6A-6D). The method 700 is optionally performed at an electronic device such as device 500 as described above with reference to FIG. 5, including a set top box or other user interface generating device that is in communication with a remote control and a display device. Some operations in method 700 are, optionally, combined and/or the order of some operations is, optionally, changed.

As described below, the method 700 provides ways in which a device can react to identifying the face of a user. The method reduces the cognitive burden on a user when interacting with a user interface on the device, and reduces the need for the user to physically interact with the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 600 in FIG. 6A) with one or more processors and memory generates (702) a user interface for display on a display device (e.g., a television or other display device). In some embodiments, the user interface includes a content item being played (704) (e.g., a movie, a television show, a game, a song, a radio show).

In some embodiments, the device receives (706) a first image including a face of a first person (e.g., an image of the person from an RGB camera, such as image 606 including face 608 in FIG. 6B). In some embodiments, the user interface includes a second image that includes a face of a second person, the face of the second person being different from the face of the first person (708) (e.g., an image of someone other than the first person, such as image 612 including face 614 in FIG. 6C). In some embodiments, the first image further includes a face of a second person (710).

In some embodiments, the device identifies (712) the face of the first person from the first image (e.g., determining the shape/location of the face in the image, not necessarily the identity of the person to whom the face belongs).

In some embodiments, the device performs (714) an action on the electronic device in accordance with the identification of the face of the first person (e.g., displaying the image on the display device with everything but the person's face having some visual effect, logging the person into the electronic device, etc.). In some embodiments, performing the action on the electronic device in accordance with the identification of the face of the first person comprises associating the playing of the content item with the first person (716) (e.g., tracking the person's viewing or other activity history without requiring the person to manually login to the electronic device or marking notifications as read by the user only if the user is in front of the display when the notifications are displayed on the display, even if the user is logged in and the device is not asleep). In some embodiments, performing the action on the electronic device in accordance with the identification of the face of the first person comprises making a preliminarily association of the playing of the content item with the first person (718) (e.g., preliminarily tracking the person's viewing or other activity history without requiring the person to manually login to the electronic device or marking notifications as read by the user only if the user is in front of the display when the notifications are displayed on the display, even if the user is logged in and the device is not asleep).

In some embodiments, the device identifies (720) the face of the second person from the second image (e.g., determining the shape/location of the face in the image, not necessarily the identity of the person to whom the face belongs). In some embodiments, performing the action on the electronic device in accordance with the identification of the face of the first person comprises replacing the face of the second person in the second image with the face of the first person in the first image (722) (e.g., placing the first person's face into an image that has another face, such as replacing face 614 in image 612 with face 608 in FIG. 6C).

In some embodiments, the device determines (724) an orientation of the face of the first person in the first image with respect to the display device (e.g., determining whether the first person's face aligns with the display device). In some embodiments, performing the action on the electronic device in accordance with the identification of the face of the first person comprises aligning the user interface for display on the display device with the orientation of the face of the first person in the first image (726) (e.g., lining up the user interface with the person's face by, for example, rotating a user interface element (e.g., image, toolbar, icon, application window, etc.) such that one or more of the top/bottom/left/right of the user interface element align with one or more of the top/bottom/left/right of the face of the first person in the first image). FIG. 6D and its associated discussion provide an exemplary embodiment in which such aligning is performed. In some embodiments, aligning the user interface with the orientation of the face of the first person comprises forgoing aligning the user interface based on an orientation of the device detected by one or more sensors of the device (728) (e.g., even if a mobile phone is being held sideways with respect to gravity as detected by one or more accelerometers or an inertial measurement unit, the mobile phone not rotate the user interface on the mobile phone if the person in front of the mobile phone is also sideways, e.g., looking at the phone while laying down on his/her side). For example, the default behavior of the device is optionally to align the user interface so that a bottom edge of the user interface is aligned with the edge of the device that is oriented down (e.g., closest to the floor), but if a face is detected, this default behavior is overridden so that even if a first edge of the device is closest to the floor, the user interface will be aligned with a second edge that causes the user interface to be oriented so that it appears right-side-up for a user.

In some embodiments, the device identifies (730), based on the face of the first person in the first image, a first profile on the electronic device that is associated with the face of the first person (e.g., actually identifying the person). In some embodiments, associating the playing of the content item with the first person comprises associating the playing of the content item with the first profile (732). In some embodiments, associating the playing of the content item with the first profile comprises updating a play count of the content item in the first profile (734).

In some embodiments, the device identifies (738) the face of the second person from the first image. In some embodiments, the device identifies (740), based on the face of the second person in the first image, a second profile on the electronic device that is associated with the face of the second person (e.g., identify the second user). In some embodiments, the device associates (742) the playing of the content item with the second profile.

In some embodiments, the device receives (746) a second image including the face of the first person (e.g., a second image including just one person). In some embodiments, the device identifies (748) the face of the first person from the second image. In some embodiments, in response to identifying the face of the first person from the second image, the device continues to associate (750) the playing of the content item with the first person (e.g., while the face of the first person continues to be detected, continue to associate the playing of the content item with the first person). In some embodiments, the device receives (752) a third image including the face of the first person and a face of a second person (e.g., a third image including two people). In some embodiments, the third image was captured after the second image was captured (754) (e.g., the second person arrives at the display device while the first person is watching the content item). In some embodiments, the device identifies (756) the face of the first person and the face of the second person from the third image (e.g., identifying both people at the display device). In some embodiments, in response to identifying the face of the first person and the face of the second person from the third image (758) the device continues to associate (760) the playing of the content item with the first person (e.g., while the face of the first person continues to be detected, continue to associate the playing of the content item with the first person), and the device associates (762) the playing of the content item with the second person (e.g., start associating the playing of the content item with the second person when the face of the second person is identified).

In some embodiments, the device receives (766) a second image. In some embodiments, the second image is received at least a first time threshold after receiving the first image (768) (e.g., 1, 15, or 30 seconds). In some embodiments, after receiving the second image, the device determines (770) whether the second image includes the face of the first person. In some embodiments, in accordance with a determination that the second image does not include the face of the first person, the device cancels (772) the preliminary association of the playing of the content item with the first person. In some embodiments, in accordance with a determination that the second image includes the face of the first person, the device confirms (774) the preliminary association of the playing of the content item with the first person (e.g., ensure that first person is "present" for long enough to associate the content item with them).

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIGS. 7A-7E. For example, the user interfaces, display device and content item described above with reference to method 700 optionally have one or more of the characteristics of the user interfaces, display devices and content items (or media content) described herein with reference to other methods described herein (e.g., methods 900, 1100, 1300 and 1500). For brevity, these details are not repeated here.

The operations in the information processing methods described above are, optionally implemented by running one or more functional modules in an information processing apparatus such as general purpose processors (e.g., as described above with respect to FIGS. 1A, 3 and 5) or application specific chips.

The operations described above with reference to FIGS. 7A-7E are, optionally, implemented by components depicted in FIGS. 1A-1B. For example, generation operation 702, receiving operation 706, identification operation 712 and performing operation 714 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Gaze Determination

Determining where in a user interface a person is looking (e.g., gaze location), and performing one or more actions based on that gaze location, can enhance the person's experience when interacting with the user interface. Such a user interface, generated by a device, enables the person to perform certain actions associated with the device without the need to provide physical input, such as through a touch-sensitive surface or a mouse. The embodiments described below describe ways in which determining a person's gaze location in a user interface can enhance that person's experience when interacting with the user interface. Enhancing the usability of a device reduces the amount of time needed by the person to perform operations, and thus reduces the power usage of the device and increases battery life for battery-powered devices.

FIGS. 8A-8E illustrate exemplary ways in which interactions with user interfaces are enhanced based on gaze determination in accordance with some embodiments of the disclosure. The embodiments in these figures are used to illustrate the processes described below, including the processes described with reference to FIGS. 9A-9C.

Figure 8A:
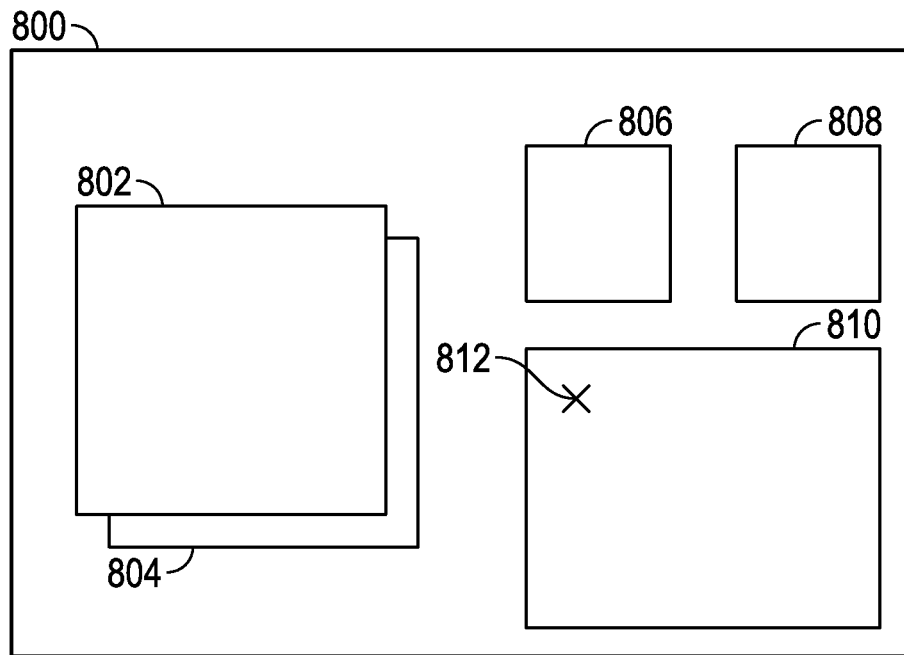
FIGS. 8A-8E illustrate exemplary ways in which interactions with user interfaces are enhanced based on gaze determination in accordance with some embodiments of the disclosure.

FIG. 8A illustrates an exemplary user interface 800 according to embodiments of the disclosure. User interface 800 is optionally generated by an electronic device such as device 500 as described above with reference to FIG. 5, including a set top box or other user interface generating device that is in communication with a remote control and a display device. User interface 800 is optionally for display on a display device, such as a television or other display device. In the illustrated embodiment, user interface 800 includes a plurality of user interface elements 802, 804, 806, 808 and 810. The user interface elements are optionally any combination of any user interface elements that can appear in a user interface, such as icons, application windows, buttons, toolbars, media content, docks, etc. Though user interface 800 includes a plurality of user interface elements, it is understood that the processes described here are optionally performed in a user interface including only a single user interface element.

The electronic device described above optionally determines a gaze location 812 in user interface 800. The gaze location 812 is a location in user interface 800 to which a person's gaze is directed. In other words, the electronic device optionally determines where in user interface 800 the person is looking. In making this determination, the electronic device uses any suitable method for determining the gaze location 812, such as identifying the person's eyes and their direction, and the person's distance from the display device, and calculating the gaze location based on those quantities. Other methods of determining the gaze location 812 are similarly within the scope of the disclosure.

Once the electronic device determines the gaze location 812, the electronic device optionally determines whether the gaze location 812 coincides with a user interface element in user interface 800. In other words, the electronic device optionally determines whether the person is looking at a user interface element in user interface 800. In the illustrated embodiment, if the electronic device were determining whether the gaze location 812 coincides with user interface element 806, for example, the electronic device would determine that it does not. If, however, the electronic devise were determining whether the gaze location 812 coincides with user interface element 810, the electronic device would determine that is does.

In accordance with a determination that the gaze location 812 coincides with user interface element 810 (e.g., a determination that the person is looking at user interface element 810), the electronic device optionally performs an action with respect to user interface element 810. Possible actions that the electronic device optionally performs are described in more detail below.

Figure 8B:
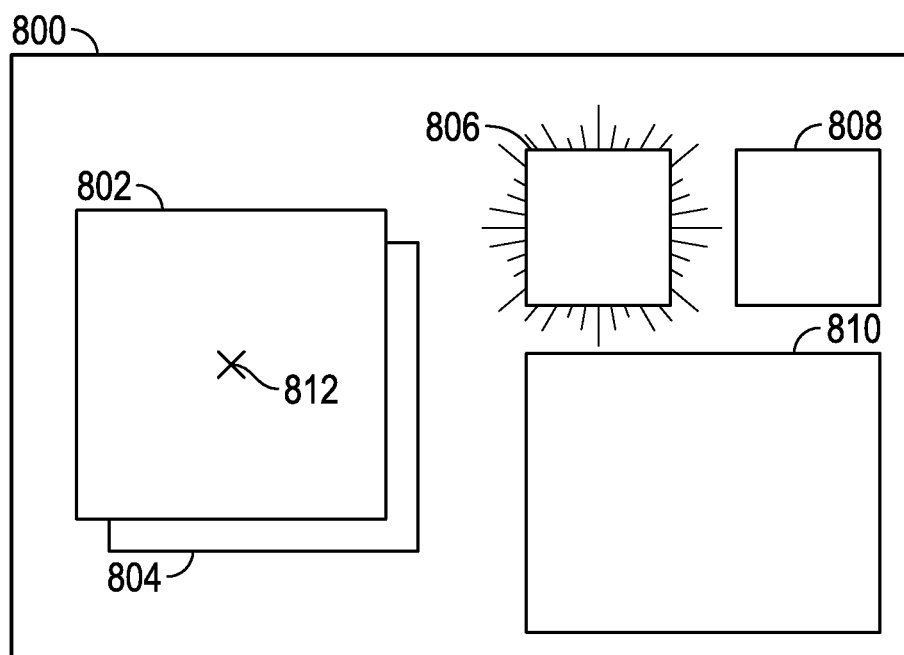
Figure 8C:
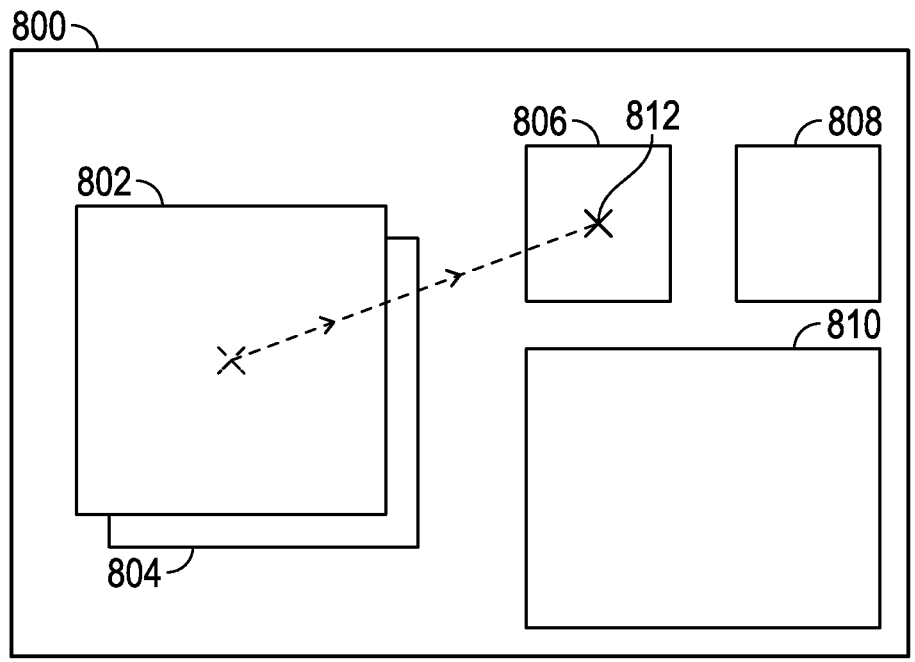

FIGS. 8B-8C illustrate an exemplary action that the electronic device optionally performs based on the gaze location 812 in user interface 800. FIG. 8B illustrates user interface 800, mostly as described above. However, in the embodiment of FIG. 8B, user interface element 806 is requesting the person's attention by, for example, flashing, bouncing, or any other mechanism for requesting the person's attention. User interface element 806 might request the person's attention for many reasons, including but not limited to, requiring the person's input to proceed with an operation (such as installing a program), or providing a notification of an event (such as receipt of a new email) to the person. In the illustrated embodiment, the person is looking at user interface element 802 while user interface element 806 is requesting the person's attention.

In FIG. 8C, the person has started to look at user interface element 806, and thus gaze location 812 has shifted from user interface element 802 to user interface element 806. As illustrated, because the gaze location 812 is now coincident with user interface element 806, electronic device optionally acknowledges user interface element's 806 request for attention, and ceases any mechanism user interface element 806 was utilizing to request the person's attention (e.g., bouncing, flashing).

Figure 8D:
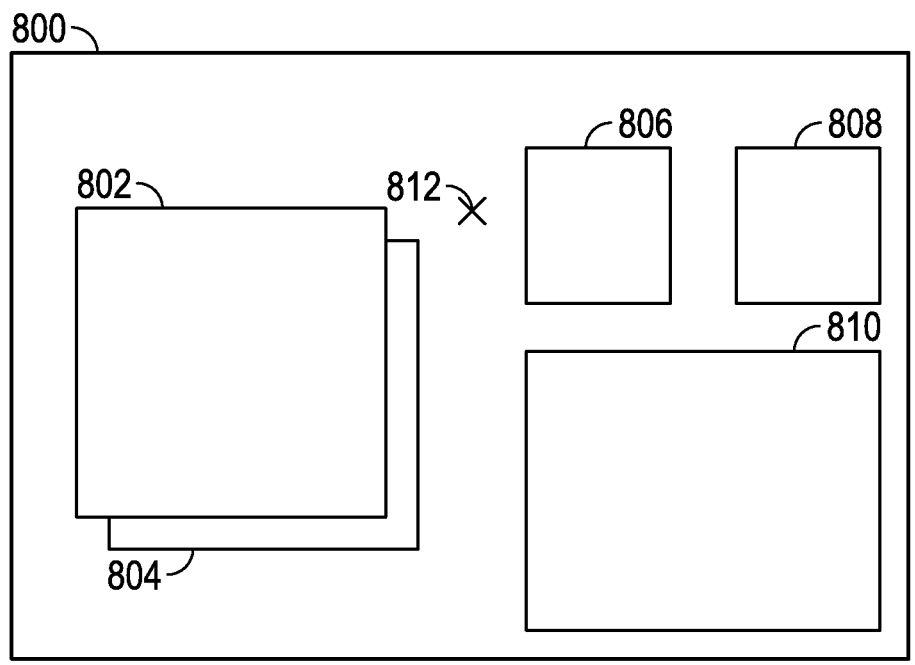
Figure 8E:
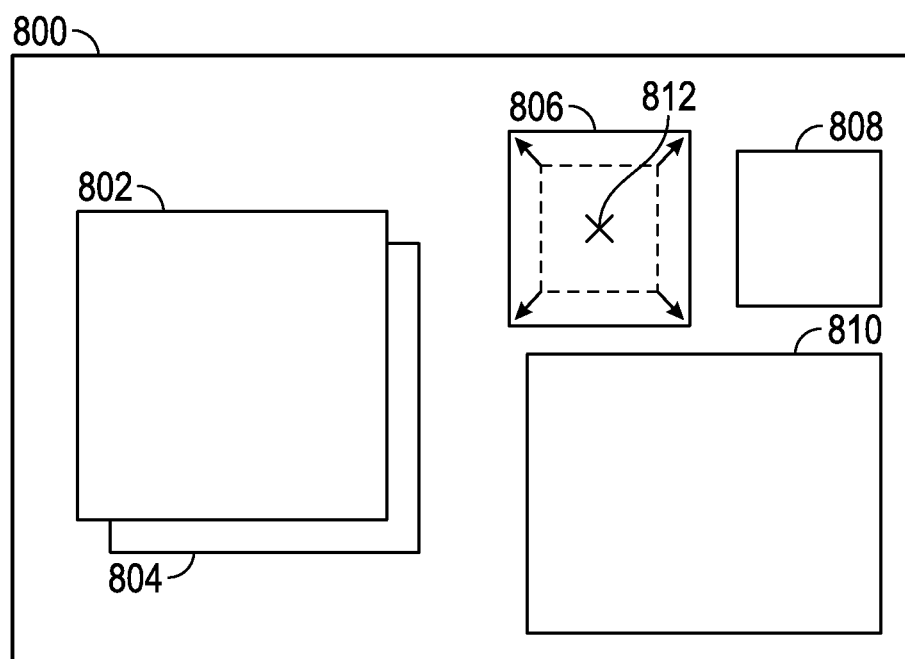

FIGS. 8D-8E illustrate another exemplary action that the electronic device optionally performs based on the gaze location 812 in user interface 800. FIG. 8D illustrates user interface 800, as described above. In FIG. 8D, gaze location 812 is between the user interface elements in user interface 800.

In FIG. 8E, the person has started to look at user interface element 806, and thus gaze location 812 is coincident with user interface element 806. As a result, electronic device optionally emphasizes user interface element 806 relative to other user interface elements. In other words, the user interface element at which the person is looking is optionally emphasized relative to other user interface elements. In the illustrated example, user interface element 806 is enlarged while the sizes of the remaining user interface elements remain constant. In some implementations, emphasizing a user interface element is accomplished by increasing its brightness relative to other user interface elements, promoting its position in a user interface element z-order, blurring or dimming other user interface elements, changing its position relative to other user interface elements, or any other mechanism for emphasizing the user interface element relative to other user interface elements.

In some embodiments, the electronic device optionally determines one or more portions of the display device that are not coincident with the gaze location and a particular user interface element, and adjusts an output of the one or more portions of the display device that are not coincident with the gaze location. In other words, the electronic device optionally dims or turns off parts of the display device that the person is not looking at.

In some embodiments, a user interface element coincident with the gaze location becomes a selected user interface element. In some embodiments, a particular user interface element includes moving items, such as a stock ticker including scrolling stock quotes. The electronic device optionally determines which of the moving items (e.g., stock quotes) the gaze location coincides with, and the electronic device optionally modifies the movement of the looked-at moving item (e.g., slowing down or stopping the movement) so that the particular moving item is visible in the user interface. For example, when a person looks at a specific stock quote in a scrolling stock quote list, the electronic device optionally stops the scrolling of the stock quotes so that the looked-at stock quote is visible and can be more easily read by the person.

In some embodiments, the user interface element including the moving items is an autoscrolling list, and the moving items are elements of the autoscrolling list. In some embodiments, the user interface element is an image catalog (e.g., a collection of photographs, album artwork, etc.), and the moving items are images in the image catalog. In some embodiments, the user interface element is a content bar (e.g., a channel bar, an application bar, etc.), and the moving items are representations of content items accessible form the content bar (e.g., channels, programs, and apps that are presented to the person in response to detecting activation of a corresponding representation in the content bar).

In some embodiments, a particular user interface element includes content. For example, the user interface element optionally contains text and/or images. In such a circumstance, when the gaze location coincides with the user interface element, the electronic device optionally designates the content in the user interface element as being read. For example, the electronic device optionally tracks when a person has read all portions of a contract (or tracks which portions of the contract the person has read), a message, an email, etc., and when the electronic device determines that the person has read the entire contract/message/email, the electronic device optionally designates the contract/message/email as being read. In some embodiments, the electronic device designates portions of the contract/message/email as being read as they are read by the person.

In some embodiments, the gaze location is used to designate a user interface element as being an active user interface element. For example, if the gaze location is coincident with a particular user interface element, the electronic device optionally designates that particular user interface element as being an active user interface element. Then, when input from an input device (e.g., a mouse) for interacting with an active user interface element is received by the electronic device, the electronic device facilitates interaction with the particular user interface element (e.g., the active user interface element) in accordance with the input. For example, a person optionally designates which of a plurality of application windows the person desires to scroll with a scrolling input on a mouse by, for example, looking at the appropriate application window. The person optionally alters this designation simply by looking at different application windows. Then, the person optionally provides a scrolling input, for example, to the electronic device, and the application window at which the person is looking optionally scrolls in response to the scrolling input.

In some embodiments, the input device has an associated cursor (e.g., mouse pointer) in the user interface. In such circumstances, the electronic device optionally ignores the location of the cursor in designating the user interface element with which the gaze location is coincident as the active user interface element. For example, a scrolling input receiving from a mouse optionally scrolls an application window the person is looking at, and not the application window over which the mouse curser is located.

Figure 9A:
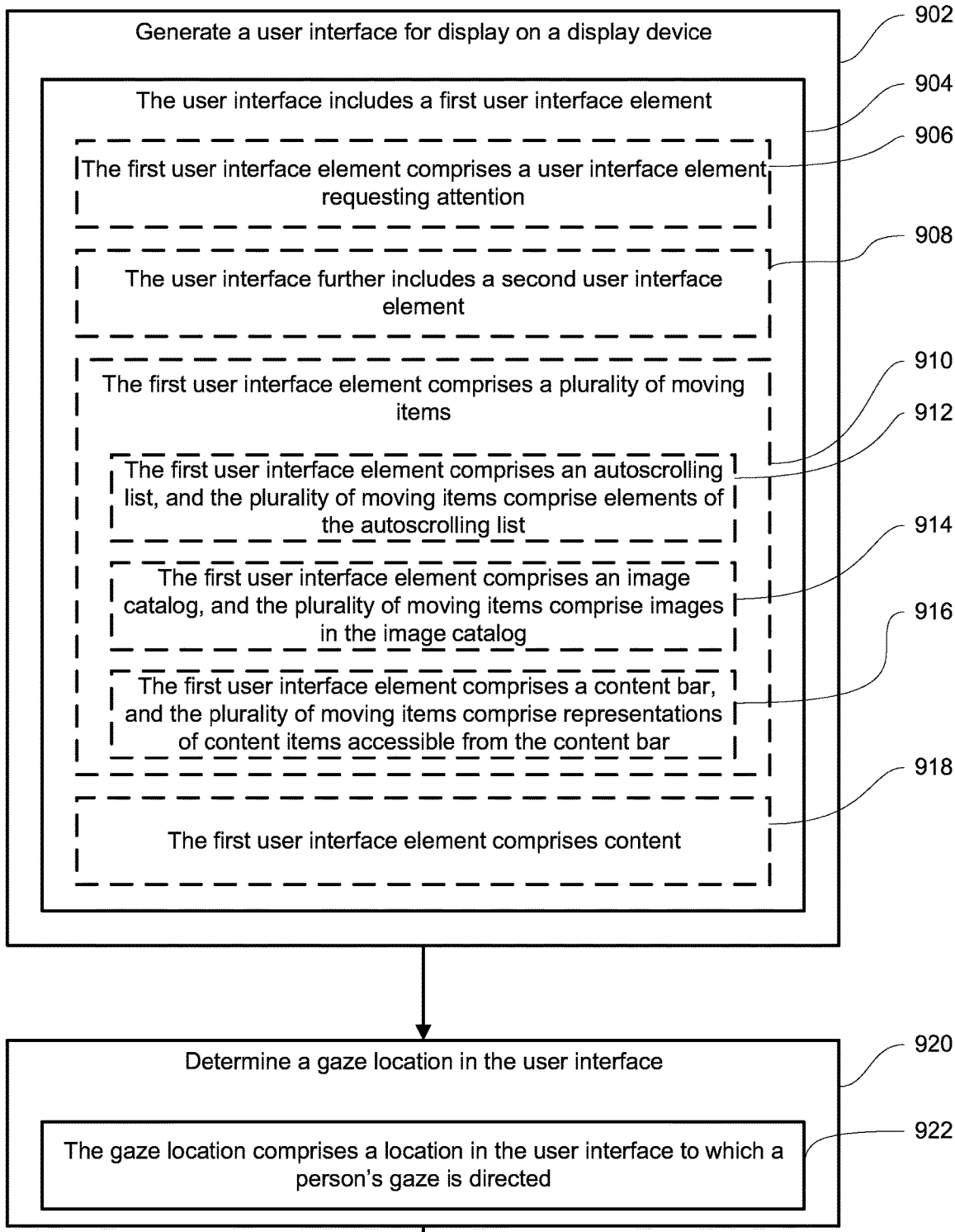
FIGS. 9A-9C are flow diagrams illustrating a method of performing an action based in part on determining a gaze location in accordance with some embodiments.
Figure 9B:
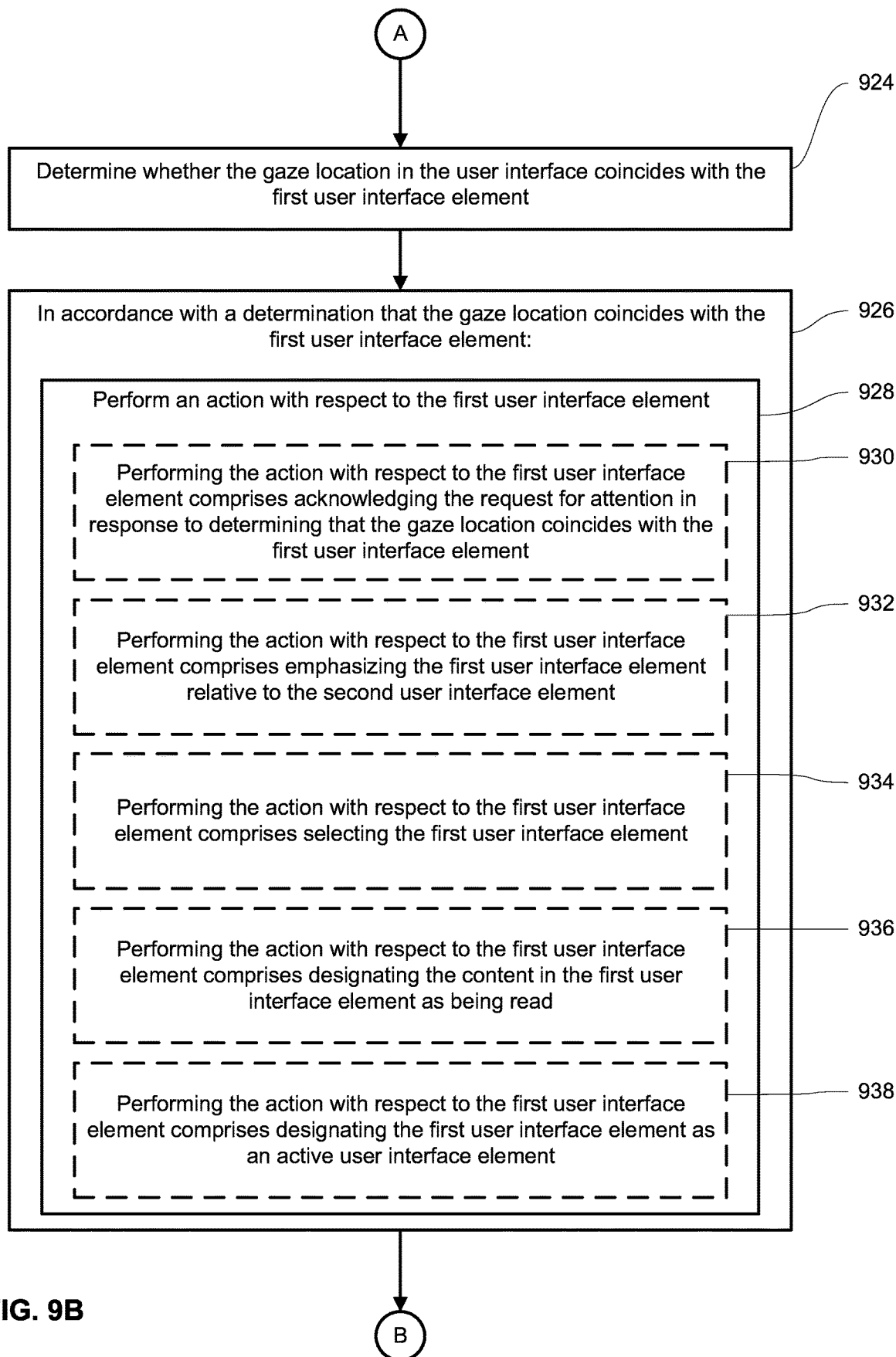
Figure 9C:
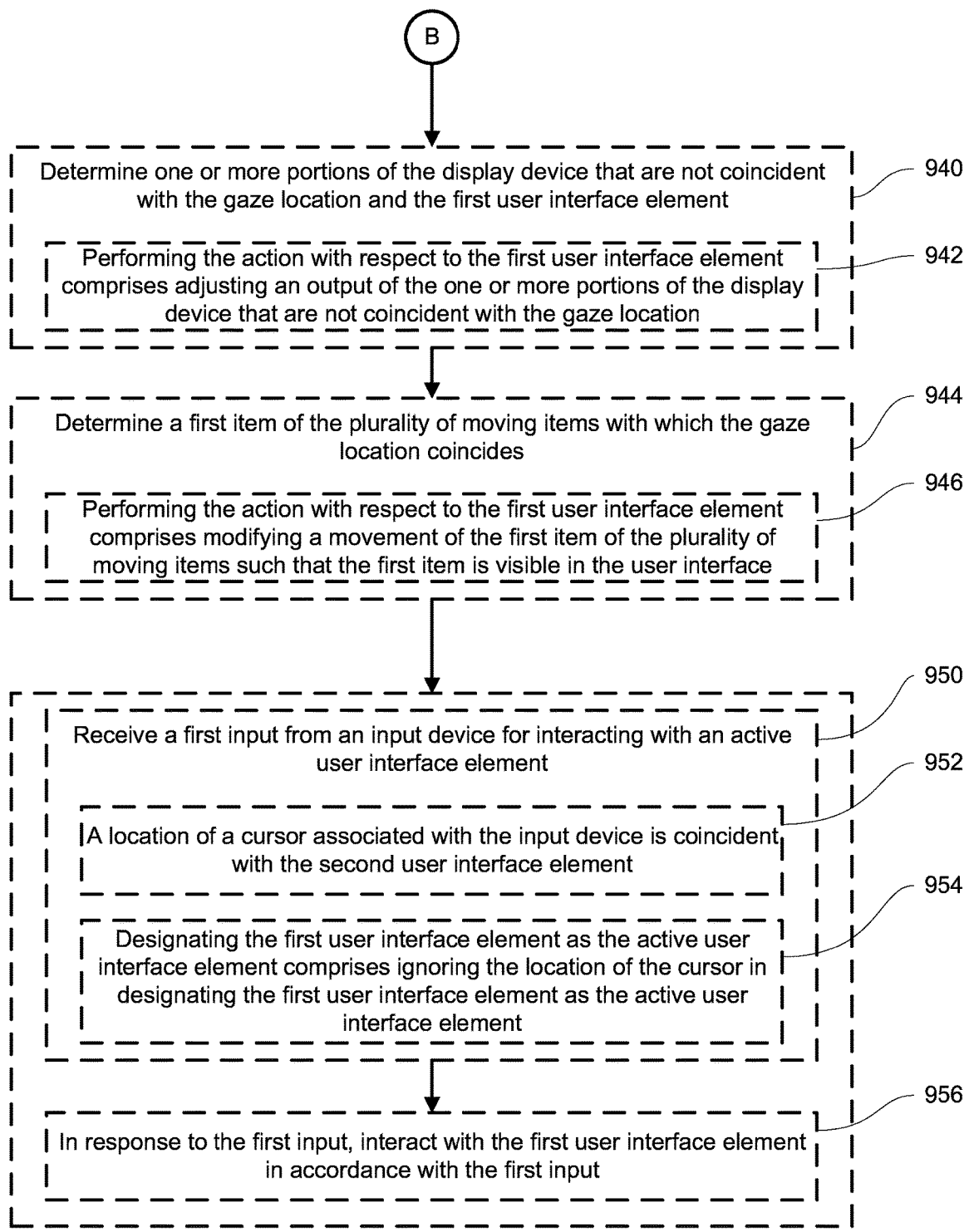

FIGS. 9A-9C are flow diagrams illustrating a method 900 of performing an action based in part on determining a gaze location in accordance with some embodiments (e.g., as described above with reference to FIGS. 8A-8E). The method 900 is performed at an electronic device such as device 500 as described above with reference to FIG. 5, including a set top box or other user interface generating device that is in communication with a remote control and a display device. Some operations in method 900 are, optionally, combined and/or the order of some operations is, optionally, changed.

As described below, the method 900 provides ways in which a device optionally reacts to determining a gaze location of a user. The method reduces the cognitive burden on a user when interacting with a user interface on the device, and reduces the need for the user to physically interact with the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device) with one or more processors and memory generates (902) a user interface (e.g., user interface 800 in FIG. 8A) for display on a display device (e.g., a television or other display device). In some embodiments, the user interface includes a first user interface element (904) (e.g., an icon, an application window, a button, etc., such as user interface element 806 in FIG. 8A). In some embodiments, the first user interface element comprises a user interface element requesting attention (906) (e.g., a bouncing icon, such as user interface element 806 in FIG. 8B). In some embodiments, the user interface further includes a second user interface element (908) (e.g., the first user interface element is a first application window and the second user interface element is a second application window). In some embodiments, the first user interface element comprises a plurality of moving items (910) (e.g., stock ticker with scrolling stock quotes). In some embodiments, the first user interface element comprises an autoscrolling list, and the plurality of moving items comprise elements of the autoscrolling list (912). In some embodiments, the first user interface element comprises an image catalog (e.g., collection of photographs, album artwork, etc.), and the plurality of moving items comprise images in the image catalog (914). In some embodiments, the first user interface element comprises a content bar (e.g., channel bar, app bar), and the plurality of moving items comprise representations of content items accessible from the content bar (916) (e.g., channels, programs, apps that are presented to the user in response to detecting activation of a corresponding representation in the content bar). In some embodiments, the first user interface element comprises content (918) (e.g., text, images, etc.).

In some embodiments, the device determines (920) a gaze location in the user interface (e.g., gaze location 812 in FIG. 8A). In some embodiments, the gaze location comprises a location in the user interface to which a person's gaze is directed (922) (e.g., the device determines where in the user interface the person is looking; the determination is optionally based on identifying the person's eyes and their direction).

In some embodiments, the device determines (924) whether the gaze location in the user interface coincides with the first user interface element (e.g., the device determines whether the person is looking at the first user interface element, such as whether gaze location 812 coincides with user interface element 806 in FIG. 8B).

In accordance with a determination that the gaze location coincides with the first user interface element (926), in some embodiments, the device performs (928) an action with respect to the first user interface element (e.g., acknowledging a displayed message). In some embodiments, performing the action with respect to the first user interface element comprises acknowledging the request for attention in response to determining that the gaze location coincides with the first user interface element (930) (e.g., the icon stops bouncing, such as acknowledging user interface element 806's request for attention in FIG. 8C). In some embodiments, performing the action with respect to the first user interface element comprises emphasizing the first user interface element relative to the second user interface element (932) (e.g., emphasizing (brightness, blur, size, etc.) the application window that the user is looking at relative to other application window(s) the user is not looking at, such as is illustrated in FIGS. 8D-8E). In some embodiments, performing the action with respect to the first user interface element comprises selecting the first user interface element (934) (e.g., select a user interface element the user is looking at). In some embodiments, performing the action with respect to the first user interface element comprises designating the content in the first user interface element as being read (936) (e.g., track whether a user has read all portions of a contract, message, email, etc.). In some embodiments, performing the action with respect to the first user interface element comprises designating the first user interface element as an active user interface element (938).

In some embodiments, the device determines (940) one or more portions of the display device that are not coincident with the gaze location and the first user interface element. In some embodiments, performing the action with respect to the first user interface element comprises adjusting an output of the one or more portions of the display device that are not coincident with the gaze location (942) (e.g., dimming or turning off parts of the display that the user is not looking at).

In some embodiments, the device determines (944) a first item of the plurality of moving items with which the gaze location coincides. In some embodiments, performing the action with respect to the first user interface element comprises modifying a movement (e.g., slowing down or stopping) of the first item of the plurality of moving items such that the first item is visible in the user interface (946) (e.g., when the user looks at a specific stock quote, stopping the scrolling of the stock quotes so that the looked-at stock quote is visible and can be more easily read by the user).

In some embodiments, the device receives (950) a first input from an input device (e.g., mouse) for interacting with an active user interface element. In some embodiments, a location of a cursor associated with the input device is coincident with the second user interface element (952). In some embodiments, designating the first user interface element as the active user interface element comprises ignoring the location of the cursor in designating the first user interface element as the active user interface element (954) (e.g., scrolling the application window the user is looking at, not the application window over which the cursor is located). In some embodiments, in response to the first input, the device interacts with the first user interface element in accordance with the first input (956) (e.g., the window that the user is looking at will scroll in response to a scroll input received on a mouse).

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIGS. 9A-9C. For example, the user interfaces, display device, user interface elements and gaze location described above with reference to method 900 optionally have one or more of the characteristics of the user interfaces, display devices, user interface elements and gaze locations described herein with reference to other methods described herein (e.g., methods 700, 1100, 1300 and 1500). For brevity, these details are not repeated here.

The operations in the information processing methods described above are, optionally implemented by running one or more functional modules in an information processing apparatus such as general purpose processors (e.g., as described above with respect to FIGS. 1A, 3 and 5) or application specific chips.

The operations described above with reference to FIGS. 9A-9C are, optionally, implemented by components depicted in FIGS. 1A-1B. For example, generation operation 902, determination operations 920 and 924, and performing operation 928 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Audio-Based Presence Detection

Determining whether a person is present at a device can be beneficial in providing that person an enhanced user experience with the device. For example, if a television were able to determine that a person is in the presence of the television, the television could forgo going to sleep so the person's television-viewing can remain uninterrupted. The embodiments described below describe ways in which a device can determine whether a person is present at the device. A device that is able to determine whether a person is present at the device reduces the amount of interaction needed between the person and the device, and thus reduces the power usage of the device and increases battery life for battery-powered devices.

Figure 10:
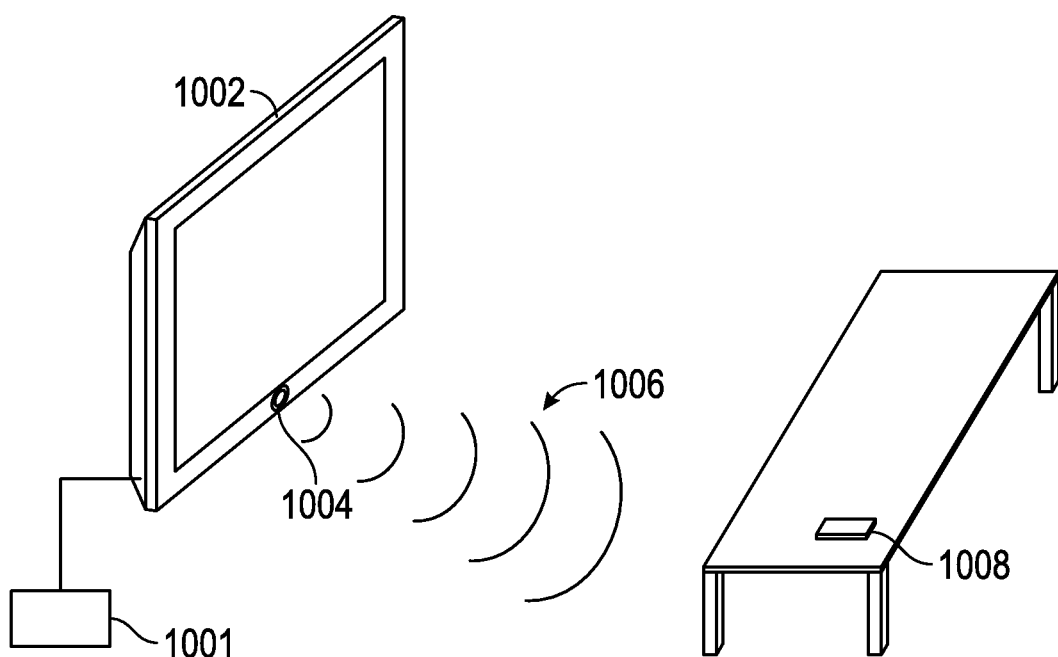
FIG. 10 illustrates exemplary ways in which a device can determine whether a person is present at the device in accordance with some embodiments of the disclosure.

FIG. 10 illustrates exemplary ways in which a device optionally determines whether a person is present at the device in accordance with some embodiments of the disclosure. The embodiments in these figures are used to illustrate the processes described below, including the processes described with reference to FIGS. 11A-11B.

FIG. 10 illustrates an exemplary spatial configuration of devices according to embodiments of the disclosure. Device 1001 is optionally a device such as device 500 as described above with reference to FIG. 5, including a set top box or other user interface generating device that is in communication with a remote control and a display device. In the illustrated embodiment, device 1001 is coupled to sound-playback device 1002. Sound-playback device 1002 is optionally a speaker or any device having a speaker, such as a television. In the illustrated example, sound-playback device 1002 has speaker 1004. Sound-playback device 1002 optionally corresponds to one or more of multifunction device 100 in FIGS. 1A and 2, device 300 in FIG. 3, and display 514 in FIG. 5; speaker 1004 optionally corresponds to speaker 111 in FIGS. 1A and 2. Device 1008 is a sound-receiving device. Sound-receiving device 1008 is optionally a microphone or any device having a microphone, such as a mobile and/or wearable device. Sound-receiving device optionally corresponds to one or more of multifunction device 100 in FIGS. 1A and 2, microphone 113 in FIGS. 1A and 2, and device 300 in FIG. 3.

In some embodiments, device 1001 optionally determines whether sound-receiving device 1008 is present at sound-playback device 1002 by generating a first sound 1006 for playback on the sound-playback device. The first sound 1006 is optionally an audible sound, or an inaudible sound that is outside of the normal range of hearing for a human (e.g., below 20 Hz or above 20,000 Hz). While or after sound-playback device 1002 has played the first sound 1006, device 1001 optionally receives an output from the microphone on sound-receiving device 1008. Device 1001 optionally receives this output via a wireless connection with sound-receiving device 1008, such as via Bluetooth Low Energy (sometimes called Bluetooth LE).

Device 1001 then optionally determines whether sound-receiving device 1008 is present at sound-playback device 1002 based on a plurality of presence criteria. If the presence criteria are satisfied, device 1001 optionally designates a user of the sound-receiving device 1008 as being present at sound-playback device 1002. For example, when the presence criteria are satisfied with respect to a mobile phone, a user of the mobile phone is determined to be present at the sound-playback device. In some embodiments, only sound-receiving device 1008, and not a user of the sound-receiving device, is designated as being present when the presence criteria are satisfied. If the presence criteria are not satisfied with respect to the mobile phone, the user of the mobile phone is determined to be not present at the sound-playback device—this determination optionally encompasses simply not designating the user as present, or changing a "present" determination for that user to a "not present" determination.

In some embodiments, the presence criteria include sound-detection criteria that is satisfied when the output from the microphone on the sound-receiving device 1008 corresponds to the first sound 1006 for playback on sound-playback device 1002. For example, device 1001 optionally determines whether sound-receiving device 1008 detected the first sound 1006 played by the sound-playback device 1002 by comparing the first sound with the output from the microphone on the sound-receiving device. If the output from the microphone and the first sound 1006 match, then in some embodiments, the sound-detection criteria is satisfied.

In some embodiments, the presence criteria also include verification criteria that is satisfied when presence of the sound-receiving device 1008 at the sound-playback device 1002 is verified using something other than the first sound 1006. In other words, the verification criteria is optionally satisfied when device 1001 verifies that sound-receiving device 1008 is present at sound-playback device 1002 in a way other than through detection of first sound 1006. Some such verification methods optionally include facial recognition and/or sound-receiving device 1008 motion checks, as will be described in more detail below. Thus, in some embodiments, the user of the sound-receiving device 1008 is not designated as being present at sound-playback device 1002 until both the sound-detection criteria and the verification criteria are satisfied.

In some embodiments, designating the user of sound-receiving device 1008 as being present at sound-playback device 1002 includes determining a user associated with the sound-receiving device (e.g., determining who uses, owns, or is registered on the sound-receiving device), and designating that user as being present at the sound-playback device.

In some embodiments, prior to generating first sound 1006 for playback on sound-playback device 1002, device 1001 optionally transmits a wake command to sound-receiving device 1008 to request that the sound-receiving device turn on its microphone. For example, device 1001 optionally sends a wireless signal to a mobile device to have the mobile device turn on its microphone. In this way, sound-receiving device 1008 need not always keep its microphone on, preserving battery life.

In some embodiments, the verification criteria include a criterion that is satisfied when a face of the user of the sound-receiving device 1008 is recognized at the sound-playback device 1002. In such cases, device 1001 optionally ensures via facial recognition that the relevant user is at sound-playback device 1002 before designating that user as being present. In some embodiments, sound-playback device 1002 has a camera (such as an RGB, IR and/or depth camera) from which device 1001 optionally analyzes one or more images to check for facial recognition of the user.

In some embodiments, the verification criteria include a criterion that is satisfied when sound-receiving device 1008 has sensed motion during a most recent time period (e.g., a time period such as the last 1, 5, 15, or 30 minutes). In such cases, device 1001 optionally designates the user as being present at sound-playback device 1002 only if sound-playback device 1008 has recently sensed motion. Device 1001 does this so as to not designate a user as being present when that user has left, for example, their telephone in the room with sound-playback device 1002, and the user is not actually there.

In some embodiments, the verification criteria include a criterion that is satisfied when sound-receiving device 1008 is on the same wireless network (e.g., WiFi network or any wireless communication network) as the sound-playback device. In other words, in such embodiments, device 1001 checks to make sure that sound-playback device 1002 and sound-receiving device 1008 are on the same wireless network before designating the user as being present at the sound-playback device.

In some embodiments, the above presence determination is optionally re-performed when sound-receiving device 1008 has sensed a large amount of motion, to determine whether the large amount of motion corresponds to the user having left the room with the sound-receiving device while previously having been in the room, for example. In such embodiments, device 1001 optionally detects motion of sound-receiving device 1008. In accordance with a determination that the motion exceeds a predefined threshold (e.g., more than a predefined change in location, more than a predefined change in velocity, more than a predefined change in acceleration), the device optionally re-evaluates the plurality of presence criteria as described above to determine whether sound-receiving device 1008 remains at the sound-playback device 1002.

In some embodiments, sound-playback device 1002 is configured to go into, for example, a sleep state after a certain amount of time has passed without any activity being sensed at the sound-playback device. For example, a television is optionally configured to go to sleep after 30 minutes have passed without any input from a remote control or any video input to the television. In such cases, device 1001 optionally forgoes transitioning sound-playback device 1002 into the sleep state when the presence criteria are satisfied. For example, sound-playback device 1002 is optionally configured to transition from a first state (e.g., active or awake state, and optionally also includes a person's status on a chat program, for example) to a second state (e.g., inactive or sleep state, also optionally including a person's status on the chat program, for example) in response to one or more transition criteria (e.g., lack of activity in the user interface of the sound-playback device for longer than a threshold time period) being satisfied at the sound-playback device (e.g., transitioning a person's chat program status from "active" to "inactive" after a threshold time period of inactivity). However, in accordance with the determination that the plurality of presence criteria are satisfied, device 1001 optionally forgoes transitioning from the first state of the sound-playback device to the second state of the sound-playback device in response to the one or more transition criteria being satisfied at the sound-playback device. In other words, despite the one or more transition criteria being met, device 1001 optionally maintains the sound-playback device 1002 in the first (e.g., active or awake) state due to the determined presence of the person at the sound-playback device.

Figure 11A:
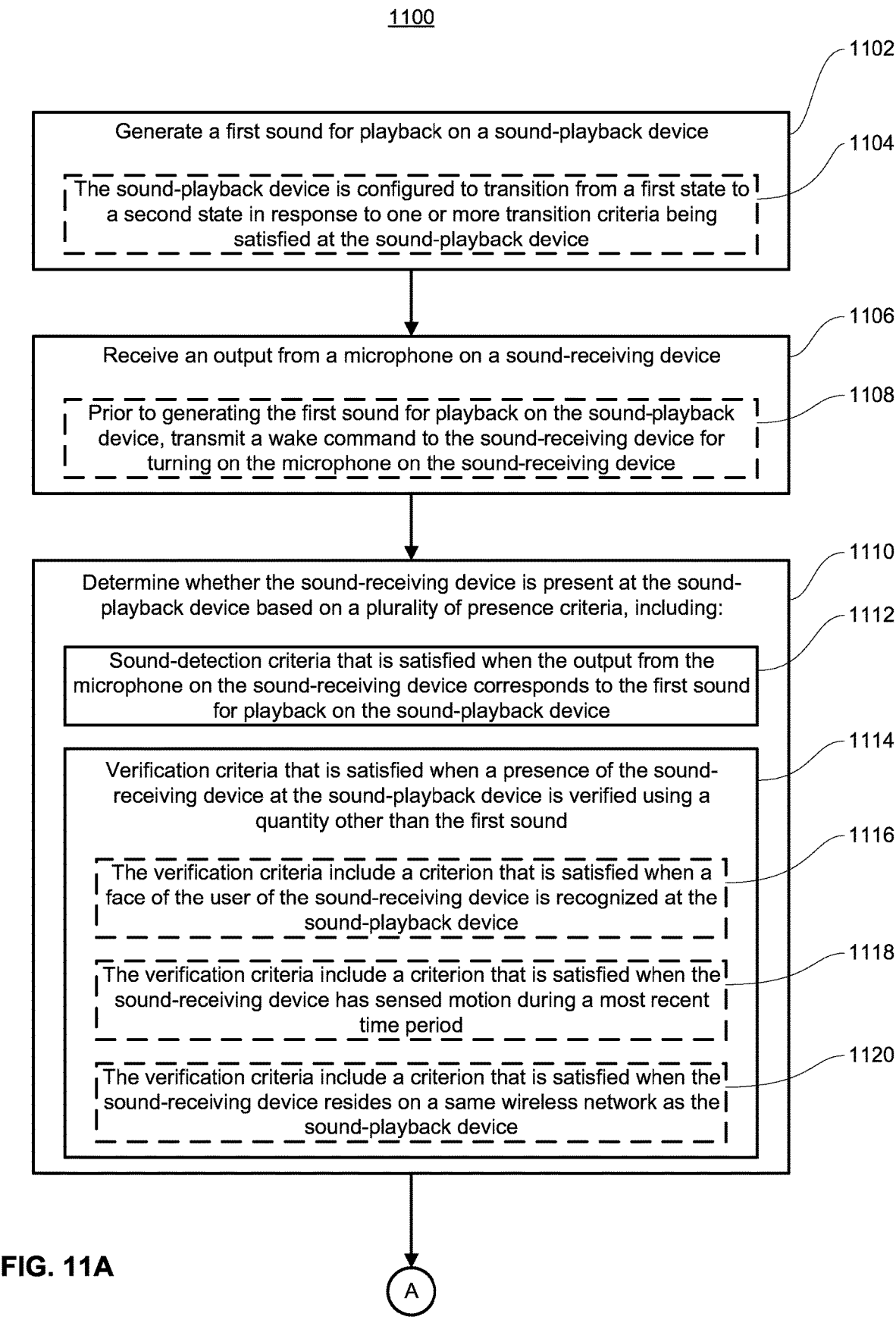
FIGS. 11A-11B are flow diagrams illustrating a method of performing presence detection in accordance with some embodiments.
Figure 11B:
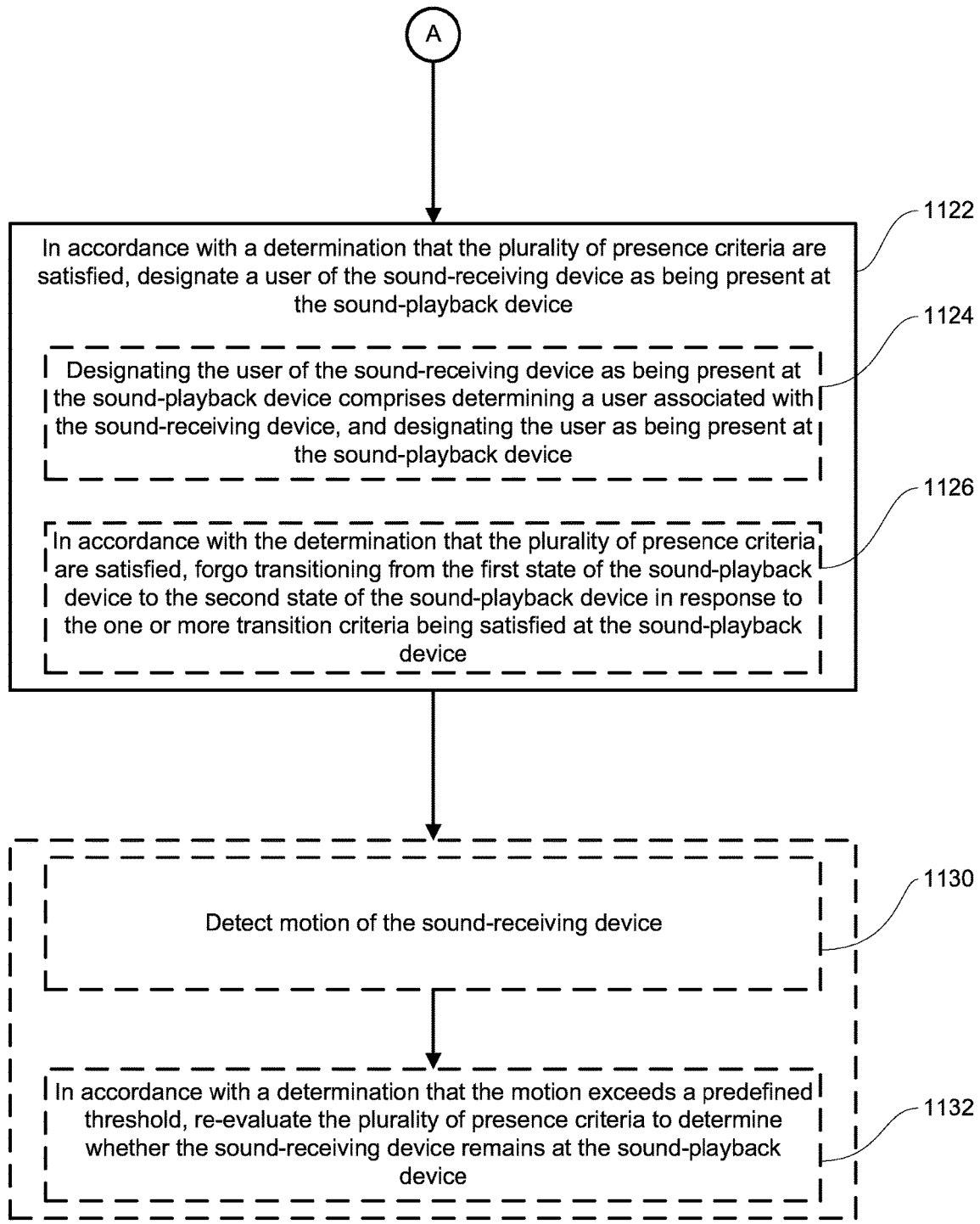

FIGS. 11A-11B are flow diagrams illustrating a method 1100 of performing presence detection in accordance with some embodiments (e.g., as described above with reference to FIG. 10). The method 1100 is performed at an electronic device such as device 500 as described above with reference to FIG. 5, including a set top box or other user interface generating device that is in communication with a remote control and a display device. Some operations in method 1100 are, optionally, combined and/or the order of some operations is, optionally, changed.

As described below, the method 1100 provides ways in which a device optionally determines the presence of a user without a user needing to manually designate his/her presence. The method reduces the cognitive burden on a user when interacting with the device, and reduces the need for the user to physically interact with the device, thereby creating a more efficient human-machine interface. For battery-operated electronic devices, increasing the efficiency of the user's interaction with the device conserves power and increases the time between battery charges.

In some embodiments, an electronic device (e.g., a set top box or other user interface generating device that is in communication with a remote control and a display device, such as device 1001 in FIG. 10) with one or more processors and memory generates (1102) a first sound (e.g., an audible or inaudible sound that is outside of the normal range of hearing for a human (below 20 Hz or above 20,000 Hz), such as first sound 1006 in FIG. 10) for playback on a sound-playback device (e.g., a speaker or any device having a speaker, such as a television and/or device 1002 in FIG. 10). In some embodiments, the sound-playback device is configured to transition from a first state (e.g., active or awake state, and optionally also includes a person's status on a chat program, for example) to a second state (e.g., inactive or asleep state, also optionally including a person's status on the chat program, for example) in response to one or more transition criteria (e.g., lack of activity in the user interface for longer than a threshold time period) being satisfied at the sound-playback device (1104) (e.g., transitioning a person's chat program status from "active" to "inactive" after a threshold time period of inactivity).

In some embodiments, the device receives (1106) (e.g., via wireless communication, such as Bluetooth LE) an output from a microphone on a sound-receiving device (e.g., a microphone or any device having a microphone, such as a mobile and/or wearable device, sending data resulting from detecting the first sound to the electronic device; for example, device 1008 in FIG. 10). In some embodiments, prior to generating the first sound for playback on the sound-playback device, the device transmits a wake command to the sound-receiving device for turning on the microphone on the sound-receiving device (1108) (e.g., the device sends a wireless signal to a mobile device to have the mobile device turn on its microphone).

In some embodiments, the device determines (1110) whether the sound-receiving device is present at the sound-playback device based on a plurality of presence criteria, including sound-detection criteria that is satisfied when the output from the microphone on the sound-receiving device corresponds to the first sound for playback on the sound-playback device (1112) (e.g., the device determines whether the sound-receiving device detected the first sound played by the sound-playback device by comparing the first sound with the output from the microphone on the sound-receiving device), and verification criteria that is satisfied when a presence of the sound-receiving device at the sound-playback device is verified using a quantity other than the first sound (1114) (e.g., by facial recognition, motion checks, etc.). In some embodiments, the verification criteria include a criterion that is satisfied when a face of the user of the sound-receiving device is recognized at the sound-playback device (1116) (e.g., the device looks for a facial recognition match and a sound-based presence determination before designating the user as present). In some embodiments, the verification criteria include a criterion that is satisfied when the sound-receiving device has sensed motion during a most recent time period (1118) (e.g., a time period such as the last 1, 5, 15, or 30 minutes so as to ignore the sound-based presence determination if the mobile device has been left on a table in the room somewhere). In some embodiments, the verification criteria include a criterion that is satisfied when the sound-receiving device resides on a same wireless network as the sound-playback device (1120) (e.g., the device checks for sound-based presence and whether the sound-playback device and the sound-receiving device are on the same wireless network connection before designating the user as being present).

In accordance with a determination that the plurality of presence criteria are satisfied, in some embodiments, the device designates (1122) a user of the sound-receiving device as being present at the sound-playback device (e.g., when the presence criteria are satisfied with respect to a mobile phone, a user of the mobile phone is determined to be present at the sound-playback device. If the presence criteria are not satisfied with respect to the mobile phone, the user of the mobile phone is determined to be not present at the sound-playback device—this determination optionally encompasses simply not designating the user as present, or changing a "present" determination for that user to a "not present" determination). In some embodiments, designating the user of the sound-receiving device as being present at the sound-playback device comprises determining a user associated with the sound-receiving device (e.g., determining who uses, owns, or is registered on the sound-receiving device), and designating the user as being present at the sound-playback device (1124). In some embodiments, in accordance with the determination that the plurality of presence criteria are satisfied, the device forgoes (1126) transitioning from the first state of the sound-playback device to the second state of the sound-playback device in response to the one or more transition criteria being satisfied at the sound-playback device (e.g., despite the one or more transition criteria being met, maintaining the sound-playback device in the first (e.g., active or awake) state due to the presence of the person in front of the display device).

In some embodiments, the device detects (1130) motion of the sound-receiving device. In some embodiments, in accordance with a determination that the motion exceeds a predefined threshold (e.g., more than a predefined change in location, more than a predefined change in velocity, more than a predefined change in acceleration), the device re-evaluates (1132) the plurality of presence criteria to determine whether the sound-receiving device remains at the sound-playback device (e.g., the device determines whether a user has left the room while previously having been in the room).

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIGS. 11A-11B. For brevity, these details are not repeated here.

The operations in the information processing methods described above are, optionally implemented by running one or more functional modules in an information processing apparatus such as general purpose processors (e.g., as described above with respect to FIGS. 1A, 3 and 5) or application specific chips.

The operations described above with reference to FIGS. 11A-11B are, optionally, implemented by components depicted in FIGS. 1A-1B. For example, generation operation 1102, receiving operation 1106, determination operation 1110 and designation operation 1122 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Distance Determination

Displaying different user interfaces on a device based on whether a person is far away from the device or close to the device can enhance the person's interaction with the device. For example, a television can present a user interface with large user interface elements that provide summary information (e.g., information about the current program and the next program) when a person is far away from the television, and can present more detailed information (e.g., a program guide with information about programs from multiple channels and multiple time slots) when the person is close to the television. The embodiments described below describe ways in which a person's interaction with a device can be enhanced by providing different user interfaces at different distances. Enhancing a person's interactions with a device reduces the amount of time needed by the person to perform operations, and thus reduces the power usage of the device and increases battery life for battery-powered devices.

Figure 12A:
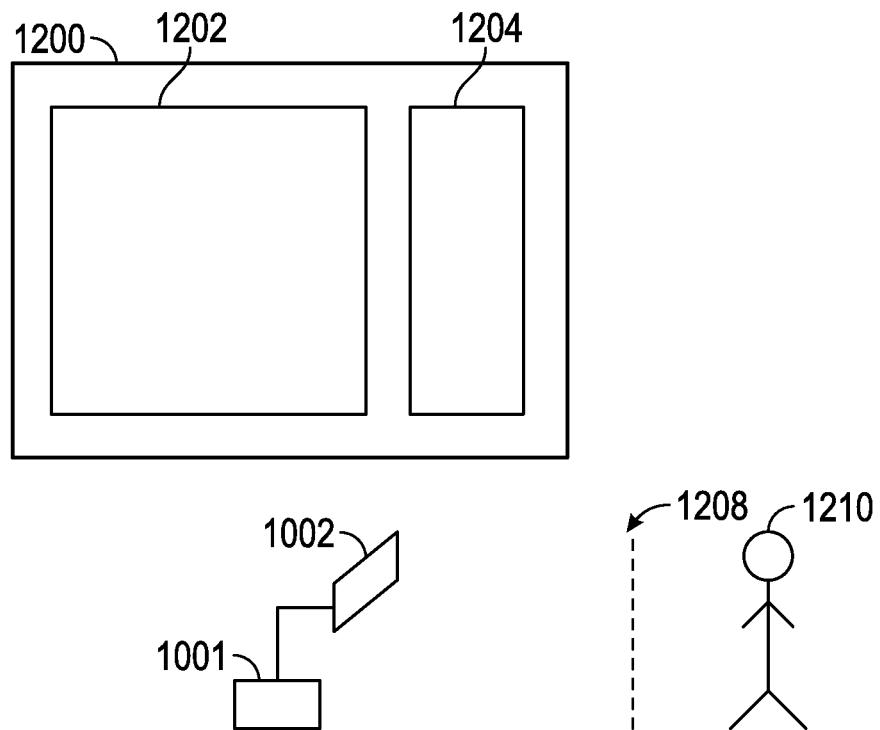
FIGS. 12A-12B illustrate exemplary ways in which different user interfaces can be presented at different distances in accordance with some embodiments of the disclosure.
Figure 12B:
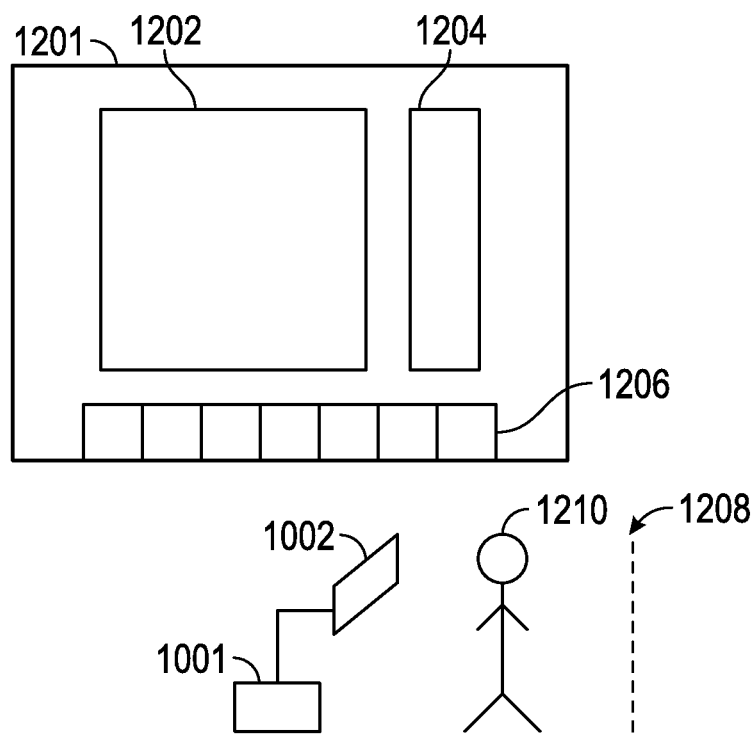
Figure 13B:
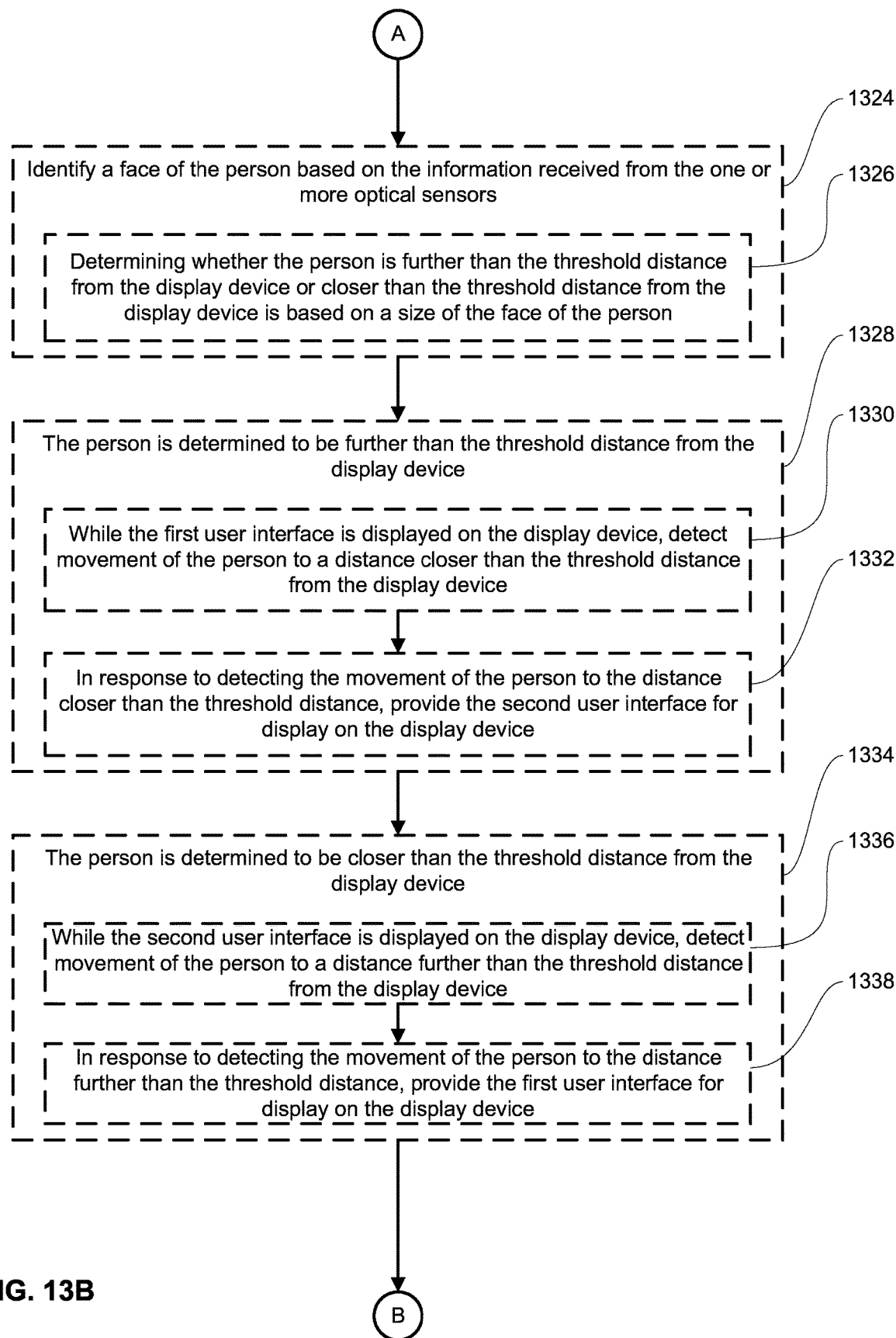
Figure 13C:
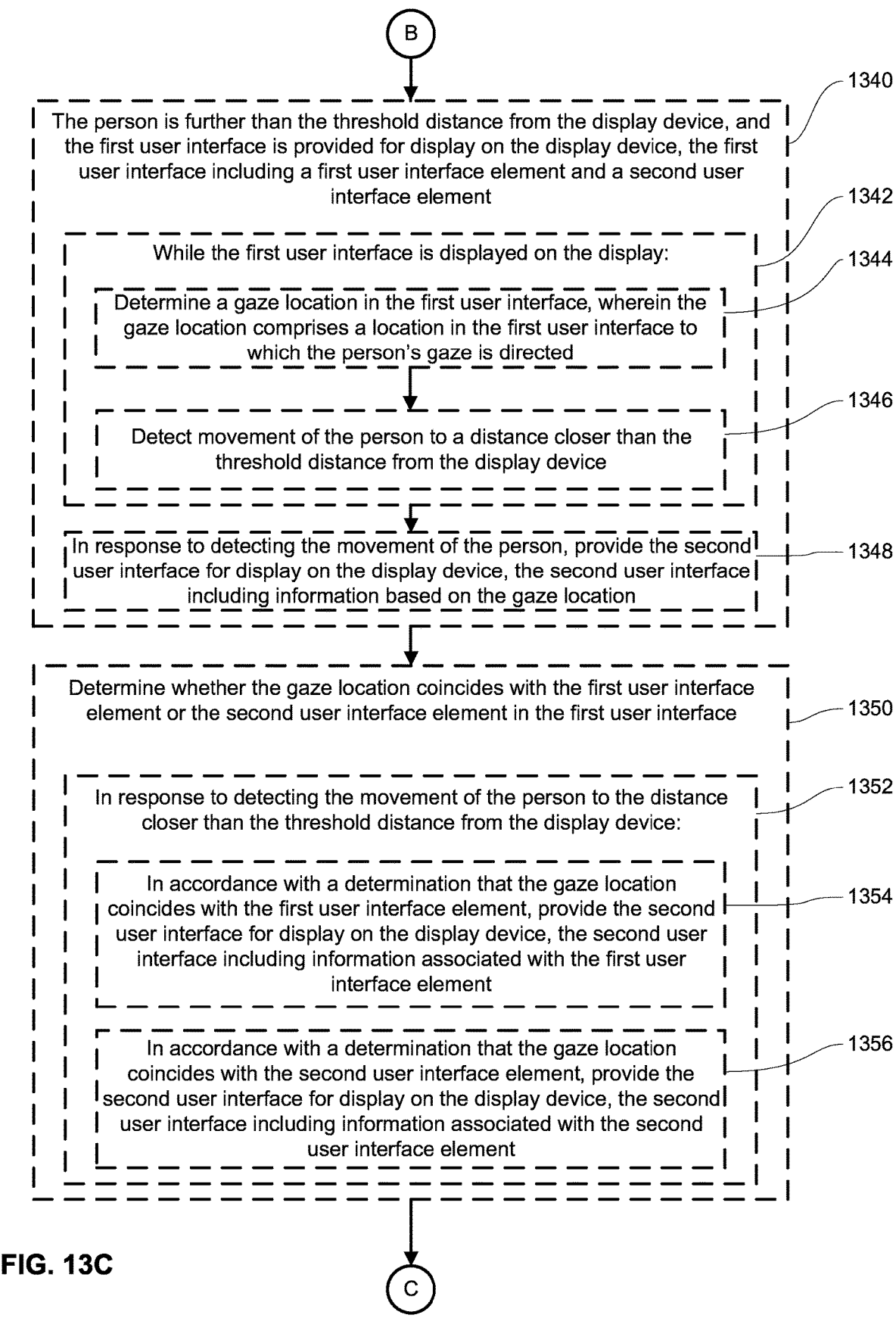
Figure 13D:
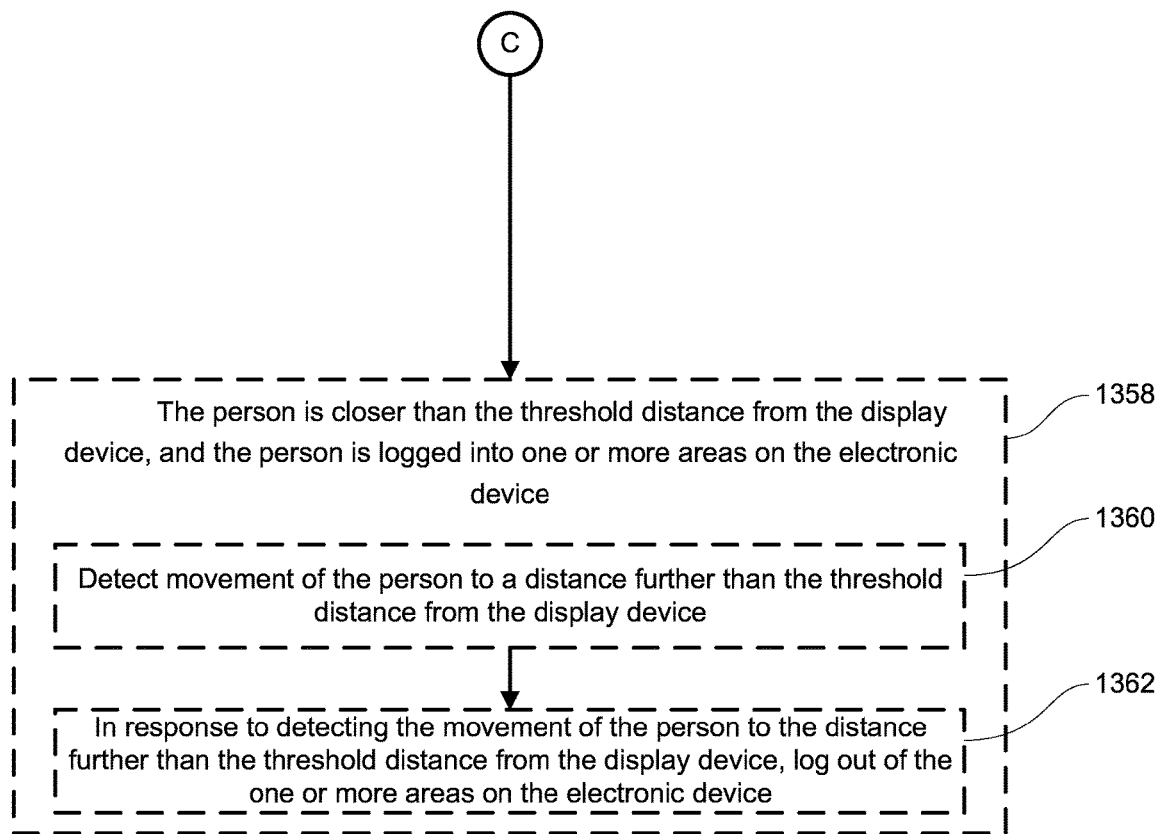

FIGS. 12A-12B illustrate exemplary ways in which different user interfaces are optionally presented at different distances in accordance with some embodiments of the disclosure. The embodiments in these figures are used to illustrate the processes described below, including the processes described with reference to FIGS. 13A-13D.

FIG. 12A illustrates an exemplary user interface 1200 for display on display device 1002 when person 1210 is far from the display device. Display device 1002 is optionally any display device, such as a television or other display device. Display device 1002 is optionally coupled to device 1001, which is optionally a device such as device 500 as described above with reference to FIG. 5, including a set top box or other user interface generating device that is in communication with a remote control and a display device.

In some embodiments, device 1001 determines whether person 1210 is further than threshold distance 1208 from display device 1002, or closer than the threshold distance from the display device. Device 1001 optionally makes this distance determination based on information received from one or more optical sensors, such as IR, depth and/or RGB cameras. In the illustrated embodiment, person 1210 is further than threshold distance 1208 from display device 1002. Threshold distance 1208 is optionally any number of distances, fixed or variable, such as $\frac{1}{10}$, $\frac{1}{2}$, 1, 3, or 5 meters from display device 1002.

If, as illustrated in FIG. 12A, device 1001 determines that person 1210 is further than threshold distance 1208 from display device 1002, the device optionally provides user interface 1200 for display on the display device. User interface 1200 is optionally any user interface suited for or intended for presentation when person 1210 is further than threshold distance 1208 from display device 1002. For example, user interface 1200 is optionally a user interface including summary information, a screen saver, application windows without relatively small user interface elements, user interface elements at a relatively large size, and/or status information (e.g., date, time, weather, news headlines, stock prices, number of unread emails, etc.). In the illustrated embodiment, user interface 1200 includes two user interface elements 1202 and 1204. User interface element 1202 is optionally a content item, such as a video or an image. User interface element 1204 is optionally an information bar, providing information about the content item (e.g., user interface element 1202), such as a title and a description.

FIG. 12B illustrates an exemplary user interface 1201 for display on display device 1002 when person 1210 is close to the display device. In the illustrated embodiment, device 1001 has determined that person 1210 is closer than threshold distance 1208 from display device 1002. Thus, device 1001 optionally provides user interface 1201 for display on display device 1002. User interface 1201 is optionally any user interface suited for or intended for presentation when person 1210 is closer than threshold distance 1208 from display device 1002. For example, user interface 1201 is optionally a user interface including detailed information, a home screen, application windows including relatively small user interface elements, and/or user interface elements at a relatively small size. In the illustrated embodiment, user interface includes three user interface elements 1202, 1204, and 1206. User interface elements 1202 and 1204 are optionally smaller versions of the same user interface elements that were in user interface 1200 (e.g., the user interface that is displayed when the person is far away from the display device). User interface element 1206 is optionally a user interface element that is not included in user interface 1200 (e.g., the user interface that is displayed when the person is far away from the display device), and is only included in user interface 1201. For example, user interface element 1206 is optionally a channel or application bar from which various content (such as media content or applications) is optionally accessed. User interface element 1206 is optionally only included in user interface 1201 because it is optionally better suited for close viewing/interaction as opposed to far viewing/interaction.

As described above, device 1001 optionally provides a different user interface for display on display device 1002 depending on whether person 1210 is further than or closer than threshold distance 1208 from display device 1002.

In some embodiments, the device optionally identifies a face of the person based on the information received from the one or more optical sensors. In such implementations, the determination as to whether the person is further than the threshold distance from the display device or closer than the threshold distance from the display device is optionally based on the size of the face of the person (e.g., by comparing the size of face to a "standard" sized face known to be at a reference distance, and extrapolating the person's distance based on the comparison).

In some embodiments, the device optionally detects movement of the person from a distance further than the threshold distance to a distance closer than the threshold distance from the display device. In response to detecting the movement, the device optionally provides the "close" user interface (e.g., the user interface that is displayed when the person is near to the display device) for display on the display device.

In some embodiments, the device optionally detects movement of the person from a distance closer than the threshold distance to a distance further than the threshold distance from the display device. In response to detecting the movement, the device optionally provides the "far" user interface (e.g., the user interface that is displayed when the person is far from the display device) for display on the display device.

In some embodiments, the person is further than the threshold distance from the display device, and the "far" user interface is provided for display on the display device. The "far" user interface optionally includes a first user interface element (e.g., an email graphic) and a second user interface element (e.g., a music collection graphic). While the "far" user interface is displayed on the display device, the device optionally determines a gaze location in the "far" user interface, where the gaze location is a location in the "far" user interface to which the person looking. The device optionally detects movement of the person to a distance closer than the threshold distance from the display device (e.g., the person is moving towards the display device). In response to detecting the movement of the person, the device provides the "close" user interface (e.g., the user interface that is displayed when the person is near the display device) for display on the display device, where the "close" user interface includes information based on the gaze location. For example, when a person is looking at an email, when the person moves closer to the display, additional details about the email are optionally displayed (e.g., a sender, other recipients, timestamps, etc.). As another example, if the person is looking at an image of cover art for a music album, when the person moves closer to the display, additional details about the album are displayed (e.g., a track list, artist, track times, etc.). Optionally, when the additional information is displayed based on the gaze location, additional information is not displayed for other user interface elements that the person is not looking at (e.g., when cover art for multiple albums is displayed, a track list is only displayed for the album corresponding to the cover art that the person is looking at when the person gets closer to the display and is not displayed for other albums).

In some embodiments, the device logs the person out of any areas the person might be logged into when the person moves away from the display device. For example, the person might be close to the display device, and logged into one or more areas on the device (e.g., iTunes store, email service, etc.). The device optionally detects movement of the person to a distance further than the threshold distance from the display device (e.g., the person is moving away from the display device), and in response, optionally logs out of the one or more areas on the electronic device. For example, the device optionally logs out of the person's iTunes store account when that person leaves the display device.

In some embodiments, the "far" and "close" user interfaces include the same user interface element at different sizes. For example, the "far" user interface optionally includes a user interface element (e.g., text string, application window, button, etc.) at a first size. The "close" user interface optionally includes the same user interface element at a second size, smaller than the first size.

In some embodiments, the "far" user interface provides summary information about something, and the "close" user interface provides detailed information about that same thing. For example, the "far" user interface optionally includes summary information about a first quantity (e.g., weather, unread emails, etc.), and the "close" user interface optionally includes detailed information about the first quantity. Thus, in some embodiments, the "far" user interface optionally includes a snapshot of the weather, such as a high temperature, low temperature, and current temperature for the current day, and the "close" user interface optionally includes more detailed information about the weather, such as the above temperatures as well as the humidity, chance of rain, wind, and wind chill for the current day.

In some embodiments, the "far" user interface does not include one or more user interface elements that are optionally included in the "close" user interface. For example, the "close" user interface optionally includes application windows, a menu bar and an application dock. Because the menu bar and application bar could be difficult to view and/or interact with at a distance, the "far" user interface optionally includes only the application windows, and not the menu bar or the application dock.

FIGS. 13A-13D are flow diagrams illustrating a method 1300 of providing different user interfaces at different distances in accordance with some embodiments (e.g., as described above with reference to FIGS. 12A-12B). The method 1300 is performed at an electronic device such as device 500 as described above with reference to FIG. 5, including a set top box or other user interface generating device that is in communication with a remote control and a display device. Some operations in method 1300 are, optionally, combined and/or the order of some operations is, optionally, changed.

As described below, the method 1300 provides ways in which a device optionally provides different user interfaces based on the distance of a user from a display device. The method reduces the cognitive burden on a user when interacting with a user interface on the device, and reduces the need for the user to physically interact with the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 1001 in FIG. 12A) with one or more processors and memory determines (1302) whether a person (e.g., person 1210 in FIG. 12A) is further than a threshold distance (e.g., further than a distance such as $\frac{1}{10}$, $\frac{1}{2}$, 1, 3 or 5 meters, such as distance 1208 in FIG. 12A) from a display device (e.g., a television or other display device, such as device 1002 in FIG. 12A) or closer than the threshold distance from the display device. In some embodiments, determining whether the person is further than the threshold distance from the display device or closer than the threshold distance from the display device is based on information received from one or more optical sensors (1304) (e.g., IR, depth, and/or RGB cameras).

In accordance with a determination that the person is further than the threshold distance from the display device, in some embodiments, the device provides (1306) a first user interface (e.g., a user interface including summary information, a screen saver, application windows without small user interface elements, user interface elements at a larger size, status information (e.g., date, time, weather, news headlines, stock prices, number of unread emails), such as user interface 1200 in FIG. 12A) for display on the display device. In some embodiments, the first user interface (e.g., the user interface that is displayed when the user is far away from the display device) includes a user interface element (e.g., text string, application window, button, etc.) at a first size (1308) (e.g., user interface element 1202 in FIG. 12A). In some embodiments, the first user interface includes summary information about a first quantity (1310) (e.g., weather, unread emails, etc.). In some embodiments, the first user interface includes a first set of user interface elements (1312) (e.g., application windows, such as user interface elements 1202 and 1204 in FIG. 12A).

In accordance with a determination that the person is closer than the threshold distance from the display device, in some embodiments, the device provides (1314) a second user interface (e.g., a user interface including detailed information, a home screen, application windows including small user interface elements, user interface elements at a smaller size, such as user interface 1201 in FIG. 12B) for display on the display device. In some embodiments, the second user interface is different than the first user interface (1316). In some embodiments, the second user interface (e.g., the user interface that is displayed when the user is near to the display device) includes the user interface element (e.g., text string, application window, button, etc.) at a second size, smaller than the first size (1318) (e.g., user interface element 1202 in FIG. 12B). In some embodiments, the second user interface includes detailed information about the first quantity (1320) (e.g., the first user interface includes a snapshot of the weather, such as a high temperature, low temperature, and current temperature for the current day, and the second user interface includes more detailed information about the weather, such as the above temperatures as well as the humidity, chance of rain, wind, and wind chill for the current day). In some embodiments, the second user interface includes the first set of user interface elements (e.g., the application windows that were displayed when the user was far away from the device, such as user interface elements 1202 and 1204 in FIGS. 12A and 12B) and a second set of user interface elements (1322) (e.g., a relatively small menu bar and dock, such as user interface element 1206 in FIG. 12B, and the application windows that were displayed when the user was far away from the device).

In some embodiments, the device identifies (1324) a face of the person based on the information received from the one or more optical sensors. In some embodiments, determining whether the person is further than the threshold distance from the display device or closer than the threshold distance from the display device is based on a size of the face of the person (1326) (e.g., the device compares the size of the face to a "standard" sized face known to be at a reference distance, and extrapolates the person's distance based on the comparison).

In some embodiments, the person is determined to be further than the threshold distance (e.g., further than a distance such as ⅒, ½, 1, 3 or 5 meters) from the display device (1328). In some embodiments, while the first user interface (e.g., the user interface that is displayed when the user is far away from the display device) is displayed on the display device, the device detects (1330) movement of the person to a distance closer than the threshold distance from the display device. In some embodiments, in response to detecting the movement of the person to the distance closer than the threshold distance, the device provides (1332) the second user interface (e.g., the user interface that is displayed when the user is near to the display device) for display on the display device.

In some embodiments, the person is determined to be closer than the threshold distance (e.g., closer than a distance such as ⅒, ½, 1, 3 or 5 meters) from the display device (1334). In some embodiments, while the second user interface (e.g., the user interface that is displayed when the user is near to the display device) is displayed on the display device, the device detects (1336) movement of the person to a distance further than the threshold distance from the display device. In some embodiments, in response to detecting the movement of the person to the distance further than the threshold distance, the device provides (1338) the first user interface (e.g., the user interface that is displayed when the user is far away from the display device) for display on the display device.

In some embodiments, the person is further than the threshold distance (e.g., further than a distance such as ⅒, ½, 1, 3 or 5 meters) from the display device, and the first user interface (e.g., the user interface that is displayed when the user is far away from the display device) is provided for display on the displace display device, the first user interface including a first user interface element (e.g., an email graphic) and a second user interface element (1340) (e.g., a music collection graphic). In some embodiments, while the first user interface is displayed on the display (1342) the device determines (1344) a gaze location in the first user interface, wherein the gaze location comprises a location in the first user interface to which the person's gaze is directed, and detects (1346) movement of the person to a distance closer than the threshold distance from the display device (e.g., the person is moving towards the display device). In some embodiments, in response to detecting the movement of the person, the device provides (1348) the second user interface (e.g., the user interface that is displayed when the user is near to the display device) for display on the display device, the second user interface including information based on the gaze location (e.g., based on where in the user interface the person is looking). For example, when a person is looking at an email, when the person moves closer to the display, additional details about the email are displayed (e.g., a sender, other recipients, timestamps, etc.). As another example, if the person is looking at an image of cover art for a music album, when the person moves closer to the display, additional details about the album are displayed (e.g., a track list, artist, track times, etc.). Optionally, when the additional information is displayed based on the gaze location, additional information is not displayed for other user interface elements that the person is not looking at (e.g., when cover art for multiple albums is displayed, a track list is only displayed for the album corresponding to the cover art that the person is looking at when the person gets closer to the display and is not displayed for other albums).

In some embodiments, the device determines (1350) whether the gaze location coincides with the first user interface element or the second user interface element in the first user interface (e.g., the device determines whether the person is looking at the email graphic or the music collection graphic). In some embodiments, in response to detecting the movement of the person to the distance closer than the threshold distance from the display device (1352) (e.g., the person is moving towards the display device), in accordance with a determination that the gaze location coincides with the first user interface element (e.g., the person is looking at the email graphic), the device provides (1354) the second user interface (e.g., the user interface that is displayed when the user is near to the display device) for display on the display device, the second user interface including information associated with the first user interface element (e.g., more information about the person's emails, such as email previews, names of senders of unread emails, etc.), and in accordance with a determination that the gaze location coincides with the second user interface element (e.g., the person is looking at the music collection graphic), the device provides (1356) the second user interface (e.g., the user interface that is displayed when the user is near to the display device) for display on the display device, the second user interface including information associated with the second user interface element (e.g., more information about the person's music collection, such as new songs, artists of new songs, etc.).

In some embodiments, the person is closer than the threshold distance from the display device, and the person is logged into one or more areas (e.g., iTunes store, email service, etc.) on the electronic device (1358). In some embodiments, the device detects (1360) movement of the person to a distance further than the threshold distance from the display device (e.g., the person is moving away from the display device). In some embodiments, in response to detecting the movement of the person to the distance further than the threshold distance from the display device, the device logs out (1362) of the one or more areas on the electronic device (e.g., the device logs out of the person's iTunes store account when they leave the display device).

It should be understood that the particular order in which the operations in FIGS. 13A-13D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIGS. 13A-13D. For example, the user interfaces, display device, user interface elements, gaze locations and optical sensors described above with reference to method 1300 optionally have one or more of the characteristics of the user interfaces, display devices, user interface elements, gaze locations and optical sensors described herein with reference to other methods described herein (e.g., methods 700, 900, 1100 and 1500). For brevity, these details are not repeated here.

The operations in the information processing methods described above are, optionally implemented by running one or more functional modules in an information processing apparatus such as general purpose processors (e.g., as described above with respect to FIGS. 1A, 3 and 5) or application specific chips.

The operations described above with reference to FIGS. 13A-13D are, optionally, implemented by components depicted in FIGS. 1A-1B. For example, determination operation 1302, and providing operations 1306 and 1314 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presence Determination

Performing various actions at a device based on whether a person is present at the device can be beneficial in providing that person an enhanced user experience with the device. For example, if a television were able to determine whether a person is in the presence of the television, the television could take certain actions that can enhance the person's experience with the device. The embodiments described below describe ways in which a device can enhance a person's experience with the device based on whether the person is present at the device. Enhancing a person's experience with a device reduces the amount of time needed by the person to perform operations, and thus reduces the power usage of the device and increases battery life for battery-powered devices.

Figure 14A:
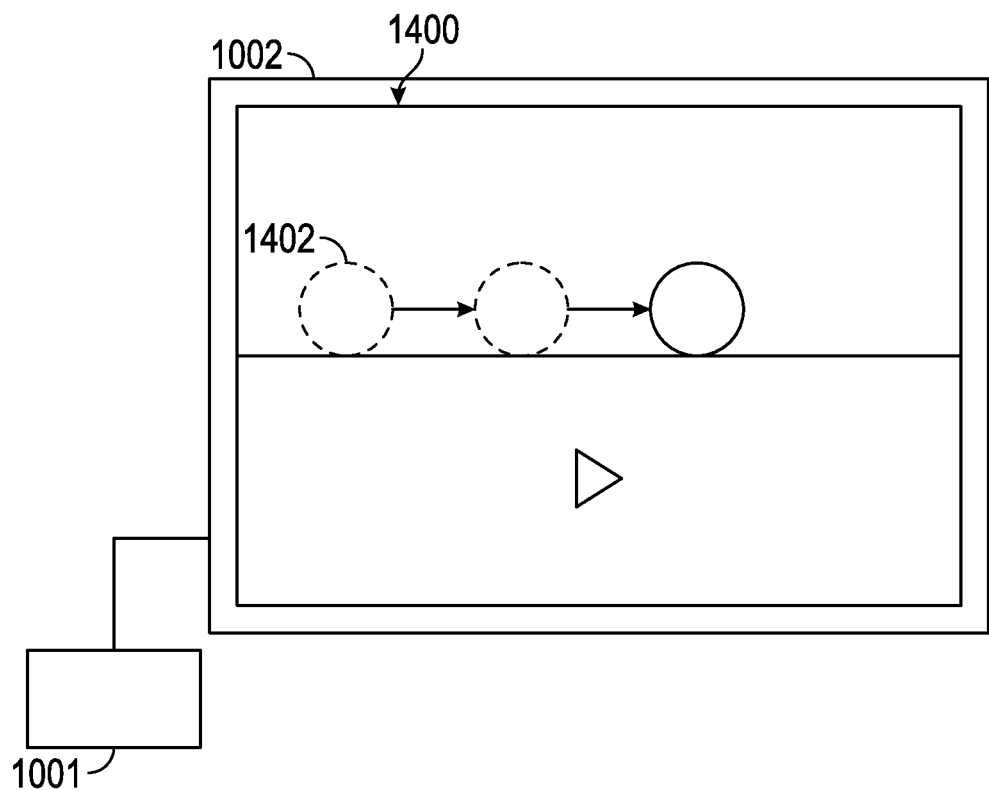
FIGS. 14A-14B illustrate exemplary ways in which a person's experience with a device can be enhanced based on presence detection in accordance with some embodiments of the disclosure.
Figure 14B:
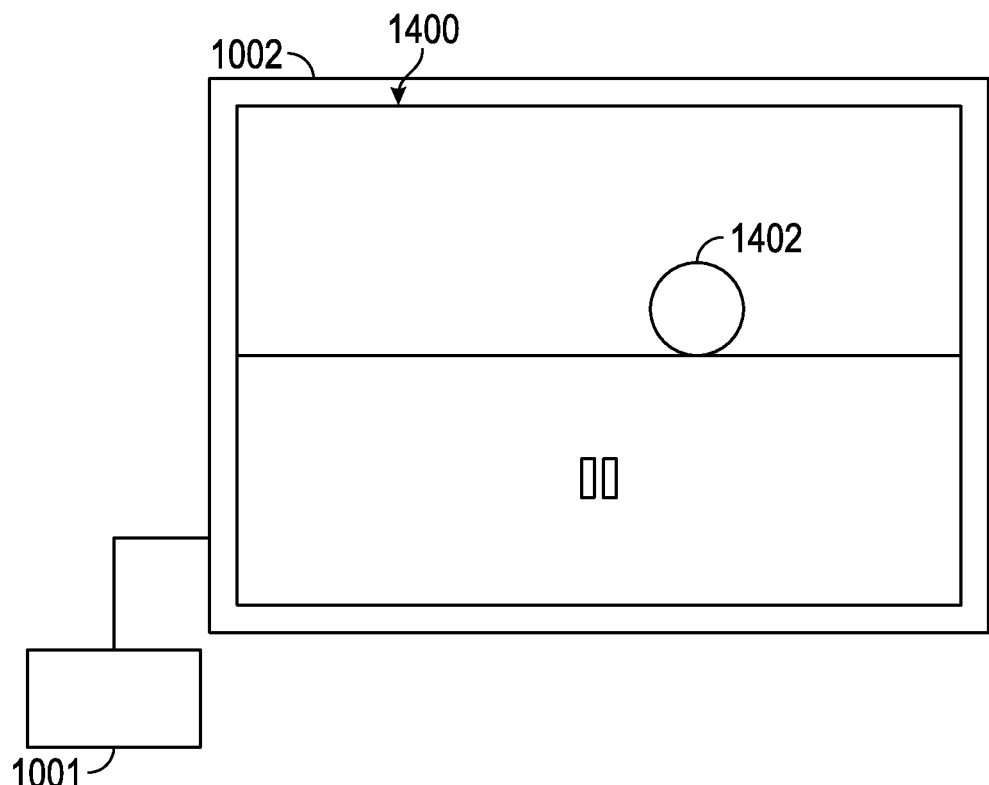

FIGS. 14A-14B illustrate exemplary ways in which a person's experience with a device is optionally enhanced based on presence detection in accordance with some embodiments of the disclosure. The embodiments in these figures are used to illustrate the processes described below, including the processes described with reference to FIGS. 15A-15C.

FIG. 14A illustrates an exemplary user interface 1400 in accordance with embodiments of the disclosure. In the illustrated embodiment, user interface 1400 includes a video of a ball 1402 moving across the screen. In some embodiments, user interface 1400 includes the playing of any media content, such as a movie or music. User interface is optionally for display on display device 1002, which is optionally any type of display device, such as a television. Display device 1002 is optionally coupled to device 1001. Device 1001 is optionally a device such as device 500 as described above with reference to FIG. 5, including a set top box or other user interface generating device that is in communication with a remote control and a display device.

In some embodiments, while the media content is playing in user interface 1400, device 1001 optionally determines whether one or more presence criteria are satisfied. These presence criteria optionally include a criterion that is satisfied while a person is present at display device 1002. In other words, device 1001 optionally determines whether a person is present at display device 1002. If device 1001 determines that a person is present at display device 1002, the device optionally maintains the playing of the media content in user interface 1400, as illustrated. More generally, in some embodiments, if device 1001 determines that the one or more presence criteria are satisfied, the device optionally maintains the playing of the media content in user interface 1400. Whether the one or more presence criteria are satisfied is optionally determined based on information received from one or more optical sensors (e.g., IR, depth, and/or RGB cameras).

FIG. 14B illustrates user interface 1400 when device 1001 determines that the one or more presence criteria are not satisfied. In the illustrated embodiment, device 1001 has determined that a person is not (or no longer) present at display device 1002. As a result, device 1001 optionally modifies the playing of the media content in a first manner. In the illustrated embodiment, device 1001 has paused the playing of the video of the ball 1402 moving across the screen. In some embodiments, in accordance with a determination that the one or more presence criteria are not satisfied, device 1001 pauses the media content (as illustrated), bookmarks a current position in the media content, reduces a volume of the media content, or performs any other modification of the playing of the media content. As such, modification of the playing of media content is based on whether one or more presence criteria are satisfied.

In some embodiments, the device optionally transfers the playing of the media content to another device when the one or more presence criteria are not satisfied. For example, in accordance with a determination that the one or more presence criteria are not satisfied, the device optionally determines a second device (e.g., mobile device) associated with a first person (e.g., the first person's iPhone). Then, the device optionally transfers the playing of the media content to the second device. For example, the device optionally transfers the playing of the media content from the display device to the first person's iPhone in response to determining that the first person is no longer present at the display device. This transfer is optionally accomplished, for example, by transferring an indication of progress of the first person in the media content so that the media content will start playing on the second device where the user left off on the first device. In some embodiments, transferring the playing of the media content includes initiating playback of the media content on the second device. In some embodiments, transferring the playing of the media content includes transferring the media content from the first device to the second device. In some embodiments, the playing of the media content is transferred to the second device without transferring the media content to the second device (e.g., because the content is already present on both devices or because both devices are streaming the content from a remote source such as a video or audio streaming service).

In some embodiments, the device modifies the playing of the media content even if the one or more presence criteria are satisfied. For example, in some embodiments, in accordance with a determination that the one or more presence criteria are satisfied (e.g., the first person is present at the display device), the device optionally determines a relative location of the first person with respect to the display device. In other words, the device optionally determines where in relation to the display device the first person is. Then, the device optionally modifies the playing of the media content in a second manner (e.g., by beamforming the audio of the media content), different from the first manner, based on the relative location of the first person. Thus, in some embodiments, the device optionally adjusts the audio output of the media content to beamform the audio to the first person's position.

In some embodiments, in accordance with a determination that the one or more presence criteria are satisfied (e.g., the first person is present at the display device), the device optionally determines a distance of the first person from the display device, and modifies the playing of the media content in a second manner, different from the first manner, based on the distance of the first person from the display device. For example, in some embodiments, the device adjusts the volume of the media content or the size of the media content in the display based on the distance of the first person from the display device (e.g., if the first person is far from the display device, the device optionally increased the volume of the media content).

In some embodiments, the one or more presence criteria include a criterion that is satisfied when the first person is oriented towards the display device (e.g., the first person's face, shoulders, and/or torso are positioned towards the display device). In some embodiments, the one or more presence criteria include a criterion that is satisfied when the first person's gaze is directed at the display device (e.g., the first person is looking at the display device). In other words, in these embodiments, the device does not count the first person as being "present" unless the first person is oriented towards the display device and/or the first person is looking at the display device. If these criteria are not met, the device optionally determines that the first person is not paying attention to the playing of the media content in the user interface, and modifies the playing of the media content, as described above and/or below.

In some embodiments, the device reacts accordingly when two or more people are present at the display device. For example, while displaying the media content to a single person (e.g., after detecting that the presence criteria are met for the first person), the device optionally detects that two or more people are present at the display device (e.g., detecting that the presence criteria are met for a first person and a second person). In accordance with a determination that two or more people are present at the display device, the device optionally modifies the playing of the media content in a second manner by increasing a visibility (e.g., size, brightness, and placement) of the media content in the user interface. For example, the device optionally enlarges the media content in the user interface to facilitate easier viewing by two or more people concurrently, as each of the two or more people will, in some circumstances, need to be further from the display device than if there were only a single person watching.

In some circumstances, some or all of the media content is designated as private media content, and thus the device is configured to respond accordingly when two or more people are present at the display device. For example, while displaying the media content to a single person (e.g., after detecting that the presence criteria are met for the first person), the device optionally detects that two or more people are present at the display device. In accordance with a determination that two or more people are present at the display device, the device optionally determines whether the media content is designated as private media content (e.g., not to be shared with more than the person associated with it). In accordance with a determination that the media content is designated as private media content, the device optionally modifies the playing of the media content in a second manner by reducing a visibility of the media content (e.g., hiding, fading out, turning off the display device) in the user interface. Thus, the device optionally hinders the viewing of private media content by others.

In some embodiments, in accordance with a determination that the media content is not designated as private media content (e.g., the media content can be shared with more than the person associated with it), the device optionally modifies the playing of the media content in a third manner by increasing the visibility (e.g., size, brightness, placement) of the media content in the user interface (e.g., enlarging the media content in the user interface to facilitate easier viewing by two or more people concurrently, as each of the two or more people will, in some circumstances, need to be further from the display device than if there were only a single person watching).

In some embodiments, when the one or more presence criteria are satisfied, an action is optionally performed on the device based on activity being performed on a second device. For example, in accordance with a determination that the one or more presence criteria are satisfied (e.g., the first person is present at the display device), the device optionally determines whether a second device (e.g., mobile device) is present at the display device with the first person, and whether a specified type of activity (e.g., activities better suited for the display device rather than the mobile device) is being performed on the second device (e.g., mobile device). If so, in accordance with a determination that the second device is present at the display device with the first person and that the specified type of activity is being performed on the second device, the device (the "first device") optionally performs an action on the first device (e.g., a set top box or other user interface generating device that is in communication with a remote control and a display device) based on the activity being performed on the second device.

For example, the first device optionally transfers activity (e.g., playback of media content, video chatting) from the mobile device to the first device (e.g., set top box), and/or provides mobile device status information (e.g., incoming phone call, new email notification, etc.) on the display device (e.g., television). For example, if the first person is engaged in a video chat on a mobile device, when the first person and the mobile device are present at the display device, the first device optionally transfers the video chat from the mobile device to the first device so that the first person can continue the video chat on the display device, which could be a device such as a television. Such a transfer is also optionally performed for playback of media content (e.g., a movie) on the mobile device; specifically, transferring playback of the media content from the mobile device to the first device for display on the display device. As another example, status information about events on a mobile device are optionally provided on the display device when the first person and the mobile device are determined to be present at the display device such that the first person can easily see this information without having to look at the mobile device—status information such as information about incoming phone calls (e.g., caller name and number), new email messages received (e.g., sender name, subject line, first few lines of the email), new text messages received (e.g., sender name, first few lines of the text message), etc.

In some embodiments, the device reverts playback of the media content to its original playback mode when the person returns to the display device. For example, in some embodiments, at a first point in time, the one or more presence criteria are not satisfied (e.g., the person is not present at the display device), and the playing of the media content is modified in the first manner (e.g., pausing the media content, bookmarking a current position in the media content, reducing a volume of the media content). At a second point in time, after the modification of the playing of the media content in the first manner, in some embodiments, the device determines that the one or more presence criteria are satisfied (e.g., the person returns to the display device). In response to determining that the one or more presence criteria are satisfied, the device optionally reverses the modification of the playing of the media content in the first manner (e.g., resuming playback of the media content, increasing the volume of the media content, etc.).

Figure 15A:
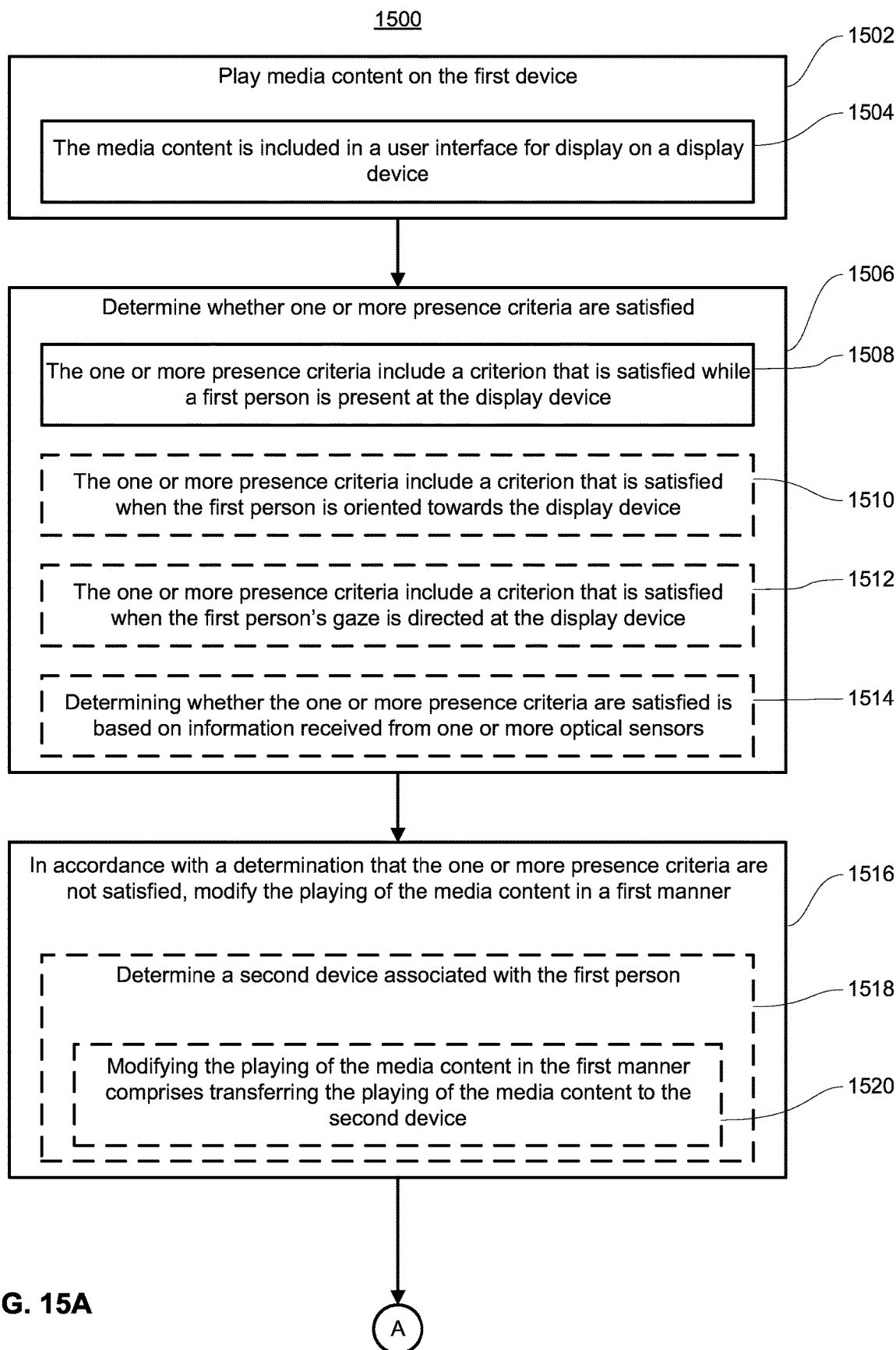
FIGS. 15A-15C are flow diagrams illustrating a method of modifying media content playback based on presence detection in accordance with some embodiments.
Figure 15B:
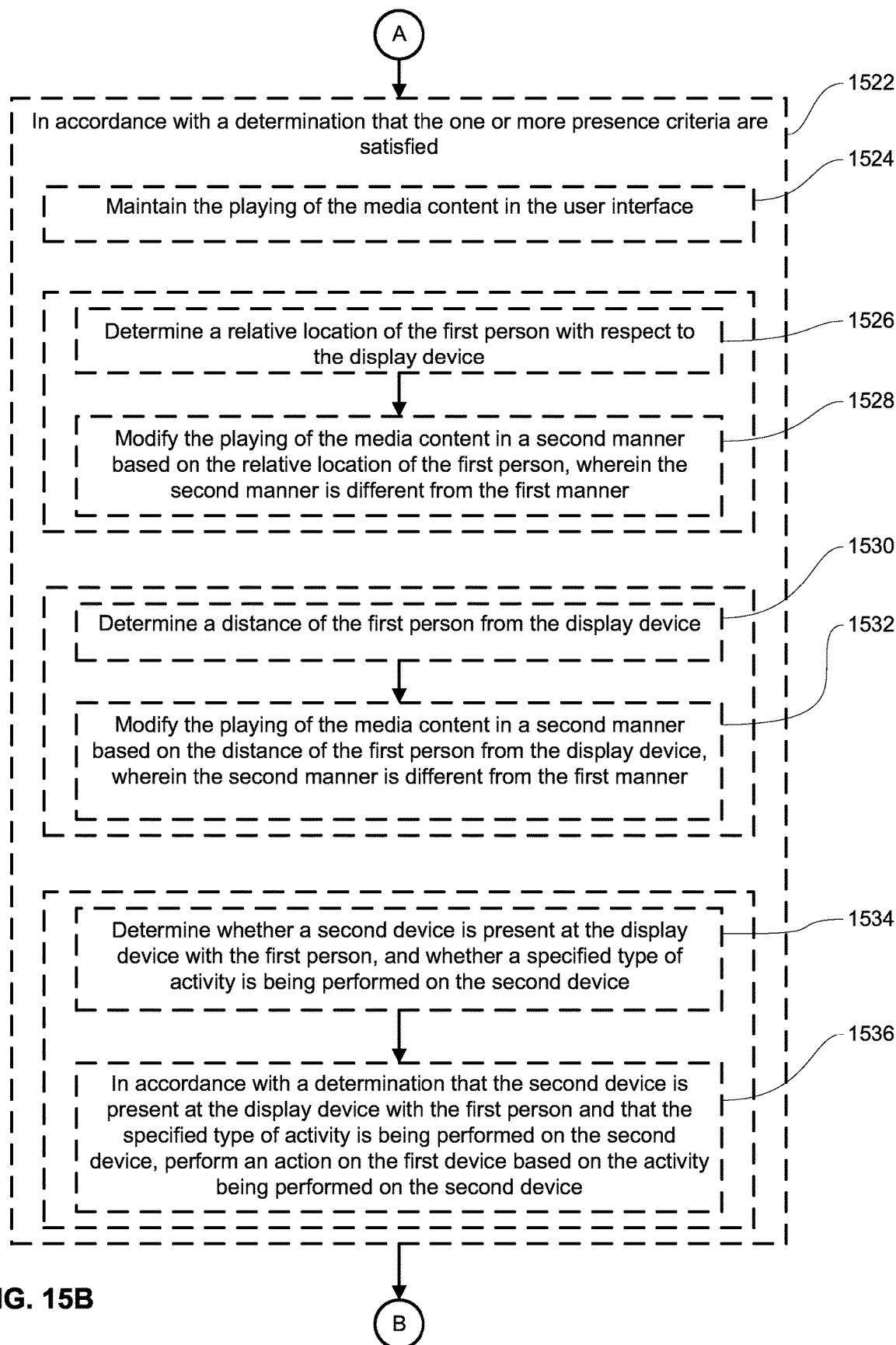
Figure 15C:
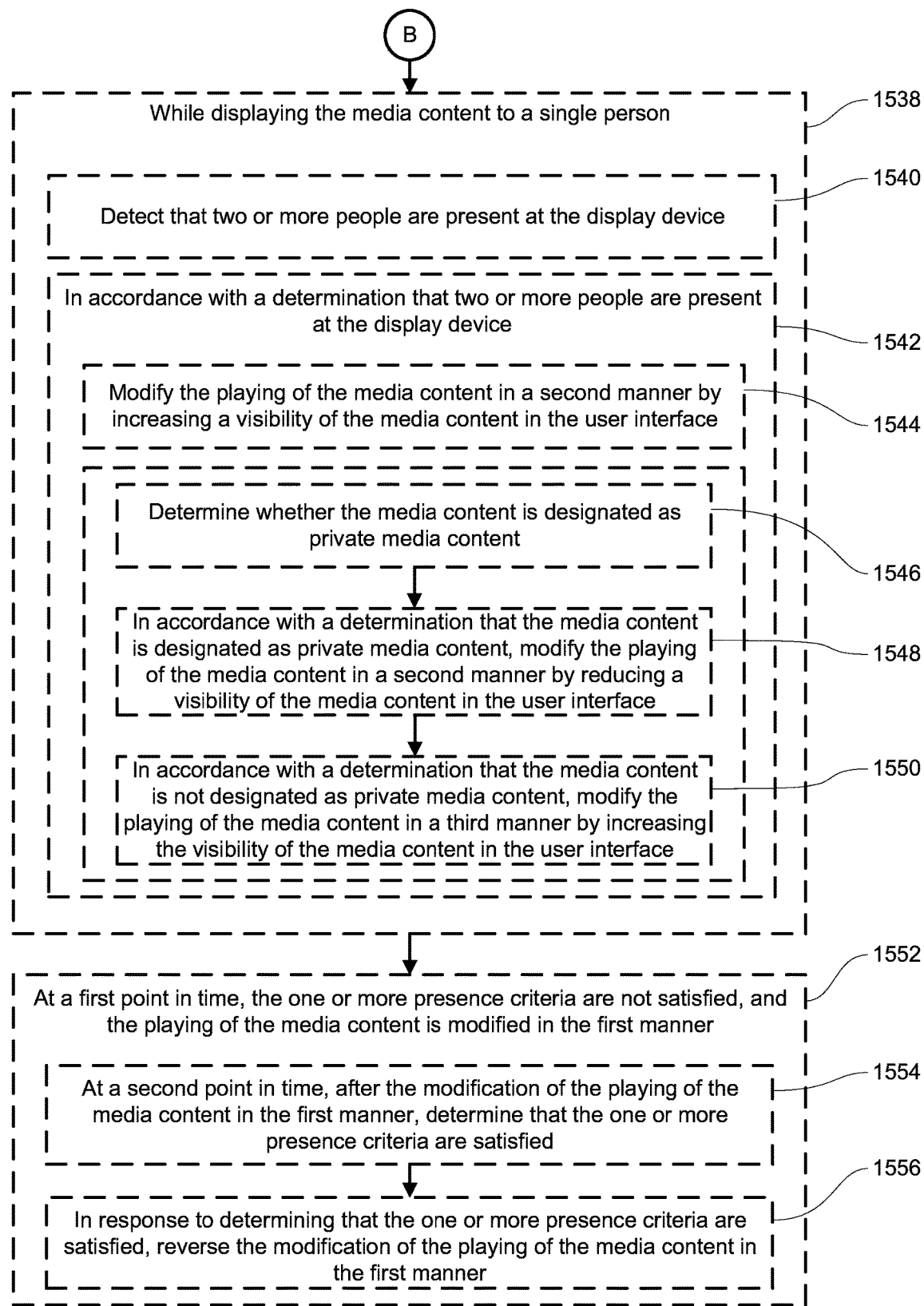

FIGS. 15A-15C are flow diagrams illustrating a method 1500 of modifying media content playback based on presence detection in accordance with some embodiments (e.g., as described above with reference to FIGS. 14A-14B). The method 1500 is performed at an electronic device such as device 500 as described above with reference to FIG. 5, including a set top box or other user interface generating device that is in communication with a remote control and a display device. Some operations in method 1500 are, optionally, combined and/or the order of some operations is, optionally, changed.

As described below, the method 1500 provides ways in which a device optionally modifies the playback of media content in a user interface based on presence detection. The method reduces the cognitive burden on a user when interacting with a user interface on the device, and reduces the need for the user to physically interact with the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 1001 in FIG. 14A) with one or more processors and memory (the "first device") plays (1502) media content (e.g., movie or music, such as the video presented in user interface 1400 in FIG. 14A) on the first device. In some embodiments, the media content is included in a user interface (such as user interface 1400 in FIG. 14A) for display on a display device (1504) (such as display 1002 in FIG. 14A). In some embodiments, the first device determines (1506) whether one or more presence criteria are satisfied. In some embodiments, the one or more presence criteria include a criterion that is satisfied while a first person is present at the display device (1508). In some embodiments, the one or more presence criteria include a criterion that is satisfied when the first person is oriented towards the display device (1510) (e.g., the first person's face, shoulders, and/or torso are positioned towards the display device). In some embodiments, the one or more presence criteria include a criterion that is satisfied when the first person's gaze is directed at the display device (1512) (e.g., the first person is looking at the display device). In some embodiments, determining whether the one or more presence criteria are satisfied is based on information received from one or more optical sensors (1514) (e.g., IR, depth, and/or RGB cameras).

In accordance with a determination that the one or more presence criteria are not satisfied, in some embodiments, the first device modifies (1516) the playing of the media content in a first manner (e.g., pausing the media content, bookmarking a current position in the media content, reducing a volume of the media content, such as is illustrated in FIG. 14B). In some embodiments, the first device determines (1518) a second device (e.g., mobile device) associated with the first person (e.g., the first person's iPhone). In some embodiments, modifying the playing of the media content in the first manner comprises transferring the playing of the media content to the second device (1520) (e.g., transferring the playing of the media content from the display device to the first person's iPhone in response to determining that the first person is no longer present at the display device, for example by transferring an indication of progress of the user in the content so that the content will start playing on the second device where the user left off on the first device). In some embodiments, transferring the playing of the media content includes initiating playback of the content on the second device. In some embodiments, transferring the playing of the media content includes transferring the media content from the first device to the second device. In some embodiments, the playing of the media content is transferred to the second device without transferring the media content to the second device (e.g., because the content is already present on both devices or because both devices are streaming the content from a remote source such as a video or audio streaming service).

In some embodiments, in accordance with a determination that the one or more presence criteria are satisfied (e.g., the first person is present at the display device), the first device maintains (1524) the playing of the media content in the user interface (e.g., the first device continues playing the media content when the first person is present at the display device). In some embodiments, the first device determines (1526) a relative location of the first person with respect to the display device (e.g., where in relation to the display device the first person is present). In some embodiments, the first device modifies (1528) the playing of the media content in a second manner (e.g., beamforming audio associated with the media content) based on the relative location of the first person (e.g., the first device adjusts the audio output of the media content to beamform the audio to the first person's position), wherein the second manner is different from the first manner. In some embodiments, the first device determines (1530) a distance of the first person from the display device. In some embodiments, the first device modifies (1532) the playing of the media content in a second manner (e.g., beamforming audio, adjusting volume, adjusting the size of media content displayed) based on the distance of the first person from the display device, wherein the second manner is different from the first manner. In some embodiments, the first device determines (1534) whether a second device (e.g., mobile device) is present at the display device with the first person, and whether a specified type of activity (e.g., activities better suited for the display device rather than the mobile device) is being performed on the second device. In some embodiments, in accordance with a determination that the second device is present at the display device with the first person and that the specified type of activity is being performed on the second device, the first device (e.g., a set top box or other user interface generating device that is in communication with a remote control and a display device) performs (1536) an action on the first device based on the activity being performed on the second device (e.g., the first device transfers an activity (e.g., playback of media content, video chatting) from the mobile device to the first device (e.g., set top box), provides mobile device status information (e.g., incoming phone calls, new email notifications, etc.) on the display device (e.g., television), etc.). For example, if the first person is engaged in a video chat on a mobile device, when the first person and the mobile device are present at the display device, the first device transfers the video chat from the mobile device to the first device so that the first person can continue the video chat on the display device, which could be a device such as a television. Such a transfer is also optionally performed for playback of media content (e.g., a movie) on the mobile device; specifically, transferring playback of the media content from the mobile device to the first device for display on the display device. As another example, status information about events on a mobile device is optionally provided on the display device when the first person and the mobile device are determined to be present at the display device such that the first person can easily see this information without having to look at the mobile device—status information is optionally information such as information about incoming phone calls (e.g., caller name and number), new email messages received (e.g., sender name, subject line, first few lines of the email), new text messages received (e.g., sender name, first few lines of the text message), etc.

In some embodiments, while displaying the media content to a single person (1538) (e.g., after detecting that the presence criteria are met for the first person), the first device detects (1540) that two or more people are present at the display device (e.g., detecting that the presence criteria are met for a first person and a second person). In some embodiments, in accordance with a determination that two or more people are present at the display device (1542), the first device modifies (1544) the playing of the media content in a second manner by increasing a visibility (e.g., size, brightness, placement) of the media content in the user interface (e.g., enlarging the media content in the user interface to facilitate easier viewing by two or more people concurrently, as each of the two or more people will optionally need to be further from the display device than if there were only a single person watching). In some embodiments, the first device determines (1546) whether the media content is designated as private media content (e.g., not to be shared with more than the person associated with it). In some embodiments, in accordance with a determination that the media content is designated as private media content, the first device modifies (1548) the playing of the media content in a second manner by reducing a visibility of the media content (e.g., hiding, fading out, turning off the display device) in the user interface. In some embodiments, in accordance with a determination that the media content is not designated as private media content (e.g., the media content can be shared with more than the person associated with it), the first device modifies (1550) the playing of the media content in a third manner by increasing the visibility (e.g., size, brightness, placement) of the media content in the user interface (e.g., enlarging the media content in the user interface to facilitate easier viewing by two or more people concurrently, as each of the two or more people will optionally need to be further from the display device than if there were only a single person watching).

In some embodiments, at a first point in time, the one or more presence criteria are not satisfied (e.g., the person is not present at the display device), and the playing of the media content is modified in the first manner (1552) (e.g., pausing the media content, bookmarking a current position in the media content, reducing a volume of the media content). In some embodiments, at a second point in time, after the modification of the playing of the media content in the first manner, the first device determines (1554) that the one or more presence criteria are satisfied (e.g., the person returns to the display device). In some embodiments, in response to determining that the one or more presence criteria are satisfied, the first device reverses (1556) the modification of the playing of the media content in the first manner (e.g., resuming playback of the media content, increasing the volume of the media content, etc.).

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1300) are also applicable in an analogous manner to method 1500 described above with respect to FIGS. 15A-15C. For example, the user interfaces, display device, media content and optical sensors described above with reference to method 1500 optionally have one or more of the characteristics of the user interfaces, display devices, media content (or content items) and optical sensors described herein with reference to other methods described herein (e.g., methods 700, 900, 1100 and 1300). For brevity, these details are not repeated here.

The operations in the information processing methods described above are, optionally implemented by running one or more functional modules in an information processing apparatus such as general purpose processors (e.g., as described above with respect to FIGS. 1A, 3 and 5) or application specific chips.

The operations described above with reference to FIGS. 15A-15C are, optionally, implemented by components depicted in FIGS. 1A-1B. For example, playing operation 1502, determination operation 1506, and modification operation 1516 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
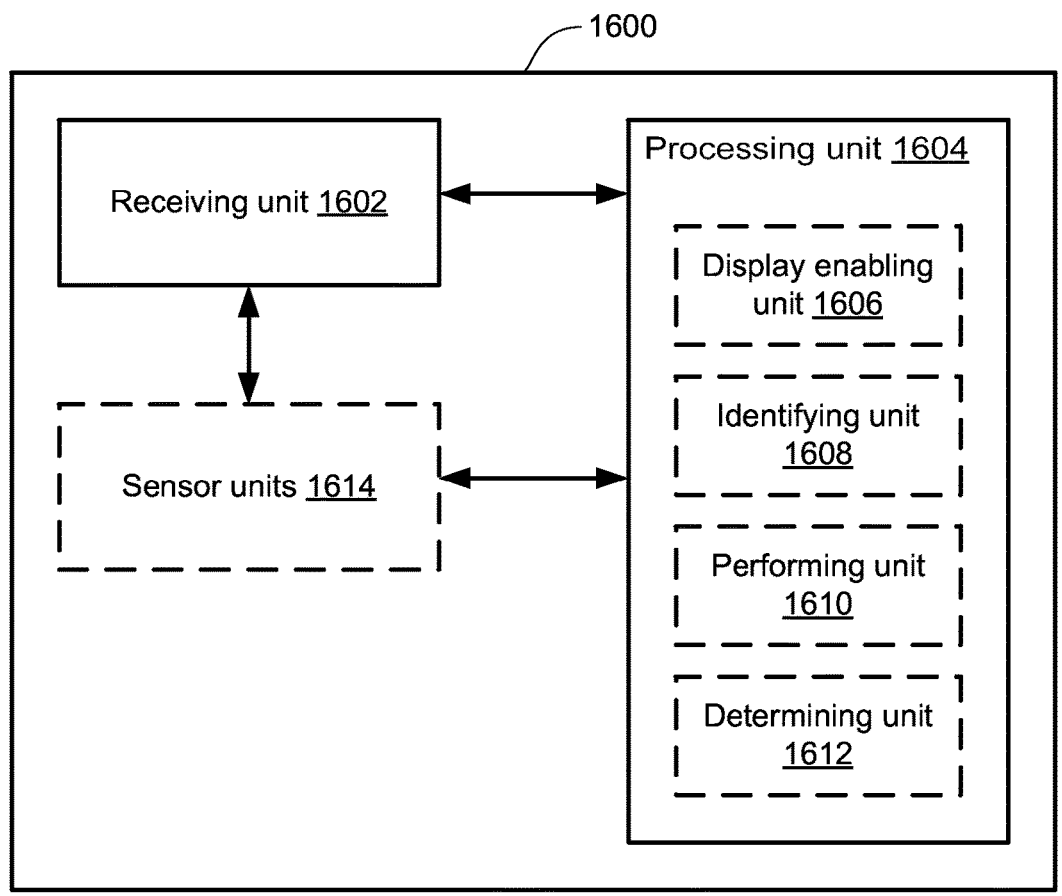
FIGS. 16-20 are functional block diagrams of electronic devices in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 optionally includes a receiving unit 1602 configured to receive images, sensor units 1614 configured to sense an orientation of the electronic device, and a processing unit 1604 coupled to the receiving unit 1602 and the sensor units 1614. In some embodiments, the processing unit 1604 includes a display enabling unit 1606, an identifying unit 1608, a performing unit 1610 and a determining unit 1612.

In some embodiments, the receiving unit 1602 is configured to receive a first image including a face of a first person. In some embodiments, the processing unit 1604 is configured to generate a user interface for display on a display device (e.g., with the display enabling unit 1606), identify the face of the first person from the first image (e.g., with the identifying unit 1608), and perform an action on the electronic device in accordance with the identification of the face of the first person (e.g., with the performing unit 1610).

In some embodiments, the user interface includes a second image that includes a face of a second person, the face of the second person being different from the face of the first person, and the processing unit 1604 is further configured to identify the face of the second person from the second image (e.g., with the identifying unit 1608), wherein performing the action on the electronic device in accordance with the identification of the face of the first person comprises replacing the face of the second person in the second image with the face of the first person in the first image (e.g., with the performing unit 1610). In some embodiments, the processing unit 1604 is further configured to determine an orientation of the face of the first person in the first image with respect to the display device (e.g., with the determining unit 1612), wherein performing the action on the electronic device in accordance with the identification of the face of the first person comprises aligning the user interface for display on the display device with the orientation of the face of the first person in the first image (e.g., with the performing unit 1610). In some embodiments, aligning the user interface with the orientation of the face of the first person comprises forgoing aligning the user interface based on an orientation of the device detected by one or more sensor units 1614 of the device (e.g., with the performing unit 1610), the sensor units 1614 being coupled to the processing unit 1604 and the receiving unit 1602.

In some embodiments, the user interface includes a content item being played, and performing the action on the electronic device in accordance with the identification of the face of the first person comprises associating the playing of the content item with the first person (e.g., with the performing unit 1610). In some embodiments, the processing unit 1604 is further configured to identify, based on the face of the first person in the first image, a first profile on the electronic device that is associated with the face of the first person (e.g., with the identifying unit 1608), wherein associating the playing of the content item with the first person comprises associating the playing of the content item with the first profile (e.g., with the performing unit 1610). In some embodiments, associating the playing of the content item with the first profile comprises updating a play count of the content item in the first profile (e.g., with the performing unit 1610).

In some embodiments, the first image further includes a face of a second person, and the processing unit 1604 is further configured to identify the face of the second person from the first image (e.g., with the identifying unit 1608), identify, based on the face of the second person in the first image, a second profile on the electronic device that is associated with the face of the second person (e.g., with the identifying unit 1608), and associate the playing of the content item with the second profile (e.g., with the performing unit 1610).

In some embodiments, the receiving unit 1602 is further configured to receive a second image including the face of the first person, and receive a third image including the face of the first person and a face of a second person, wherein the third image is captured after the second image was captured, and the processing unit 1604 is further configured to identify the face of the first person from the second image (e.g., with the identifying unit 1608), in response to identifying the face of the first person from the second image, continue to associate the playing of the content item with the first person (e.g., with the performing unit 1610), identify the face of the first person and the face of the second person from the third image (e.g., with the identifying unit 1608), and in response to identifying the face of the first person and the face of the second person from the third image: continue to associate the playing of the content item with the first person (e.g., with the performing unit 1610), and associate the playing of the content item with the second person (e.g., with the performing unit 1610).

In some embodiments, the user interface includes a content item being played, performing the action on the electronic device in accordance with the identification of the face of the first person comprises making a preliminarily association of the playing of the content item with the first person (e.g., with the performing unit 1610), the receiving unit 1602 is further configured to receive a second image, wherein the second image is received at least a first time threshold after receiving the first image, and the processing unit 1604 is further configured to after receiving the second image, determine whether the second image includes the face of the first person (e.g., with the determining unit 1612): in accordance with a determination that the second image does not include the face of the first person, cancel the preliminary association of the playing of the content item with the first person (e.g., with the performing unit 1610), and in accordance with a determination that the second image includes the face of the first person, confirm the preliminary association of the playing of the content item with the first person (e.g., with the performing unit 1610).

Figure 17:
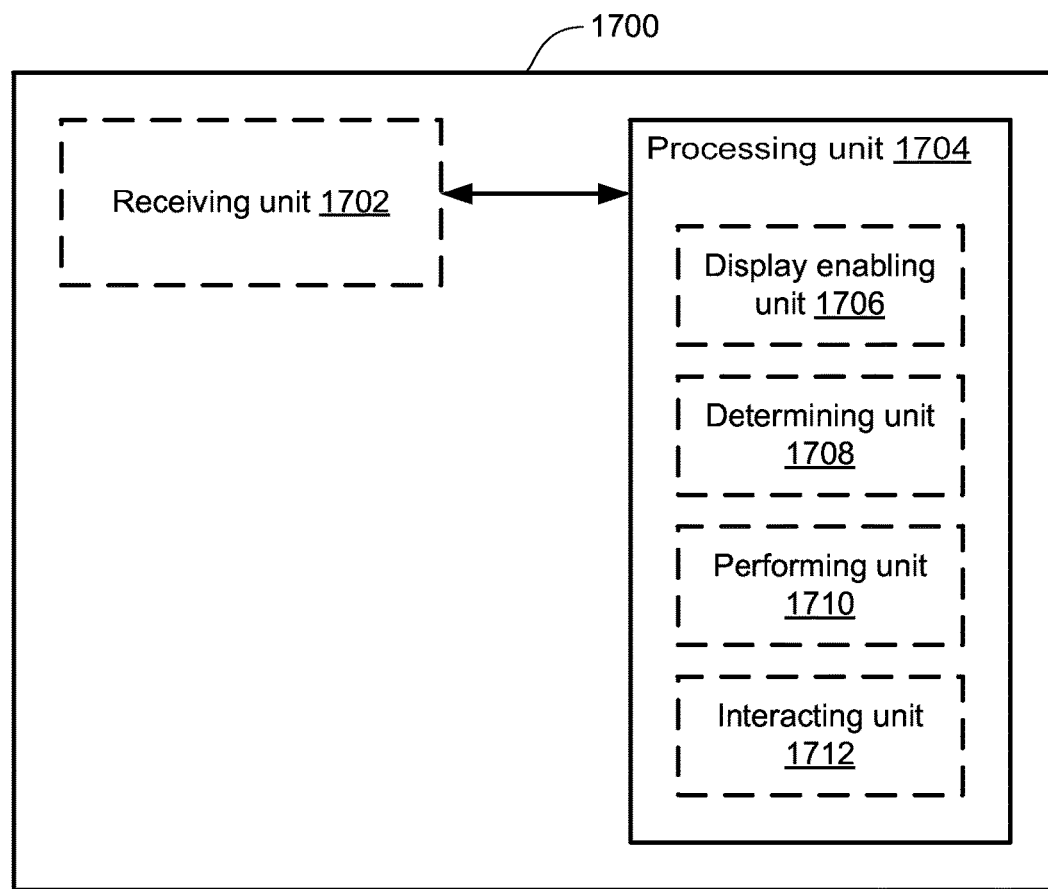

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 optionally includes a receiving unit 1702 configured to receive inputs, and a processing unit 1704 coupled to the receiving unit 1702. In some embodiments, the processing unit 1704 includes a display enabling unit 1706, a determining unit 1708, a performing unit 1710 and an interacting unit 1712.

In some embodiments, the processing unit 1704 is configured to generate a user interface for display on a display device (e.g., with the display enabling unit 1706), wherein the user interface includes a first user interface element, determine a gaze location in the user interface (e.g., with the determining unit 1708), wherein the gaze location comprises a location in the user interface to which a person's gaze is directed, determine whether the gaze location in the user interface coincides with the first user interface element (e.g., with the determining unit 1708), and in accordance with a determination that the gaze location coincides with the first user interface element, perform an action with respect to the first user interface element (e.g., with the performing unit 1710).

In some embodiments, the first user interface element comprises a user interface element requesting attention, and performing the action with respect to the first user interface element comprises acknowledging the request for attention in response to determining that the gaze location coincides with the first user interface element (e.g., with the performing unit 1710). In some embodiments, the user interface further includes a second user interface element, and performing the action with respect to the first user interface element comprises emphasizing the first user interface element relative to the second user interface element (e.g., with the performing unit 1710).

In some embodiments, the processing unit 1704 is further configured to determine one or more portions of the display device that are not coincident with the gaze location and the first user interface element (e.g., with the determining unit 1708), wherein performing the action with respect to the first user interface element comprises adjusting an output of the one or more portions of the display device that are not coincident with the gaze location (e.g., with the performing unit 1710). In some embodiments, performing the action with respect to the first user interface element comprises selecting the first user interface element (e.g., with the performing unit 1710). In some embodiments, the first user interface element comprises a plurality of moving items, and the processing unit 1704 is further configured to determine a first item of the plurality of moving items with which the gaze location coincides (e.g., with the determining unit 1708), wherein performing the action with respect to the first user interface element comprises modifying a movement of the first item of the plurality of moving items such that the first item is visible in the user interface (e.g., with the performing unit 1710). In some embodiments, the first user interface element comprises an autoscrolling list, and the plurality of moving items comprise elements of the autoscrolling list. In some embodiments, the first user interface element comprises an image catalog, and the plurality of moving items comprise images in the image catalog. In some embodiments, the first user interface element comprises a content bar, and the plurality of moving items comprise representations of content items accessible from the content bar.

In some embodiments, the first user interface element comprises content, and performing the action with respect to the first user interface element comprises designating the content in the first user interface element as being read (e.g., with the performing unit 1710). In some embodiments, performing the action with respect to the first user interface element comprises designating the first user interface element as an active user interface element (e.g., with the performing unit 1710), the receiving unit 1702 is configured to receive a first input from an input unit for interacting with an active user interface element, the receiving unit being coupled to the processing unit, wherein the processing unit 1704 is further configured to in response to the first input, interact with the first user interface element in accordance with the first input (e.g., with the interacting unit 1712). In some embodiments, the user interface further includes a second user interface element, a location of a cursor associated with the input device is coincident with the second user interface element, and designating the first user interface element as the active user interface element comprises ignoring the location of the cursor in designating the first user interface element as the active user interface element (e.g., with the performing unit 1710).

Figure 18:
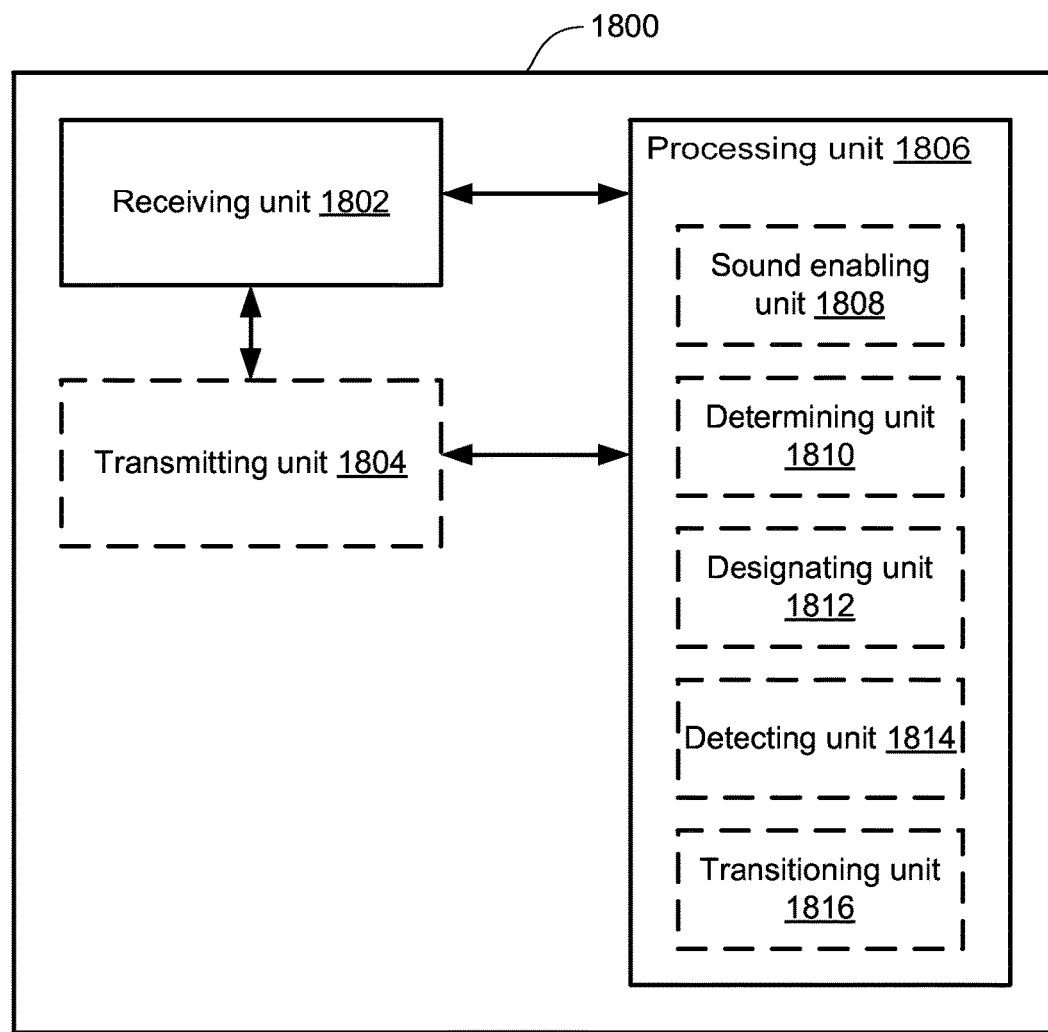

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 optionally includes a receiving unit 1802 configured to receive inputs, a transmitting unit 1804 configured to transmit, and a processing unit 1806 coupled to the receiving unit 1802 and the transmitting unit 1804. In some embodiments, the processing unit 1806 includes a sound enabling unit 1808, a determining unit 1810, a designating unit 1812, a detecting unit 1812 and a transitioning unit 1816.

In some embodiments, the receiving unit 1802 is configured to receive an output from a microphone on a sound-receiving device, and the processing unit 1806 is configured to generate a first sound for playback on a sound-playback device (e.g., with the sound enabling unit 1808), determine whether the sound-receiving device is present at the sound-playback device based on a plurality of presence criteria (e.g., with the determining unit 1810), including sound-detection criteria that is satisfied when the output from the microphone on the sound-receiving device corresponds to the first sound for playback on the sound-playback device, and verification criteria that is satisfied when a presence of the sound-receiving device at the sound-playback device is verified using a quantity other than the first sound, and in accordance with a determination that the plurality of presence criteria are satisfied, designate a user of the sound-receiving device as being present at the sound-playback device (e.g., with the designating unit 1812).

In some embodiments, designating the user of the sound-receiving device as being present at the sound-playback device comprises determining a user associated with the sound-receiving device (e.g., with the determining unit 1810), and designating the user as being present at the sound-playback device (e.g., with the designating unit 1814). In some embodiments, the transmitting unit 1804 is coupled to the processing unit 1806 and the receiving unit 1802, and is configured to, prior to the processing unit 1806 generating the first sound for playback on the sound-playback device, transmit a wake command to the sound-receiving device for turning on the microphone on the sound-receiving device.

In some embodiments, the verification criteria include a criterion that is satisfied when a face of the user of the sound-receiving device is recognized at the sound-playback device. In some embodiments, the verification criteria include a criterion that is satisfied when the sound-receiving device has sensed motion during a most recent time period. In some embodiments, the verification criteria include a criterion that is satisfied when the sound-receiving device resides on a same wireless network as the sound-playback device.

In some embodiments, the processing unit 1806 is further configured to detect motion of the sound-receiving device (e.g., with the detecting unit 1814), and in accordance with a determination that the motion exceeds a predefined threshold, re-evaluate the plurality of presence criteria to determine whether the sound-receiving device remains at the sound-playback device (e.g., with the determining unit 1810).

In some embodiments, the sound-playback device is configured to transition from a first state to a second state in response to one or more transition criteria being satisfied at the sound-playback device, and the processing unit 1806 is further configured to, in accordance with the determination that the plurality of presence criteria are satisfied, forgo transitioning from the first state of the sound-playback device to the second state of the sound-playback device in response to the one or more transition criteria being satisfied at the sound-playback device (e.g., with the transitioning unit 1816).

Figure 19:
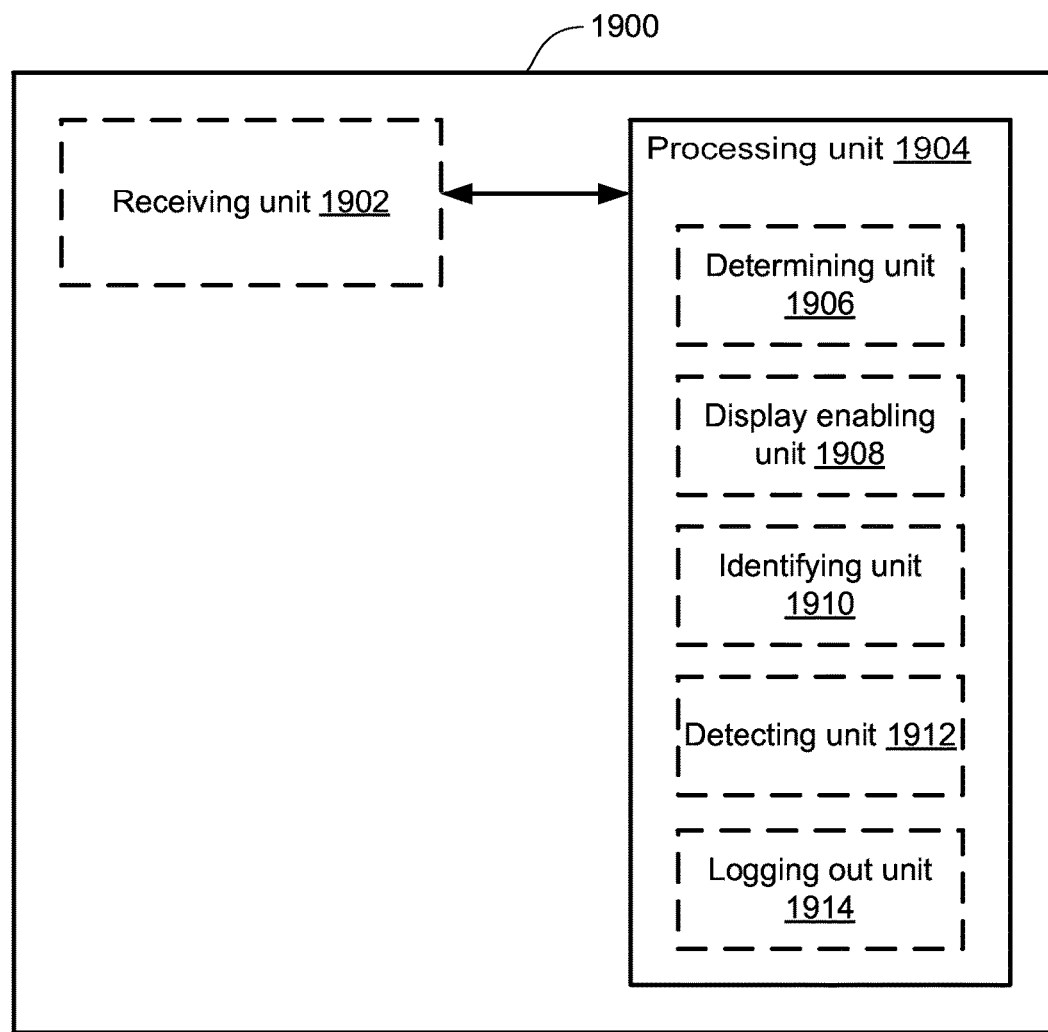

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 optionally includes a receiving unit 1902 configured to receive inputs, and a processing unit 1904 coupled to the receiving unit 1902. In some embodiments, the processing unit 1904 includes a determining unit 1906, a display enabling unit 1908, an identifying unit 1910, a detecting unit 1912 and a logging out unit 1914.

In some embodiments, the processing unit 1904 is configured to determine whether a person is further than a threshold distance from a display device or closer than the threshold distance from the display device (e.g., with the determining unit 1906), in accordance with a determination that the person is further than the threshold distance from the display device, provide a first user interface for display on the display device (e.g., with the display enabling unit 1908), and in accordance with a determination that the person is closer than the threshold distance from the display device, provide a second user interface for display on the display device (e.g., with the display enabling unit 1908), wherein the second user interface is different than the first user interface.

In some embodiments, determining whether the person is further than the threshold distance from the display device or closer than the threshold distance from the display device (e.g., with the determining unit 1906) is based on information received from one or more optical sensors, receiving unit 1902 coupled to the processing unit 1904 and configured to receive the information from the one or more optical sensors. In some embodiments, the processing unit 1904 is further configured to identify a face of the person based on the information received from the one or more optical sensors (e.g., with the identifying unit 1910), wherein determining whether the person is further than the threshold distance from the display device or closer than the threshold distance from the display device is based on a size of the face of the person (e.g., with the determining unit 1906).

In some embodiments, the person is determined to be further than the threshold distance from the display device (e.g., with the determining unit 1906), and the processing unit 1904 is further configured to, while the first user interface is displayed on the display device, detect movement of the person to a distance closer than the threshold distance from the display device (e.g., with the detecting unit 1912), and in response to detecting the movement of the person to the distance closer than the threshold distance, provide the second user interface for display on the display device (e.g., with the display enabling unit 1908).

In some embodiments, the person is determined to be closer than the threshold distance from the display device (e.g., with the determining unit 1906), and the processing unit 1904 is further configured to, while the second user interface is displayed on the display device, detect movement of the person to a distance further than the threshold distance from the display device (e.g., with the detecting unit 1912), and in response to detecting the movement of the person to the distance further than the threshold distance, provide the first user interface for display on the display device (e.g., with the display enabling unit 1908).

In some embodiments, the person is further than the threshold distance from the display device, the first user interface is provided for display on the displace device (e.g., with the display enabling unit 1908), the first user interface including a first user interface element and a second user interface element, and the processing unit 1904 is further configured to, while the first user interface is displayed on the display device: determine a gaze location in the first user interface (e.g., with the determining unit 1906), wherein the gaze location comprises a location in the first user interface to which the person's gaze is directed; detect movement of the person to a distance closer than the threshold distance from the display device (e.g., with the detecting nit 1912); and in response to detecting the movement of the person, provide the second user interface for display on the display device (e.g., with the display enabling unit 1908), the second user interface including information based on the gaze location.

In some embodiments, the processing unit 1904 is further configured to determine whether the gaze location coincides with the first user interface element or the second user interface element in the first user interface (e.g., with the determining unit 1906), and in response to detecting the movement of the person to the distance closer than the threshold distance from the display device: in accordance with a determination that the gaze location coincides with the first user interface element, provide the second user interface for display on the display device (e.g., with the display enabling unit 1908), the second user interface including information associated with the first user interface element, and in accordance with a determination that the gaze location coincides with the second user interface element, provide the second user interface for display on the display device (e.g., with the display enabling unit 1908), the second user interface including information associated with the second user interface element.

In some embodiments, the person is closer than the threshold distance from the display device, the person is logged into one or more areas on the electronic device 1900, and the processing unit 1904 is further configured to detect movement of the person to a distance further than the threshold distance from the display device (e.g., with the detecting unit 1912), and in response to detecting the movement of the person to the distance further than the threshold distance from the display device, log out of the one or more areas on the electronic device (e.g., logging out unit 1914).

In some embodiments, the first user interface includes a user interface element at a first size, and the second user interface includes the user interface element at a second size, smaller than the first size. In some embodiments, the first user interface includes summary information about a first quantity, and the second user interface includes detailed information about the first quantity. In some embodiments, the first user interface includes a first set of user interface elements, and the second user interface includes the first set of user interface elements and a second set of user interface elements.

Figure 20:
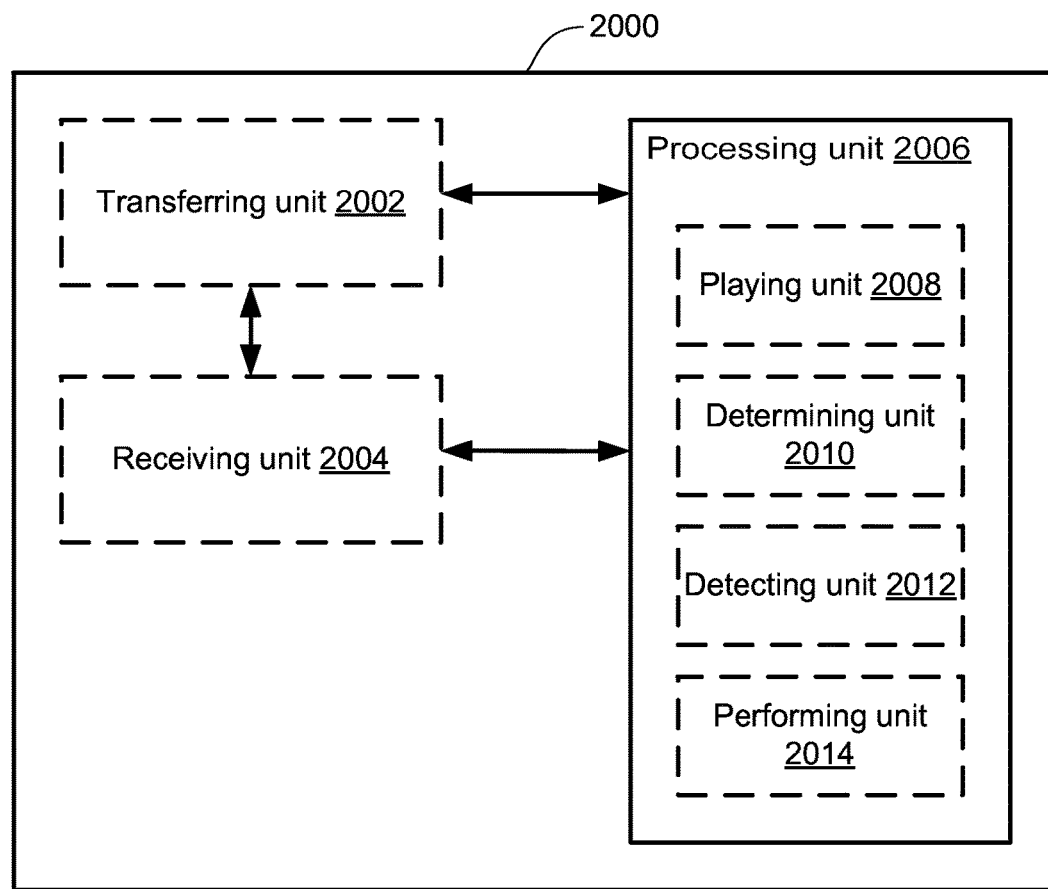

In accordance with some embodiments, FIG. 20 shows a functional block diagram of a first device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, a first device 2000 optionally includes a transferring unit 2002 configured to transfer operations to another device, a receiving unit 2004 configured to receive inputs, and a processing unit 2006 coupled to the transferring unit 2002 and the receiving unit 2004. In some embodiments, the processing unit 2006 includes a playing unit 2008, a determining unit 2010, a detecting unit 2012 and a performing unit 2014.

In some embodiments, the processing unit 2006 is configured to play media content on the first device (e.g., with the playing unit 2006), wherein the media content is included in a user interface for display on a display device, determine whether one or more presence criteria are satisfied (e.g., with the determining unit 2010), wherein the one or more presence criteria include a criterion that is satisfied while a first person is present at the display device, and in accordance with a determination that the one or more presence criteria are not satisfied, modify the playing of the media content in a first manner (e.g., with the playing unit 2008).

In some embodiments, the processing unit 2006 is further configured to, in accordance with a determination that the one or more presence criteria are satisfied (e.g., with the determining unit 2010), maintain the playing of the media content in the user interface (e.g., with the playing unit 2008). In some embodiments, the processing unit 2006 is further configured to, in accordance with the determination that the one or more presence criteria are not satisfied (e.g., with the determining unit 2010), determine a second device associated with the first person (e.g., with the determining unit 2010), wherein modifying the playing of the media content in the first manner comprises transferring the playing of the media content to the second device, the transferring unit 2004 configured to transfer the playing of the media content to the second device.

In some embodiments, the processing unit 2006 is further configured to, in accordance with a determination that the one or more presence criteria are satisfied (e.g., with the determining unit 2010): determine a relative location of the first person with respect to the display device (e.g., with the determining unit 2010), and modify the playing of the media content in a second manner based on the relative location of the first person (e.g., with the playing unit 2008), wherein the second manner is different from the first manner. In some embodiments, the processing unit 2006 is further configured to, in accordance with a determination that the one or more presence criteria are satisfied (e.g., with the determining unit 2010): determine a distance of the first person from the display device (e.g., with the determining unit 2010), and modify the playing of the media content in a second manner based on the distance of the first person from the display device (e.g., with the playing unit 2008), wherein the second manner is different from the first manner.

In some embodiments, the one or more presence criteria include a criterion that is satisfied when the first person is oriented towards the display device. In some embodiments, the one or more presence criteria include a criterion that is satisfied when the first person's gaze is directed at the display device.

In some embodiments, the processing unit 2006 is further configured to: while displaying the media content to a single person (e.g., with the playing unit 2008), detect that two or more people are present at the display device (e.g., with the detecting unit 2012), and in accordance with a determination that two or more people are present at the display device, modify the playing of the media content in a second manner by increasing a visibility of the media content in the user interface (e.g., with the playing unit 2008).

In some embodiments, the processing unit 2006 is further configured to: while displaying the media content to a single person (e.g., with the playing unit 2008), detect that two or more people are present at the display device (e.g., with the detecting unit 2012), and in accordance with a determination that two or more people are present at the display device: determine whether the media content is designated as private media content (e.g., with the determining unit 2010), and in accordance with a determination that the media content is designated as private media content, modify the playing of the media content in a second manner by reducing a visibility of the media content in the user interface (e.g., with the playing unit 2008).

In some embodiments, the processing unit 2006 is further configured to, in accordance with a determination that the media content is not designated as private media content (e.g., with the determining unit 2010), modify the playing of the media content in a third manner by increasing the visibility of the media content in the user interface (e.g., with the playing unit 2008). In some embodiments, the processing unit 2006 is further configured to, in accordance with a determination that the one or more presence criteria are satisfied (e.g., with the determining unit 2010): determine whether a second device is present at the display device with the first person, and whether a specified type of activity is being performed on the second device (e.g., with the determining unit 2010), and in accordance with a determination that the second device is present at the display device with the first person and that the specified type of activity is being performed on the second device, perform an action on the first device based on the activity being performed on the second device (e.g., with the performing unit 2014).

In some embodiments, determining whether the one or more presence criteria are satisfied (e.g., with the determining unit 2010) is based on information received from one or more optical sensors, the receiving unit 2004 configured to receive the information from the one or more optical sensors. In some embodiments, at a first point in time, the one or more presence criteria are not satisfied, and the playing of the media content is modified in the first manner (e.g., with the playing unit 2008), and the processing unit 2006 is further configured to: at a second point in time, after the modification of the playing of the media content in the first manner, determine that the one or more presence criteria are satisfied (e.g., with the determining unit 2010), and in response to determining that the one or more presence criteria are satisfied, reverse the modification of the playing of the media content in the first manner (e.g., with the playing unit 2008).

The operations described above with reference to FIGS. 7A-7E, 9A-9C, 11A-11B, 13A-13D and 15A-15C are, optionally, implemented by components depicted in FIGS. 1A-1B, FIG. 16, FIG. 17, FIG. 18, FIG. 19, or FIG. 20. For example, determining operations 724, 920, 1110, 1302, and 1506 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, FIGS. 1A-1B, FIG. 16, FIG. 17, FIG. 18, FIG. 19, or FIG. 20.

Therefore, according to the above, this disclosure includes subject matter directed to the following examples:

Example 1: A method comprising: at an electronic device with one or more processors and memory: generating a user interface for display on a display device; receiving a first image including a face of a first person; identifying the face of the first person from the first image; and performing an action on the electronic device in accordance with the identification of the face of the first person.

Example 2: The method of preceding example 1, wherein the user interface includes a second image that includes a face of a second person, the face of the second person being different from the face of the first person, the method further comprising: identifying the face of the second person from the second image, wherein performing the action on the electronic device in accordance with the identification of the face of the first person comprises replacing the face of the second person in the second image with the face of the first person in the first image.

Example 3: The method of any of examples 1-2, further comprising: determining an orientation of the face of the first person in the first image with respect to the display device, wherein performing the action on the electronic device in accordance with the identification of the face of the first person comprises aligning the user interface for display on the display device with the orientation of the face of the first person in the first image.

Example 4: The method of preceding example 3, wherein aligning the user interface with the orientation of the face of the first person comprises forgoing aligning the user interface based on an orientation of the device detected by one or more sensors of the device.

Example 5: The method of any of examples 1-4, wherein: the user interface includes a content item being played, and performing the action on the electronic device in accordance with the identification of the face of the first person comprises associating the playing of the content item with the first person.

Example 6: The method of preceding example 5, further comprising: identifying, based on the face of the first person in the first image, a first profile on the electronic device that is associated with the face of the first person, wherein associating the playing of the content item with the first person comprises associating the playing of the content item with the first profile.

Example 7: The method of preceding example 6, wherein associating the playing of the content item with the first profile comprises updating a play count of the content item in the first profile.

Example 8: The method of any of examples 5-7, wherein the first image further includes a face of a second person, the method further comprising: identifying the face of the second person from the first image; identifying, based on the face of the second person in the first image, a second profile on the electronic device that is associated with the face of the second person; and associating the playing of the content item with the second profile.

Example 9: The method of any of examples 5-8, further comprising: receiving a second image including the face of the first person; identifying the face of the first person from the second image; in response to identifying the face of the first person from the second image, continuing to associate the playing of the content item with the first person; receiving a third image including the face of the first person and a face of a second person, wherein the third image was captured after the second image was captured; identifying the face of the first person and the face of the second person from the third image; and in response to identifying the face of the first person and the face of the second person from the third image: continuing to associate the playing of the content item with the first person, and associating the playing of the content item with the second person.

Example 10: The method of any of examples 1-9, wherein: the user interface includes a content item being played, and performing the action on the electronic device in accordance with the identification of the face of the first person comprises making a preliminarily association of the playing of the content item with the first person; and the method further comprises: receiving a second image, wherein the second image is received at least a first time threshold after receiving the first image; and after receiving the second image, determining whether the second image includes the face of the first person: in accordance with a determination that the second image does not include the face of the first person, canceling the preliminary association of the playing of the content item with the first person; and in accordance with a determination that the second image includes the face of the first person, confirming the preliminary association of the playing of the content item with the first person.

Example 11: An electronic device, comprising: one or more processors; memory; and one or more programs, wherein the one or more programs are stored in the memory and configured to be executed by the one or more processors, the one or more programs including instructions for: generating a user interface for display on a display device; receiving a first image including a face of a first person; identifying the face of the first person from the first image; and performing an action on the electronic device in accordance with the identification of the face of the first person.

Example 12: A non-transitory computer readable storage medium storing one or more programs, the one or more programs comprising instructions, which when executed by an electronic device with one or more processors and memory, cause the device to: generate a user interface for display on a display device; receive a first image including a face of a first person; identify the face of the first person from the first image; and perform an action on the electronic device in accordance with the identification of the face of the first person.

Example 13: An electronic device, comprising: one or more processors; memory; means for generating a user interface for display on a display device; means for receiving a first image including a face of a first person; means for identifying the face of the first person from the first image; and means for performing an action on the electronic device in accordance with the identification of the face of the first person.

Example 14: An information processing apparatus for use in an electronic device with one or more processors and memory, comprising: means for generating a user interface for display on a display device; means for receiving a first image including a face of a first person; means for identifying the face of the first person from the first image; and means for performing an action on the electronic device in accordance with the identification of the face of the first person.

Example 15: An electronic device, comprising: one or more processors; memory; and one or more programs, wherein the one or more programs are stored in the memory and configured to be executed by the one or more processors, the one or more programs including instructions for performing any of the methods of examples 1-10.

Example 16: A non-transitory computer readable storage medium storing one or more programs, the one or more programs comprising instructions, which when executed by an electronic device with one or more processors and memory, cause the device to perform any of the methods of examples 1-10.

Example 17: An electronic device, comprising: one or more processors; memory; and means for performing any of the methods of examples 1-10.

Example 18: An information processing apparatus for use in an electronic device with one or more processors and memory, comprising: means for performing any of the method of examples 1-10.

Example 19: A method comprising: at an electronic device with one or more processors and memory: generating a user interface for display on a display device, wherein the user interface includes a first user interface element; determining a gaze location in the user interface, wherein the gaze location comprises a location in the user interface to which a person's gaze is directed; determining whether the gaze location in the user interface coincides with the first user interface element; and in accordance with a determination that the gaze location coincides with the first user interface element, performing an action with respect to the first user interface element.

Example 20: The method of preceding example 19, wherein: the first user interface element comprises a user interface element requesting attention, and performing the action with respect to the first user interface element comprises acknowledging the request for attention in response to determining that the gaze location coincides with the first user interface element.

Example 21: The method of any of examples 19-20, wherein: the user interface further includes a second user interface element, and performing the action with respect to the first user interface element comprises emphasizing the first user interface element relative to the second user interface element.

Example 22: The method of any of examples 19-21, further comprising: determining one or more portions of the display device that are not coincident with the gaze location and the first user interface element, wherein performing the action with respect to the first user interface element comprises adjusting an output of the one or more portions of the display device that are not coincident with the gaze location.

Example 23: The method of any of examples 19-22, wherein performing the action with respect to the first user interface element comprises selecting the first user interface element.

Example 24: The method of any of examples 19-23, wherein the first user interface element comprises a plurality of moving items, the method further comprising: determining a first item of the plurality of moving items with which the gaze location coincides, wherein performing the action with respect to the first user interface element comprises modifying a movement of the first item of the plurality of moving items such that the first item is visible in the user interface.

Example 25: The method of preceding example 24, wherein the first user interface element comprises an autoscrolling list, and the plurality of moving items comprise elements of the autoscrolling list.

Example 26: The method of any of examples 24-25, wherein the first user interface element comprises an image catalog, and the plurality of moving items comprise images in the image catalog.

Example 27: The method of any of examples 24-26, wherein the first user interface element comprises a content bar, and the plurality of moving items comprise representations of content items accessible from the content bar.

Example 28: The method of any of examples 19-27, wherein: the first user interface element comprises content, and performing the action with respect to the first user interface element comprises designating the content in the first user interface element as being read.

Example 29: The method of any of examples 19-28, wherein performing the action with respect to the first user interface element comprises designating the first user interface element as an active user interface element, the method further comprising: receiving a first input from an input device for interacting with an active user interface element; and in response to the first input, interacting with the first user interface element in accordance with the first input.

Example 30: The method of preceding example 29, wherein: the user interface further includes a second user interface element, a location of a cursor associated with the input device is coincident with the second user interface element, and designating the first user interface element as the active user interface element comprises ignoring the location of the cursor in designating the first user interface element as the active user interface element.

Example 31: An electronic device, comprising: one or more processors; memory; and one or more programs, wherein the one or more programs are stored in the memory and configured to be executed by the one or more processors, the one or more programs including instructions for: generating a user interface for display on a display device, wherein the user interface includes a first user interface element; determining a gaze location in the user interface, wherein the gaze location comprises a location in the user interface to which a person's gaze is directed; determining whether the gaze location in the user interface coincides with the first user interface element; and in accordance with a determination that the gaze location coincides with the first user interface element, performing an action with respect to the first user interface element.

Example 32: A non-transitory computer readable storage medium storing one or more programs, the one or more programs comprising instructions, which when executed by an electronic device with one or more processors and memory, cause the device to: generate a user interface for display on a display device, wherein the user interface includes a first user interface element; determine a gaze location in the user interface, wherein the gaze location comprises a location in the user interface to which a person's gaze is directed; determine whether the gaze location in the user interface coincides with the first user interface element; and in accordance with a determination that the gaze location coincides with the first user interface element, perform an action with respect to the first user interface element.

Example 33: An electronic device, comprising: one or more processors; memory; means for generating a user interface for display on a display device, wherein the user interface includes a first user interface element; means for determining a gaze location in the user interface, wherein the gaze location comprises a location in the user interface to which a person's gaze is directed; means for determining whether the gaze location in the user interface coincides with the first user interface element; and means for, in accordance with a determination that the gaze location coincides with the first user interface element, performing an action with respect to the first user interface element.

Example 34: An information processing apparatus for use in an electronic device with one or more processors and memory, comprising: means for generating a user interface for display on a display device, wherein the user interface includes a first user interface element; means for determining a gaze location in the user interface, wherein the gaze location comprises a location in the user interface to which a person's gaze is directed; means for determining whether the gaze location in the user interface coincides with the first user interface element; and means for, in accordance with a determination that the gaze location coincides with the first user interface element, performing an action with respect to the first user interface element.

Example 35: An electronic device, comprising: one or more processors; memory; and one or more programs, wherein the one or more programs are stored in the memory and configured to be executed by the one or more processors, the one or more programs including instructions for performing any of the methods of examples 19-30.

Example 36: A non-transitory computer readable storage medium storing one or more programs, the one or more programs comprising instructions, which when executed by an electronic device with one or more processors and memory, cause the device to perform any of the methods of examples 19-30.

Example 37: An electronic device, comprising: one or more processors; memory; and means for performing any of the methods of examples 19-30.

Example 38: An information processing apparatus for use in an electronic device with one or more processors and memory, comprising: means for performing any of the method of examples 19-30.

Example 39: A method comprising: at an electronic device with one or more processors and memory: generating a first sound for playback on a sound-playback device; receiving an output from a microphone on a sound-receiving device; determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designating a user of the sound-receiving device as being present at the sound-playback device.

Example 40: The method of preceding example 39, wherein designating the user of the sound-receiving device as being present at the sound-playback device comprises determining a user associated with the sound-receiving device, and designating the user as being present at the sound-playback device.

Example 41: The method of any of examples 39-40, further comprising prior to generating the first sound for playback on the sound-playback device, transmitting a wake command to the sound-receiving device for turning on the microphone on the sound-receiving device.

Example 42: The method of any of examples 39-41, wherein the verification criteria include a criterion that is satisfied when a face of the user of the sound-receiving device is recognized at the sound-playback device.

Example 43: The method of any of examples 39-42, wherein the verification criteria include a criterion that is satisfied when the sound-receiving device has sensed motion during a most recent time period.

Example 44: The method of any of examples 39-43, wherein the verification criteria include a criterion that is satisfied when the sound-receiving device resides on a same wireless network as the sound-playback device.

Example 45: The method of any of examples 39-44, further comprising: detecting motion of the sound-receiving device; and in accordance with a determination that the motion exceeds a predefined threshold, re-evaluating the plurality of presence criteria to determine whether the sound-receiving device remains at the sound-playback device.

Example 46: The method of any of examples 39-45, wherein: the sound-playback device is configured to transition from a first state to a second state in response to one or more transition criteria being satisfied at the sound-playback device, the method further comprising: in accordance with the determination that the plurality of presence criteria are satisfied, forgoing transitioning from the first state of the sound-playback device to the second state of the sound-playback device in response to the one or more transition criteria being satisfied at the sound-playback device.

Example 47: An electronic device, comprising: one or more processors; memory; and one or more programs, wherein the one or more programs are stored in the memory and configured to be executed by the one or more processors, the one or more programs including instructions for: generating a first sound for playback on a sound-playback device; receiving an output from a microphone on a sound-receiving device; determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designating a user of the sound-receiving device as being present at the sound-playback device.

Example 48: A non-transitory computer readable storage medium storing one or more programs, the one or more programs comprising instructions, which when executed by an electronic device with one or more processors and memory, cause the device to: generate a first sound for playback on a sound-playback device; receive an output from a microphone on a sound-receiving device; determine whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a resence of the sound-receiving device at the sound-playback device is verified using a quantity other than the first sound; and in accordance with a determination that the plurality of presence criteria are satisfied, designate a user of the sound-receiving device as being present at the sound-playback device.

Example 49: An electronic device, comprising: one or more processors; memory; means for generating a first sound for playback on a sound-playback device; means for receiving an output from a microphone on a sound-receiving device; means for determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and means for, in accordance with a determination that the plurality of presence criteria are satisfied, designating a user of the sound-receiving device as being present at the sound-playback device.

Example 50: An information processing apparatus for use in an electronic device with one or more processors and memory, comprising: means for generating a first sound for playback on a sound-playback device; means for receiving an output from a microphone on a sound-receiving device; means for determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and means for, in accordance with a determination that the plurality of presence criteria are satisfied, designating a user of the sound-receiving device as being present at the sound-playback device.

Example 51: An electronic device, comprising: one or more processors; memory; and one or more programs, wherein the one or more programs are stored in the memory and configured to be executed by the one or more processors, the one or more programs including instructions for performing any of the methods of examples 39-46.

Example 52: A non-transitory computer readable storage medium storing one or more programs, the one or more programs comprising instructions, which when executed by an electronic device with one or more processors and memory, cause the device to perform any of the methods of examples 39-46.

Example 53: An electronic device, comprising: one or more processors; memory; and means for performing any of the methods of examples 39-46.

Example 54: An information processing apparatus for use in an electronic device with one or more processors and memory, comprising: means for performing any of the method of examples 39-46.

Example 55: A method comprising: at an electronic device with one or more processors and memory: determining whether a person is further than a threshold distance from a display device or closer than the threshold distance from the display device; in accordance with a determination that the person is further than the threshold distance from the display device, providing a first user interface for display on the display device; and in accordance with a determination that the person is closer than the threshold distance from the display device, providing a second user interface for display on the display device, wherein the second user interface is different than the first user interface.

Example 56: The method of preceding example 55, wherein determining whether the person is further than the threshold distance from the display device or closer than the threshold distance from the display device is based on information received from one or more optical sensors.

Example 57: The method of preceding example 56, further comprising identifying a face of the person based on the information received from the one or more optical sensors, wherein determining whether the person is further than the threshold distance from the display device or closer than the threshold distance from the display device is based on a size of the face of the person.

Example 58: The method of any of examples 55-57, wherein the person is determined to be further than the threshold distance from the display device, the method further comprising: while the first user interface is displayed on the display device, detecting movement of the person to a distance closer than the threshold distance from the display device; and in response to detecting the movement of the person to the distance closer than the threshold distance, providing the second user interface for display on the display device.

Example 59: The method of any of examples 55-57, wherein the person is determined to be closer than the threshold distance from the display device, the method further comprising: while the second user interface is displayed on the display device, detecting movement of the person to a distance further than the threshold distance from the display device; and in response to detecting the movement of the person to the distance further than the threshold distance, providing the first user interface for display on the display device.

Example 60: The method of any of examples 55-58, wherein: the person is further than the threshold distance from the display device, and the first user interface is provided for display on the displace device, the first user interface including a first user interface element and a second user interface element, the method further comprising: while the first user interface is displayed on the display device: determining a gaze location in the first user interface, wherein the gaze location comprises a location in the first user interface to which the person's gaze is directed; detecting movement of the person to a distance closer than the threshold distance from the display device; and in response to detecting the movement of the person, providing the second user interface for display on the display device, the second user interface including information based on the gaze location.

Example 61: The method of preceding example 60, further comprising: determining whether the gaze location coincides with the first user interface element or the second user interface element in the first user interface, wherein in response to detecting the movement of the person to the distance closer than the threshold distance from the display device: in accordance with a determination that the gaze location coincides with the first user interface element, providing the second user interface for display on the display device, the second user interface including information associated with the first user interface element, and in accordance with a determination that the gaze location coincides with the second user interface element, providing the second user interface for display on the display device, the second user interface including information associated with the second user interface element.

Example 62: The method of any of examples 55-57 and 59, wherein: the person is closer than the threshold distance from the display device, and the person is logged into one or more areas on the electronic device, the method further comprising: detecting movement of the person to a distance further than the threshold distance from the display device; and in response to detecting the movement of the person to the distance further than the threshold distance from the display device, logging out of the one or more areas on the electronic device.

Example 63: The method of any of examples 55-62, wherein the first user interface includes a user interface element at a first size, and the second user interface includes the user interface element at a second size, smaller than the first size.

Example 64: The method of any of examples 55-63, wherein the first user interface includes summary information about a first quantity, and the second user interface includes detailed information about the first quantity.

Example 65: The method of any of examples 55-64, wherein the first user interface includes a first set of user interface elements, and the second user interface includes the first set of user interface elements and a second set of user interface elements.

Example 66: An electronic device, comprising: one or more processors; memory; and one or more programs, wherein the one or more programs are stored in the memory and configured to be executed by the one or more processors, the one or more programs including instructions for: determining whether a person is further than a threshold distance from a display device or closer than the threshold distance from the display device; in accordance with a determination that the person is further than the threshold distance from the display device, providing a first user interface for display on the display device; and in accordance with a determination that the person is closer than the threshold distance from the display device, providing a second user interface for display on the display device, wherein the second user interface is different than the first user interface.

Example 67: A non-transitory computer readable storage medium storing one or more programs, the one or more programs comprising instructions, which when executed by an electronic device with one or more processors and memory, cause the device to: determine whether a person is further than a threshold distance from a display device or closer than the threshold distance from the display device; in accordance with a determination that the person is further than the threshold distance from the display device, provide a first user interface for display on the display device; and in accordance with a determination that the person is closer than the threshold distance from the display device, provide a second user interface for display on the display device, wherein the second user interface is different than the first user interface.

Example 68: An electronic device, comprising: one or more processors; memory; means for determining whether a person is further than a threshold distance from a display device or closer than the threshold distance from the display device; means for, in accordance with a determination that the person is further than the threshold distance from the display device, providing a first user interface for display on the display device; and means for, in accordance with a determination that the person is closer than the threshold distance from the display device, providing a second user interface for display on the display device, wherein the second user interface is different than the first user interface.

Example 69: An information processing apparatus for use in an electronic device with one or more processors and memory, comprising: means for determining whether a person is further than a threshold distance from a display device or closer than the threshold distance from the display device; means for, in accordance with a determination that the person is further than the threshold distance from the display device, providing a first user interface for display on the display device; and means for, in accordance with a determination that the person is closer than the threshold distance from the display device, providing a second user interface for display on the display device, wherein the second user interface is different than the first user interface.

Example 70: An electronic device, comprising: one or more processors; memory; and one or more programs, wherein the one or more programs are stored in the memory and configured to be executed by the one or more processors, the one or more programs including instructions for performing any of the methods of examples 55-65.

Example 71: A non-transitory computer readable storage medium storing one or more programs, the one or more programs comprising instructions, which when executed by an electronic device with one or more processors and memory, cause the device to perform any of the methods of examples 55-65.

Example 72: An electronic device, comprising: one or more processors; memory; and means for performing any of the methods of examples 55-65.

Example 73: An information processing apparatus for use in an electronic device with one or more processors and memory, comprising: means for performing any of the method of examples 55-65.

Example 74: A method comprising: at a first device with one or more processors and memory: playing media content on the first device, wherein the media content is included in a user interface for display on a display device; determining whether one or more presence criteria are satisfied, wherein the one or more presence criteria include a criterion that is satisfied while a first person is present at the display device; and in accordance with a determination that the one or more presence criteria are not satisfied, modifying the playing of the media content in a first manner.

Example 75: The method of preceding example 74, further comprising in accordance with a determination that the one or more presence criteria are satisfied, maintaining the playing of the media content in the user interface.

Example 76: The method of any of examples 74-75, further comprising: in accordance with the determination that the one or more presence criteria are not satisfied, determining a second device associated with the first person, wherein modifying the playing of the media content in the first manner comprises transferring the playing of the media content to the second device.

Example 77: The method of any of examples 74-76, further comprising in accordance with a determination that the one or more presence criteria are satisfied: determining a relative location of the first person with respect to the display device, and modifying the playing of the media content in a second manner based on the relative location of the first person, wherein the second manner is different from the first manner.

Example 78: The method of any of examples 74-77, further comprising in accordance with a determination that the one or more presence criteria are satisfied: determining a distance of the first person from the display device, and modifying the playing of the media content in a second manner based on the distance of the first person from the display device, wherein the second manner is different from the first manner.

Example 79: The method of any of examples 74-78, wherein the one or more presence criteria include a criterion that is satisfied when the first person is oriented towards the display device.

Example 80: The method of any of examples 74-79, wherein the one or more presence criteria include a criterion that is satisfied when the first person's gaze is directed at the display device.

Example 81: The method of any of examples 74-80, further comprising: while displaying the media content to a single person, detecting that two or more people are present at the display device; and in accordance with a determination that two or more people are present at the display device, modifying the playing of the media content in a second manner by increasing a visibility of the media content in the user interface.

Example 82: The method of any of examples 74-80, further comprising: while displaying the media content to a single person, detecting that two or more people are present at the display device; and in accordance with a determination that two or more people are present at the display device: determining whether the media content is designated as private media content, and in accordance with a determination that the media content is designated as private media content, modifying the playing of the media content in a second manner by reducing a visibility of the media content in the user interface.

Example 83: The method of preceding example 82, further comprising: in accordance with a determination that the media content is not designated as private media content, modifying the playing of the media content in a third manner by increasing the visibility of the media content in the user interface.

Example 84: The method of any of examples 74-83, further comprising in accordance with a determination that the one or more presence criteria are satisfied: determining whether a second device is present at the display device with the first person, and whether a specified type of activity is being performed on the second device; and in accordance with a determination that the second device is present at the display device with the first person and that the specified type of activity is being performed on the second device, performing an action on the first device based on the activity being performed on the second device.

Example 85: The method of any of examples 74-84, wherein determining whether the one or more presence criteria are satisfied is based on information received from one or more optical sensors.

Example 86: The method of any of examples 74-85, wherein: at a first point in time, the one or more presence criteria are not satisfied, and the playing of the media content is modified in the first manner, the method further comprising: at a second point in time, after the modification of the playing of the media content in the first manner, determining that the one or more presence criteria are satisfied; and in response to determining that the one or more presence criteria are satisfied, reversing the modification of the playing of the media content in the first manner.

Example 87: A first electronic device, comprising: one or more processors; memory; and one or more programs, wherein the one or more programs are stored in the memory and configured to be executed by the one or more processors, the one or more programs including instructions for: playing media content on the first device, wherein the media content is included in a user interface for display on a display device; determining whether one or more presence criteria are satisfied, wherein the one or more presence criteria include a criterion that is satisfied while a first person is present at the display device; and in accordance with a determination that the one or more presence criteria are not satisfied, modifying the playing of the media content in a first manner.

Example 88: A non-transitory computer readable storage medium storing one or more programs, the one or more programs comprising instructions, which when executed by a first electronic device with one or more processors and memory, cause the first device to: play media content on the first device, wherein the media content is included in a user interface for display on a display device; determine whether one or more presence criteria are satisfied, wherein the one or more presence criteria include a criterion that is satisfied while a first person is present at the display device; and in accordance with a determination that the one or more presence criteria are not satisfied, modify the playing of the media content in a first manner.

Example 89: A first electronic device, comprising: one or more processors; memory; means for playing media content on the first device, wherein the media content is included in a user interface for display on a display device; means for determining whether one or more presence criteria are satisfied, wherein the one or more presence criteria include a criterion that is satisfied while a first person is present at the display device; and means for, in accordance with a determination that the one or more presence criteria are not satisfied, modifying the playing of the media content in a first manner.

Example 90: An information processing apparatus for use in a first electronic device with one or more processors and memory, comprising: means for playing media content on the first device, wherein the media content is included in a user interface for display on a display device; means for determining whether one or more presence criteria are satisfied, wherein the one or more presence criteria include a criterion that is satisfied while a first person is present at the display device; and means for, in accordance with a determination that the one or more presence criteria are not satisfied, modifying the playing of the media content in a first manner.

Example 91: An electronic device, comprising: one or more processors; memory; and one or more programs, wherein the one or more programs are stored in the memory and configured to be executed by the one or more processors, the one or more programs including instructions for performing any of the methods of examples 74-86.

Example 92: A non-transitory computer readable storage medium storing one or more programs, the one or more programs comprising instructions, which when executed by an electronic device with one or more processors and memory, cause the device to perform any of the methods of examples 74-86.

Example 93: An electronic device, comprising: one or more processors; memory; and means for performing any of the methods of examples 74-86.

Example 94: An information processing apparatus for use in an electronic device with one or more processors and memory, comprising: means for performing any of the method of examples 74-86.

Example 95: An electronic device, comprising: a receiving unit configured to receive a first image including a face of a first person; and a processing unit coupled to the receiving unit, the processing unit configured to: generate a user interface for display on a display device; identify the face of the first person from the first image; and perform an action on the electronic device in accordance with the identification of the face of the first person.

Example 96: The electronic device of preceding example 95, wherein the user interface includes a second image that includes a face of a second person, the face of the second person being different from the face of the first person, and the processing unit is further configured to: identify the face of the second person from the second image, wherein performing the action on the electronic device in accordance with the identification of the face of the first person comprises replacing the face of the second person in the second image with the face of the first person in the first image.

Example 97: The electronic device of any of examples 95-96, wherein the processing unit is further configured to: determine an orientation of the face of the first person in the first image with respect to the display device, wherein performing the action on the electronic device in accordance with the identification of the face of the first person comprises aligning the user interface for display on the display device with the orientation of the face of the first person in the first image.

Example 98: The electronic device of preceding example 97, wherein aligning the user interface with the orientation of the face of the first person comprises forgoing aligning the user interface based on an orientation of the device detected by one or more sensor units of the device, the sensor units being coupled to the processing unit and the receiving unit.

Example 99: The electronic device of any of examples 95-98, wherein: the user interface includes a content item being played, and performing the action on the electronic device in accordance with the identification of the face of the first person comprises associating the playing of the content item with the first person.

Example 100: The electronic device of preceding example 99, wherein the processing unit is further configured to: identify, based on the face of the first person in the first image, a first profile on the electronic device that is associated with the face of the first person, wherein associating the playing of the content item with the first person comprises associating the playing of the content item with the first profile.

Example 101: The electronic device of preceding example 100, wherein associating the playing of the content item with the first profile comprises updating a play count of the content item in the first profile.

Example 102: The electronic device of any of examples 99-101, wherein the first image further includes a face of a second person, and the processing unit is further configured to: identify the face of the second person from the first image; identify, based on the face of the second person in the first image, a second profile on the electronic device that is associated with the face of the second person; and associate the playing of the content item with the second profile.

Example 103: The electronic device of any of examples 99-102, wherein: the receiving unit is further configured to receive a second image including the face of the first person, and receive a third image including the face of the first person and a face of a second person, wherein the third image is captured after the second image was captured, and the processing unit is further configured to: identify the face of the first person from the second image; in response to identifying the face of the first person from the second image, continue to associate the playing of the content item with the first person; identify the face of the first person and the face of the second person from the third image; and in response to identifying the face of the first person and the face of the second person from the third image: continue to associate the playing of the content item with the first person, and associate the playing of the content item with the second person.

Example 104: The electronic device of any of examples 95-103, wherein: the user interface includes a content item being played, performing the action on the electronic device in accordance with the identification of the face of the first person comprises making a preliminarily association of the playing of the content item with the first person, the receiving unit is further configured to receive a second image, wherein the second image is received at least a first time threshold after receiving the first image, and the processing unit is further configured to: after receiving the second image, determine whether the second image includes the face of the first person: in accordance with a determination that the second image does not include the face of the first person, cancel the preliminary association of the playing of the content item with the first person; and in accordance with a determination that the second image includes the face of the first person, confirm the preliminary association of the playing of the content item with the first person.

Example 105: An electronic device, comprising: a processing unit configured to: generate a user interface for display on a display device, wherein the user interface includes a first user interface element; determine a gaze location in the user interface, wherein the gaze location comprises a location in the user interface to which a person's gaze is directed; determine whether the gaze location in the user interface coincides with the first user interface element; and in accordance with a determination that the gaze location coincides with the first user interface element, perform an action with respect to the first user interface element.

Example 106: The electronic device of preceding example 105, wherein: the first user interface element comprises a user interface element requesting attention, and performing the action with respect to the first user interface element comprises acknowledging the request for attention in response to determining that the gaze location coincides with the first user interface element.

Example 107: The electronic device of any of examples 105-106, wherein: the user interface further includes a second user interface element, and performing the action with respect to the first user interface element comprises emphasizing the first user interface element relative to the second user interface element.

Example 108: The electronic device of any of examples 105-107, wherein the processing unit is further configured to: determine one or more portions of the display device that are not coincident with the gaze location and the first user interface element, wherein performing the action with respect to the first user interface element comprises adjusting an output of the one or more portions of the display device that are not coincident with the gaze location.

Example 109: The electronic device of any of examples 105-108, wherein performing the action with respect to the first user interface element comprises selecting the first user interface element.

Example 110: The electronic device of any of examples 105-109, wherein the first user interface element comprises a plurality of moving items, and the processing unit is further configured to: determine a first item of the plurality of moving items with which the gaze location coincides, wherein performing the action with respect to the first user interface element comprises modifying a movement of the first item of the plurality of moving items such that the first item is visible in the user interface.

Example 111: The electronic device of preceding example 110, wherein the first user interface element comprises an autoscrolling list, and the plurality of moving items comprise elements of the autoscrolling list.

Example 112: The electronic device of any of examples 110-111, wherein the first user interface element comprises an image catalog, and the plurality of moving items comprise images in the image catalog.

Example 113: The electronic device of any of examples 110-112, wherein the first user interface element comprises a content bar, and the plurality of moving items comprise representations of content items accessible from the content bar.

Example 114: The electronic device of any of examples 105-113, wherein: the first user interface element comprises content, and performing the action with respect to the first user interface element comprises designating the content in the first user interface element as being read.

Example 115: The electronic device of any of examples 105-114, wherein performing the action with respect to the first user interface element comprises designating the first user interface element as an active user interface element, the electronic device further comprising: a receiving unit configured to receive a first input from an input unit for interacting with an active user interface element, the receiving unit being coupled to the processing unit, wherein the processing unit is further configured to: in response to the first input, interact with the first user interface element in accordance with the first input.

Example 116: The electronic device of preceding example 115, wherein: the user interface further includes a second user interface element, a location of a cursor associated with the input device is coincident with the second user interface element, and designating the first user interface element as the active user interface element comprises ignoring the location of the cursor in designating the first user interface element as the active user interface element.

Example 117: An electronic device, comprising: a receiving unit configured to receive an output from a microphone on a sound-receiving device; and a processing unit coupled to the receiving unit and configured to: generate a first sound for playback on a sound-playback device; determine whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designate a user of the sound-receiving device as being present at the sound-playback device.

Example 118: The electronic device of preceding example 117, wherein designating the user of the sound-receiving device as being present at the sound-playback device comprises determining a user associated with the sound-receiving device, and designating the user as being present at the sound-playback device.

Example 119: The electronic device of any of examples 117-118, further comprising a transmitting unit coupled to the processing unit and the receiving unit, and configured to, prior to the processing unit generating the first sound for playback on the sound-playback device, transmit a wake command to the sound-receiving device for turning on the microphone on the sound-receiving device.

Example 120: The electronic device of any of examples 117-119, wherein the verification criteria include a criterion that is satisfied when a face of the user of the sound-receiving device is recognized at the sound-playback device.

Example 121: The electronic device of any of examples 117-120, wherein the verification criteria include a criterion that is satisfied when the sound-receiving device has sensed motion during a most recent time period.

Example 122: The electronic device of any of examples 117-121, wherein the verification criteria include a criterion that is satisfied when the sound-receiving device resides on a same wireless network as the sound-playback device.

Example 123: The electronic device of any of examples 117-122, wherein the processing unit is further configured to: detect motion of the sound-receiving device; and in accordance with a determination that the motion exceeds a predefined threshold, re-evaluate the plurality of presence criteria to determine whether the sound-receiving device remains at the sound-playback device.

Example 124: The electronic device of any of examples 117-123, wherein: the sound-playback device is configured to transition from a first state to a second state in response to one or more transition criteria being satisfied at the sound-playback device, and the processing unit is further configured to: in accordance with the determination that the plurality of presence criteria are satisfied, forgo transitioning from the first state of the sound-playback device to the second state of the sound-playback device in response to the one or more transition criteria being satisfied at the sound-playback device.

Example 125: An electronic device, comprising: a processing unit configured to: determine whether a person is further than a threshold distance from a display device or closer than the threshold distance from the display device; in accordance with a determination that the person is further than the threshold distance from the display device, provide a first user interface for display on the display device; and in accordance with a determination that the person is closer than the threshold distance from the display device, provide a second user interface for display on the display device, wherein the second user interface is different than the first user interface.

Example 126: The electronic device of preceding example 125, wherein determining whether the person is further than the threshold distance from the display device or closer than the threshold distance from the display device is based on information received from one or more optical sensors, the electronic device further comprising a receiving unit coupled to the processing unit and configured to receive the information from the one or more optical sensors.

Example 127: The electronic device of preceding example 126, wherein the processing unit is further configured to identify a face of the person based on the information received from the one or more optical sensors, wherein determining whether the person is further than the threshold distance from the display device or closer than the threshold distance from the display device is based on a size of the face of the person.

Example 128: The electronic device of any of examples 125-127, wherein the person is determined to be further than the threshold distance from the display device, and the processing unit is further configured to: while the first user interface is displayed on the display device, detect movement of the person to a distance closer than the threshold distance from the display device; and in response to detecting the movement of the person to the distance closer than the threshold distance, provide the second user interface for display on the display device.

Example 129: The electronic device of any of examples 125-127, wherein the person is determined to be closer than the threshold distance from the display device, and the processing unit is further configured to: while the second user interface is displayed on the display device, detect movement of the person to a distance further than the threshold distance from the display device; and in response to detecting the movement of the person to the distance further than the threshold distance, provide the first user interface for display on the display device.

Example 130: The electronic device of any of examples 125-128, wherein: the person is further than the threshold distance from the display device, the first user interface is provided for display on the displace device, the first user interface including a first user interface element and a second user interface element, and the processing unit is further configured to: while the first user interface is displayed on the display device: determine a gaze location in the first user interface, wherein the gaze location comprises a location in the first user interface to which the person's gaze is directed; detect movement of the person to a distance closer than the threshold distance from the display device; and in response to detecting the movement of the person, provide the second user interface for display on the display device, the second user interface including information based on the gaze location.

Example 131: The electronic device of preceding example 130, wherein the processing unit is further configured to: determine whether the gaze location coincides with the first user interface element or the second user interface element in the first user interface, and in response to detecting the movement of the person to the distance closer than the threshold distance from the display device: in accordance with a determination that the gaze location coincides with the first user interface element, provide the second user interface for display on the display device, the second user interface including information associated with the first user interface element, and in accordance with a determination that the gaze location coincides with the second user interface element, provide the second user interface for display on the display device, the second user interface including information associated with the second user interface element.

Example 132: The electronic device of any of examples 125-127 and 129, wherein: the person is closer than the threshold distance from the display device, the person is logged into one or more areas on the electronic device, and the processing unit is further configured to: detect movement of the person to a distance further than the threshold distance from the display device; and in response to detecting the movement of the person to the distance further than the threshold distance from the display device, log out of the one or more areas on the electronic device.

Example 133: The electronic device of any of examples 125-132, wherein the first user interface includes a user interface element at a first size, and the second user interface includes the user interface element at a second size, smaller than the first size.

Example 134: The electronic device of any of examples 125-133, wherein the first user interface includes summary information about a first quantity, and the second user interface includes detailed information about the first quantity.

Example 135: The electronic device of any of examples 125-134, wherein the first user interface includes a first set of user interface elements, and the second user interface includes the first set of user interface elements and a second set of user interface elements.

Example 136: A first device, comprising: a processing unit configured to: play media content on the first device, wherein the media content is included in a user interface for display on a display device; determine whether one or more presence criteria are satisfied, wherein the one or more presence criteria include a criterion that is satisfied while a first person is present at the display device; and in accordance with a determination that the one or more presence criteria are not satisfied, modify the playing of the media content in a first manner.

Example 137: The first device of preceding example 136, wherein the processing unit is further configured to, in accordance with a determination that the one or more presence criteria are satisfied, maintain the playing of the media content in the user interface.

Example 138: The first device of any of examples 136-137, wherein the processing unit is further configured to, in accordance with the determination that the one or more presence criteria are not satisfied, determine a second device associated with the first person, wherein modifying the playing of the media content in the first manner comprises transferring the playing of the media content to the second device, the first device further comprising a transferring unit coupled to the processing unit and configured to transfer the playing of the media content to the second device.

Example 139: The first device of any of examples 136-138, wherein the processing unit is further configured to, in accordance with a determination that the one or more presence criteria are satisfied: determine a relative location of the first person with respect to the display device, and modify the playing of the media content in a second manner based on the relative location of the first person, wherein the second manner is different from the first manner.

Example 140: The first device of any of examples 136-139, wherein the processing unit is further configured to, in accordance with a determination that the one or more presence criteria are satisfied: determine a distance of the first person from the display device, and modify the playing of the media content in a second manner based on the distance of the first person from the display device, wherein the second manner is different from the first manner.

Example 141: The first device of any of examples 136-140, wherein the one or more presence criteria include a criterion that is satisfied when the first person is oriented towards the display device.

Example 142: The first device of any of examples 136-141, wherein the one or more presence criteria include a criterion that is satisfied when the first person's gaze is directed at the display device.

Example 143: The first device of any of examples 136-142, wherein the processing unit is further configured to: while displaying the media content to a single person, detect that two or more people are present at the display device; and in accordance with a determination that two or more people are present at the display device, modify the playing of the media content in a second manner by increasing a visibility of the media content in the user interface.

Example 144: The first device of any of examples 136-142, wherein the processing unit is further configured to: while displaying the media content to a single person, detect that two or more people are present at the display device; and in accordance with a determination that two or more people are present at the display device: determine whether the media content is designated as private media content, and in accordance with a determination that the media content is designated as private media content, modify the playing of the media content in a second manner by reducing a visibility of the media content in the user interface.

Example 145: The first device of preceding example 144, wherein the processing unit is further configured to: in accordance with a determination that the media content is not designated as private media content, modify the playing of the media content in a third manner by increasing the visibility of the media content in the user interface.

Example 146: The first device of any of examples 136-145, wherein the processing unit is further configured to, in accordance with a determination that the one or more presence criteria are satisfied: determine whether a second device is present at the display device with the first person, and whether a specified type of activity is being performed on the second device; and in accordance with a determination that the second device is present at the display device with the first person and that the specified type of activity is being performed on the second device, perform an action on the first device based on the activity being performed on the second device.

Example 147: The first device of any of examples 136-146, wherein determining whether the one or more presence criteria are satisfied is based on information received from one or more optical sensors, the first device further comprising a receiving unit coupled to the processing unit and configured to receive the information from the one or more optical sensors.

Example 148: The first device of any of examples 136-147, wherein: at a first point in time, the one or more presence criteria are not satisfied, and the playing of the media content is modified in the first manner, and the processing unit is further configured to: at a second point in time, after the modification of the playing of the media content in the first manner, determine that the one or more presence criteria are satisfied; and in response to determining that the one or more presence criteria are satisfied, reverse the modification of the playing of the media content in the first manner.

This disclosure further includes subject matter directed to the following examples:

Example 1: A method comprising: at an electronic device with one or more processors and memory: generating a user interface for display on a display device; receiving a first image including a face of a first person; identifying the face of the first person from the first image; and performing an action on the electronic device in accordance with the identification of the face of the first person.

Example 2: The method of preceding example 1, wherein the user interface includes a second image that includes a face of a second person, the face of the second person being different from the face of the first person, the method further comprising: identifying the face of the second person from the second image, wherein performing the action on the electronic device in accordance with the identification of the face of the first person comprises replacing the face of the second person in the second image with the face of the first person in the first image.

Example 3: The method of any of examples 1-2, further comprising: determining an orientation of the face of the first person in the first image with respect to the display device, wherein performing the action on the electronic device in accordance with the identification of the face of the first person comprises aligning the user interface for display on the display device with the orientation of the face of the first person in the first image.

Example 4: The method of preceding example 3, wherein aligning the user interface with the orientation of the face of the first person comprises forgoing aligning the user interface based on an orientation of the device detected by one or more sensors of the device.

Example 5: The method of any of examples 1-4, wherein: the user interface includes a content item being played, and performing the action on the electronic device in accordance with the identification of the face of the first person comprises associating the playing of the content item with the first person.

Example 6: The method of preceding example 5, further comprising: identifying, based on the face of the first person in the first image, a first profile on the electronic device that is associated with the face of the first person, wherein associating the playing of the content item with the first person comprises associating the playing of the content item with the first profile.

Example 7: The method of preceding example 6, wherein associating the playing of the content item with the first profile comprises updating a play count of the content item in the first profile.

Example 8: The method of any of examples 5-7, wherein the first image further includes a face of a second person, the method further comprising: identifying the face of the second person from the first image; identifying, based on the face of the second person in the first image, a second profile on the electronic device that is associated with the face of the second person; and associating the playing of the content item with the second profile.

Example 9: The method of any of examples 5-8, further comprising: receiving a second image including the face of the first person; identifying the face of the first person from the second image; in response to identifying the face of the first person from the second image, continuing to associate the playing of the content item with the first person; receiving a third image including the face of the first person and a face of a second person, wherein the third image was captured after the second image was captured; identifying the face of the first person and the face of the second person from the third image; and in response to identifying the face of the first person and the face of the second person from the third image: continuing to associate the playing of the content item with the first person, and associating the playing of the content item with the second person.

Example 10: The method of any of examples 1-9, wherein: the user interface includes a content item being played, and performing the action on the electronic device in accordance with the identification of the face of the first person comprises making a preliminarily association of the playing of the content item with the first person; and the method further comprises: receiving a second image, wherein the second image is received at least a first time threshold after receiving the first image; and after receiving the second image, determining whether the second image includes the face of the first person: in accordance with a determination that the second image does not include the face of the first person, canceling the preliminary association of the playing of the content item with the first person; and in accordance with a determination that the second image includes the face of the first person, confirming the preliminary association of the playing of the content item with the first person.

Example 11: An electronic device, comprising: one or more processors; memory; and one or more programs, wherein the one or more programs are stored in the memory and configured to be executed by the one or more processors, the one or more programs including instructions for: generating a user interface for display on a display device; receiving a first image including a face of a first person; identifying the face of the first person from the first image; and performing an action on the electronic device in accordance with the identification of the face of the first person.

Example 12: A non-transitory computer readable storage medium storing one or more programs, the one or more programs comprising instructions, which when executed by an electronic device with one or more processors and memory, cause the device to: generate a user interface for display on a display device; receive a first image including a face of a first person; identify the face of the first person from the first image; and perform an action on the electronic device in accordance with the identification of the face of the first person.

Example 13: An electronic device, comprising: one or more processors; memory; means for generating a user interface for display on a display device; means for receiving a first image including a face of a first person; means for identifying the face of the first person from the first image; and means for performing an action on the electronic device in accordance with the identification of the face of the first person.

Example 14: An information processing apparatus for use in an electronic device with one or more processors and memory, comprising: means for generating a user interface for display on a display device; means for receiving a first image including a face of a first person; means for identifying the face of the first person from the first image; and means for performing an action on the electronic device in accordance with the identification of the face of the first person.

Example 15: An electronic device, comprising: one or more processors; memory; and one or more programs, wherein the one or more programs are stored in the memory and configured to be executed by the one or more processors, the one or more programs including instructions for performing any of the methods of examples 1-10.

Example 16: A non-transitory computer readable storage medium storing one or more programs, the one or more programs comprising instructions, which when executed by an electronic device with one or more processors and memory, cause the device to perform any of the methods of examples 1-10.

Example 17: An electronic device, comprising: one or more processors; memory; and means for performing any of the methods of examples 1-10.

Example 18: An information processing apparatus for use in an electronic device with one or more processors and memory, comprising: means for performing any of the method of examples 1-10.

Example 19: A method comprising: at an electronic device with one or more processors and memory: generating a user interface for display on a display device, wherein the user interface includes a first user interface element; determining a gaze location in the user interface, wherein the gaze location comprises a location in the user interface to which a person's gaze is directed; determining whether the gaze location in the user interface coincides with the first user interface element; and in accordance with a determination that the gaze location coincides with the first user interface element, performing an action with respect to the first user interface element.

Example 20: The method of preceding example 19, wherein: the first user interface element comprises a user interface element requesting attention, and performing the action with respect to the first user interface element comprises acknowledging the request for attention in response to determining that the gaze location coincides with the first user interface element.

Example 21: The method of any of examples 19-20, wherein: the user interface further includes a second user interface element, and performing the action with respect to the first user interface element comprises emphasizing the first user interface element relative to the second user interface element.

Example 22: The method of any of examples 19-21, further comprising: determining one or more portions of the display device that are not coincident with the gaze location and the first user interface element, wherein performing the action with respect to the first user interface element comprises adjusting an output of the one or more portions of the display device that are not coincident with the gaze location.

Example 23: The method of any of examples 19-22, wherein performing the action with respect to the first user interface element comprises selecting the first user interface element.

Example 24: The method of any of examples 19-23, wherein the first user interface element comprises a plurality of moving items, the method further comprising: determining a first item of the plurality of moving items with which the gaze location coincides, wherein performing the action with respect to the first user interface element comprises modifying a movement of the first item of the plurality of moving items such that the first item is visible in the user interface.

Example 25: The method of preceding example 24, wherein the first user interface element comprises an autoscrolling list, and the plurality of moving items comprise elements of the autoscrolling list.

Example 26: The method of any of examples 24-25, wherein the first user interface element comprises an image catalog, and the plurality of moving items comprise images in the image catalog.

Example 27: The method of any of examples 24-26, wherein the first user interface element comprises a content bar, and the plurality of moving items comprise representations of content items accessible from the content bar.

Example 28: The method of any of examples 19-27, wherein: the first user interface element comprises content, and performing the action with respect to the first user interface element comprises designating the content in the first user interface element as being read.

Example 29: The method of any of examples 19-28, wherein performing the action with respect to the first user interface element comprises designating the first user interface element as an active user interface element, the method further comprising: receiving a first input from an input device for interacting with an active user interface element; and in response to the first input, interacting with the first user interface element in accordance with the first input.

Example 30: The method of preceding example 29, wherein: the user interface further includes a second user interface element, a location of a cursor associated with the input device is coincident with the second user interface element, and designating the first user interface element as the active user interface element comprises ignoring the location of the cursor in designating the first user interface element as the active user interface element.

Example 31: An electronic device, comprising: one or more processors; memory; and one or more programs, wherein the one or more programs are stored in the memory and configured to be executed by the one or more processors, the one or more programs including instructions for: generating a user interface for display on a display device, wherein the user interface includes a first user interface element; determining a gaze location in the user interface, wherein the gaze location comprises a location in the user interface to which a person's gaze is directed; determining whether the gaze location in the user interface coincides with the first user interface element; and in accordance with a determination that the gaze location coincides with the first user interface element, performing an action with respect to the first user interface element.

Example 32: A non-transitory computer readable storage medium storing one or more programs, the one or more programs comprising instructions, which when executed by an electronic device with one or more processors and memory, cause the device to: generate a user interface for display on a display device, wherein the user interface includes a first user interface element; determine a gaze location in the user interface, wherein the gaze location comprises a location in the user interface to which a person's gaze is directed; determine whether the gaze location in the user interface coincides with the first user interface element; and in accordance with a determination that the gaze location coincides with the first user interface element, perform an action with respect to the first user interface element.

Example 33: An electronic device, comprising: one or more processors; memory; means for generating a user interface for display on a display device, wherein the user interface includes a first user interface element; means for determining a gaze location in the user interface, wherein the gaze location comprises a location in the user interface to which a person's gaze is directed; means for determining whether the gaze location in the user interface coincides with the first user interface element; and means for, in accordance with a determination that the gaze location coincides with the first user interface element, performing an action with respect to the first user interface element.

Example 34: An information processing apparatus for use in an electronic device with one or more processors and memory, comprising: means for generating a user interface for display on a display device, wherein the user interface includes a first user interface element; means for determining a gaze location in the user interface, wherein the gaze location comprises a location in the user interface to which a person's gaze is directed; means for determining whether the gaze location in the user interface coincides with the first user interface element; and means for, in accordance with a determination that the gaze location coincides with the first user interface element, performing an action with respect to the first user interface element.

Example 35: An electronic device, comprising: one or more processors; memory; and one or more programs, wherein the one or more programs are stored in the memory and configured to be executed by the one or more processors, the one or more programs including instructions for performing any of the methods of examples 19-30.

Example 36: A non-transitory computer readable storage medium storing one or more programs, the one or more programs comprising instructions, which when executed by an electronic device with one or more processors and memory, cause the device to perform any of the methods of examples 19-30.

Example 37: An electronic device, comprising: one or more processors; memory; and means for performing any of the methods of examples 19-30.

Example 38: An information processing apparatus for use in an electronic device with one or more processors and memory, comprising: means for performing any of the method of examples 19-30.

Example 39: A method comprising: at an electronic device with one or more processors and memory: generating a first sound for playback on a sound-playback device; receiving an output from a microphone on a sound-receiving device; determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designating a user of the sound-receiving device as being present at the sound-playback device.

Example 40: The method of preceding example 39, wherein designating the user of the sound-receiving device as being present at the sound-playback device comprises determining a user associated with the sound-receiving device, and designating the user as being present at the sound-playback device.

Example 41: The method of any of examples 39-40, further comprising prior to generating the first sound for playback on the sound-playback device, transmitting a wake command to the sound-receiving device for turning on the microphone on the sound-receiving device.

Example 42: The method of any of examples 39-41, wherein the verification criteria include a criterion that is satisfied when a face of the user of the sound-receiving device is recognized at the sound-playback device.

Example 43: The method of any of examples 39-42, wherein the verification criteria include a criterion that is satisfied when the sound-receiving device has sensed motion during a most recent time period.

Example 44: The method of any of examples 39-43, wherein the verification criteria include a criterion that is satisfied when the sound-receiving device resides on a same wireless network as the sound-playback device.

Example 45: The method of any of examples 39-44, further comprising: detecting motion of the sound-receiving device; and in accordance with a determination that the motion exceeds a predefined threshold, re-evaluating the plurality of presence criteria to determine whether the sound-receiving device remains at the sound-playback device.

Example 46: The method of any of examples 39-45, wherein: the sound-playback device is configured to transition from a first state to a second state in response to one or more transition criteria being satisfied at the sound-playback device, the method further comprising: in accordance with the determination that the plurality of presence criteria are satisfied, forgoing transitioning from the first state of the sound-playback device to the second state of the sound-playback device in response to the one or more transition criteria being satisfied at the sound-playback device.

Example 47: An electronic device, comprising: one or more processors; memory; and one or more programs, wherein the one or more programs are stored in the memory and configured to be executed by the one or more processors, the one or more programs including instructions for: generating a first sound for playback on a sound-playback device; receiving an output from a microphone on a sound-receiving device; determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designating a user of the sound-receiving device as being present at the sound-playback device.

Example 48: A non-transitory computer readable storage medium storing one or more programs, the one or more programs comprising instructions, which when executed by an electronic device with one or more processors and memory, cause the device to: generate a first sound for playback on a sound-playback device; receive an output from a microphone on a sound-receiving device; determine whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a resence of the sound-receiving device at the sound-playback device is verified using a quantity other than the first sound; and in accordance with a determination that the plurality of presence criteria are satisfied, designate a user of the sound-receiving device as being present at the sound-playback device.

Example 49: An electronic device, comprising: one or more processors; memory; means for generating a first sound for playback on a sound-playback device; means for receiving an output from a microphone on a sound-receiving device; means for determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and means for, in accordance with a determination that the plurality of presence criteria are satisfied, designating a user of the sound-receiving device as being present at the sound-playback device.

Example 50: An information processing apparatus for use in an electronic device with one or more processors and memory, comprising: means for generating a first sound for playback on a sound-playback device; means for receiving an output from a microphone on a sound-receiving device; means for determining whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and means for, in accordance with a determination that the plurality of presence criteria are satisfied, designating a user of the sound-receiving device as being present at the sound-playback device.

Example 51: An electronic device, comprising: one or more processors; memory; and one or more programs, wherein the one or more programs are stored in the memory and configured to be executed by the one or more processors, the one or more programs including instructions for performing any of the methods of examples 39-46.

Example 52: A non-transitory computer readable storage medium storing one or more programs, the one or more programs comprising instructions, which when executed by an electronic device with one or more processors and memory, cause the device to perform any of the methods of examples 39-46.

Example 53: An electronic device, comprising: one or more processors; memory; and means for performing any of the methods of examples 39-46.

Example 54: An information processing apparatus for use in an electronic device with one or more processors and memory, comprising: means for performing any of the method of examples 39-46.

Example 55: A method comprising: at an electronic device with one or more processors and memory: determining whether a person is further than a threshold distance from a display device or closer than the threshold distance from the display device; in accordance with a determination that the person is further than the threshold distance from the display device, providing a first user interface for display on the display device; and in accordance with a determination that the person is closer than the threshold distance from the display device, providing a second user interface for display on the display device, wherein the second user interface is different than the first user interface.

Example 56: The method of preceding example 55, wherein determining whether the person is further than the threshold distance from the display device or closer than the threshold distance from the display device is based on information received from one or more optical sensors.

Example 57: The method of preceding example 56, further comprising identifying a face of the person based on the information received from the one or more optical sensors, wherein determining whether the person is further than the threshold distance from the display device or closer than the threshold distance from the display device is based on a size of the face of the person.

Example 58: The method of any of examples 55-57, wherein the person is determined to be further than the threshold distance from the display device, the method further comprising: while the first user interface is displayed on the display device, detecting movement of the person to a distance closer than the threshold distance from the display device; and in response to detecting the movement of the person to the distance closer than the threshold distance, providing the second user interface for display on the display device.

Example 59: The method of any of examples 55-57, wherein the person is determined to be closer than the threshold distance from the display device, the method further comprising: while the second user interface is displayed on the display device, detecting movement of the person to a distance further than the threshold distance from the display device; and in response to detecting the movement of the person to the distance further than the threshold distance, providing the first user interface for display on the display device.

Example 60: The method of any of examples 55-58, wherein: the person is further than the threshold distance from the display device, and the first user interface is provided for display on the displace device, the first user interface including a first user interface element and a second user interface element, the method further comprising: while the first user interface is displayed on the display device: determining a gaze location in the first user interface, wherein the gaze location comprises a location in the first user interface to which the person's gaze is directed; detecting movement of the person to a distance closer than the threshold distance from the display device; and in response to detecting the movement of the person, providing the second user interface for display on the display device, the second user interface including information based on the gaze location.

Example 61: The method of preceding example 60, further comprising: determining whether the gaze location coincides with the first user interface element or the second user interface element in the first user interface, wherein in response to detecting the movement of the person to the distance closer than the threshold distance from the display device: in accordance with a determination that the gaze location coincides with the first user interface element, providing the second user interface for display on the display device, the second user interface including information associated with the first user interface element, and in accordance with a determination that the gaze location coincides with the second user interface element, providing the second user interface for display on the display device, the second user interface including information associated with the second user interface element.

Example 62: The method of any of examples 55-57 and 59, wherein: the person is closer than the threshold distance from the display device, and the person is logged into one or more areas on the electronic device, the method further comprising: detecting movement of the person to a distance further than the threshold distance from the display device; and in response to detecting the movement of the person to the distance further than the threshold distance from the display device, logging out of the one or more areas on the electronic device.

Example 63: The method of any of examples 55-62, wherein the first user interface includes a user interface element at a first size, and the second user interface includes the user interface element at a second size, smaller than the first size.

Example 64: The method of any of examples 55-63, wherein the first user interface includes summary information about a first quantity, and the second user interface includes detailed information about the first quantity.

Example 65: The method of any of examples 55-64, wherein the first user interface includes a first set of user interface elements, and the second user interface includes the first set of user interface elements and a second set of user interface elements.

Example 66: An electronic device, comprising: one or more processors; memory; and one or more programs, wherein the one or more programs are stored in the memory and configured to be executed by the one or more processors, the one or more programs including instructions for: determining whether a person is further than a threshold distance from a display device or closer than the threshold distance from the display device; in accordance with a determination that the person is further than the threshold distance from the display device, providing a first user interface for display on the display device; and in accordance with a determination that the person is closer than the threshold distance from the display device, providing a second user interface for display on the display device, wherein the second user interface is different than the first user interface.

Example 67: A non-transitory computer readable storage medium storing one or more programs, the one or more programs comprising instructions, which when executed by an electronic device with one or more processors and memory, cause the device to: determine whether a person is further than a threshold distance from a display device or closer than the threshold distance from the display device; in accordance with a determination that the person is further than the threshold distance from the display device, provide a first user interface for display on the display device; and in accordance with a determination that the person is closer than the threshold distance from the display device, provide a second user interface for display on the display device, wherein the second user interface is different than the first user interface.

Example 68: An electronic device, comprising: one or more processors; memory; means for determining whether a person is further than a threshold distance from a display device or closer than the threshold distance from the display device; means for, in accordance with a determination that the person is further than the threshold distance from the display device, providing a first user interface for display on the display device; and means for, in accordance with a determination that the person is closer than the threshold distance from the display device, providing a second user interface for display on the display device, wherein the second user interface is different than the first user interface.

Example 69: An information processing apparatus for use in an electronic device with one or more processors and memory, comprising: means for determining whether a person is further than a threshold distance from a display device or closer than the threshold distance from the display device; means for, in accordance with a determination that the person is further than the threshold distance from the display device, providing a first user interface for display on the display device; and means for, in accordance with a determination that the person is closer than the threshold distance from the display device, providing a second user interface for display on the display device, wherein the second user interface is different than the first user interface.

Example 70: An electronic device, comprising: one or more processors; memory; and one or more programs, wherein the one or more programs are stored in the memory and configured to be executed by the one or more processors, the one or more programs including instructions for performing any of the methods of examples 55-65.

Example 71: A non-transitory computer readable storage medium storing one or more programs, the one or more programs comprising instructions, which when executed by an electronic device with one or more processors and memory, cause the device to perform any of the methods of examples 55-65.

Example 72: An electronic device, comprising: one or more processors; memory; and means for performing any of the methods of examples 55-65.

Example 73: An information processing apparatus for use in an electronic device with one or more processors and memory, comprising: means for performing any of the method of examples 55-65.

Example 74: A method comprising: at a first device with one or more processors and memory: playing media content on the first device, wherein the media content is included in a user interface for display on a display device; determining whether one or more presence criteria are satisfied, wherein the one or more presence criteria include a criterion that is satisfied while a first person is present at the display device; and in accordance with a determination that the one or more presence criteria are not satisfied, modifying the playing of the media content in a first manner.

Example 75: The method of preceding example 74, further comprising in accordance with a determination that the one or more presence criteria are satisfied, maintaining the playing of the media content in the user interface.

Example 76: The method of any of examples 74-75, further comprising: in accordance with the determination that the one or more presence criteria are not satisfied, determining a second device associated with the first person, wherein modifying the playing of the media content in the first manner comprises transferring the playing of the media content to the second device.

Example 77: The method of any of examples 74-76, further comprising in accordance with a determination that the one or more presence criteria are satisfied: determining a relative location of the first person with respect to the display device, and modifying the playing of the media content in a second manner based on the relative location of the first person, wherein the second manner is different from the first manner.

Example 78: The method of any of examples 74-77, further comprising in accordance with a determination that the one or more presence criteria are satisfied: determining a distance of the first person from the display device, and modifying the playing of the media content in a second manner based on the distance of the first person from the display device, wherein the second manner is different from the first manner.

Example 79: The method of any of examples 74-78, wherein the one or more presence criteria include a criterion that is satisfied when the first person is oriented towards the display device.

Example 80: The method of any of examples 74-79, wherein the one or more presence criteria include a criterion that is satisfied when the first person's gaze is directed at the display device.

Example 81: The method of any of examples 74-80, further comprising: while displaying the media content to a single person, detecting that two or more people are present at the display device; and in accordance with a determination that two or more people are present at the display device, modifying the playing of the media content in a second manner by increasing a visibility of the media content in the user interface.

Example 82: The method of any of examples 74-80, further comprising: while displaying the media content to a single person, detecting that two or more people are present at the display device; and in accordance with a determination that two or more people are present at the display device: determining whether the media content is designated as private media content, and in accordance with a determination that the media content is designated as private media content, modifying the playing of the media content in a second manner by reducing a visibility of the media content in the user interface.

Example 83: The method of preceding example 82, further comprising: in accordance with a determination that the media content is not designated as private media content, modifying the playing of the media content in a third manner by increasing the visibility of the media content in the user interface.

Example 84: The method of any of examples 74-83, further comprising in accordance with a determination that the one or more presence criteria are satisfied: determining whether a second device is present at the display device with the first person, and whether a specified type of activity is being performed on the second device; and in accordance with a determination that the second device is present at the display device with the first person and that the specified type of activity is being performed on the second device, performing an action on the first device based on the activity being performed on the second device.

Example 85: The method of any of examples 74-84, wherein determining whether the one or more presence criteria are satisfied is based on information received from one or more optical sensors.

Example 86: The method of any of examples 74-85, wherein: at a first point in time, the one or more presence criteria are not satisfied, and the playing of the media content is modified in the first manner, the method further comprising: at a second point in time, after the modification of the playing of the media content in the first manner, determining that the one or more presence criteria are satisfied; and in response to determining that the one or more presence criteria are satisfied, reversing the modification of the playing of the media content in the first manner.

Example 87: A first electronic device, comprising: one or more processors; memory; and one or more programs, wherein the one or more programs are stored in the memory and configured to be executed by the one or more processors, the one or more programs including instructions for: playing media content on the first device, wherein the media content is included in a user interface for display on a display device; determining whether one or more presence criteria are satisfied, wherein the one or more presence criteria include a criterion that is satisfied while a first person is present at the display device; and in accordance with a determination that the one or more presence criteria are not satisfied, modifying the playing of the media content in a first manner.

Example 88: A non-transitory computer readable storage medium storing one or more programs, the one or more programs comprising instructions, which when executed by a first electronic device with one or more processors and memory, cause the first device to: play media content on the first device, wherein the media content is included in a user interface for display on a display device; determine whether one or more presence criteria are satisfied, wherein the one or more presence criteria include a criterion that is satisfied while a first person is present at the display device; and in accordance with a determination that the one or more presence criteria are not satisfied, modify the playing of the media content in a first manner.

Example 89: A first electronic device, comprising: one or more processors; memory; means for playing media content on the first device, wherein the media content is included in a user interface for display on a display device; means for determining whether one or more presence criteria are satisfied, wherein the one or more presence criteria include a criterion that is satisfied while a first person is present at the display device; and means for, in accordance with a determination that the one or more presence criteria are not satisfied, modifying the playing of the media content in a first manner.

Example 90: An information processing apparatus for use in a first electronic device with one or more processors and memory, comprising: means for playing media content on the first device, wherein the media content is included in a user interface for display on a display device; means for determining whether one or more presence criteria are satisfied, wherein the one or more presence criteria include a criterion that is satisfied while a first person is present at the display device; and means for, in accordance with a determination that the one or more presence criteria are not satisfied, modifying the playing of the media content in a first manner.

Example 91: An electronic device, comprising: one or more processors; memory; and one or more programs, wherein the one or more programs are stored in the memory and configured to be executed by the one or more processors, the one or more programs including instructions for performing any of the methods of examples 74-86.

Example 92: A non-transitory computer readable storage medium storing one or more programs, the one or more programs comprising instructions, which when executed by an electronic device with one or more processors and memory, cause the device to perform any of the methods of examples 74-86.

Example 93: An electronic device, comprising: one or more processors; memory; and means for performing any of the methods of examples 74-86.

Example 94: An information processing apparatus for use in an electronic device with one or more processors and memory, comprising: means for performing any of the method of examples 74-86.

Example 95: An electronic device, comprising: a receiving unit configured to receive a first image including a face of a first person; and a processing unit coupled to the receiving unit, the processing unit configured to: generate a user interface for display on a display device; identify the face of the first person from the first image; and perform an action on the electronic device in accordance with the identification of the face of the first person.

Example 96: The electronic device of preceding example 95, wherein the user interface includes a second image that includes a face of a second person, the face of the second person being different from the face of the first person, and the processing unit is further configured to: identify the face of the second person from the second image, wherein performing the action on the electronic device in accordance with the identification of the face of the first person comprises replacing the face of the second person in the second image with the face of the first person in the first image.

Example 97: The electronic device of any of examples 95-96, wherein the processing unit is further configured to: determine an orientation of the face of the first person in the first image with respect to the display device, wherein performing the action on the electronic device in accordance with the identification of the face of the first person comprises aligning the user interface for display on the display device with the orientation of the face of the first person in the first image.

Example 98: The electronic device of preceding example 97, wherein aligning the user interface with the orientation of the face of the first person comprises forgoing aligning the user interface based on an orientation of the device detected by one or more sensor units of the device, the sensor units being coupled to the processing unit and the receiving unit.

Example 99: The electronic device of any of examples 95-98, wherein: the user interface includes a content item being played, and performing the action on the electronic device in accordance with the identification of the face of the first person comprises associating the playing of the content item with the first person.

Example 100: The electronic device of preceding example 99, wherein the processing unit is further configured to: identify, based on the face of the first person in the first image, a first profile on the electronic device that is associated with the face of the first person, wherein associating the playing of the content item with the first person comprises associating the playing of the content item with the first profile.

Example 101: The electronic device of preceding example 100, wherein associating the playing of the content item with the first profile comprises updating a play count of the content item in the first profile.

Example 102: The electronic device of any of examples 99-101, wherein the first image further includes a face of a second person, and the processing unit is further configured to: identify the face of the second person from the first image; identify, based on the face of the second person in the first image, a second profile on the electronic device that is associated with the face of the second person; and associate the playing of the content item with the second profile.

Example 103: The electronic device of any of examples 99-102, wherein: the receiving unit is further configured to receive a second image including the face of the first person, and receive a third image including the face of the first person and a face of a second person, wherein the third image is captured after the second image was captured, and the processing unit is further configured to: identify the face of the first person from the second image; in response to identifying the face of the first person from the second image, continue to associate the playing of the content item with the first person; identify the face of the first person and the face of the second person from the third image; and in response to identifying the face of the first person and the face of the second person from the third image: continue to associate the playing of the content item with the first person, and associate the playing of the content item with the second person.

Example 104: The electronic device of any of examples 95-103, wherein: the user interface includes a content item being played, performing the action on the electronic device in accordance with the identification of the face of the first person comprises making a preliminarily association of the playing of the content item with the first person, the receiving unit is further configured to receive a second image, wherein the second image is received at least a first time threshold after receiving the first image, and the processing unit is further configured to: after receiving the second image, determine whether the second image includes the face of the first person: in accordance with a determination that the second image does not include the face of the first person, cancel the preliminary association of the playing of the content item with the first person; and in accordance with a determination that the second image includes the face of the first person, confirm the preliminary association of the playing of the content item with the first person.

Example 105: An electronic device, comprising: a processing unit configured to: generate a user interface for display on a display device, wherein the user interface includes a first user interface element; determine a gaze location in the user interface, wherein the gaze location comprises a location in the user interface to which a person's gaze is directed; determine whether the gaze location in the user interface coincides with the first user interface element; and in accordance with a determination that the gaze location coincides with the first user interface element, perform an action with respect to the first user interface element.

Example 106: The electronic device of preceding example 105, wherein: the first user interface element comprises a user interface element requesting attention, and performing the action with respect to the first user interface element comprises acknowledging the request for attention in response to determining that the gaze location coincides with the first user interface element.

Example 107: The electronic device of any of examples 105-106, wherein: the user interface further includes a second user interface element, and performing the action with respect to the first user interface element comprises emphasizing the first user interface element relative to the second user interface element.

Example 108: The electronic device of any of examples 105-107, wherein the processing unit is further configured to: determine one or more portions of the display device that are not coincident with the gaze location and the first user interface element, wherein performing the action with respect to the first user interface element comprises adjusting an output of the one or more portions of the display device that are not coincident with the gaze location.

Example 109: The electronic device of any of examples 105-108, wherein performing the action with respect to the first user interface element comprises selecting the first user interface element.

Example 110: The electronic device of any of examples 105-109, wherein the first user interface element comprises a plurality of moving items, and the processing unit is further configured to: determine a first item of the plurality of moving items with which the gaze location coincides, wherein performing the action with respect to the first user interface element comprises modifying a movement of the first item of the plurality of moving items such that the first item is visible in the user interface.

Example 111: The electronic device of preceding example 110, wherein the first user interface element comprises an autoscrolling list, and the plurality of moving items comprise elements of the autoscrolling list.

Example 112: The electronic device of any of examples 110-111, wherein the first user interface element comprises an image catalog, and the plurality of moving items comprise images in the image catalog.

Example 113: The electronic device of any of examples 110-112, wherein the first user interface element comprises a content bar, and the plurality of moving items comprise representations of content items accessible from the content bar.

Example 114: The electronic device of any of examples 105-113, wherein: the first user interface element comprises content, and performing the action with respect to the first user interface element comprises designating the content in the first user interface element as being read.

Example 115: The electronic device of any of examples 105-114, wherein performing the action with respect to the first user interface element comprises designating the first user interface element as an active user interface element, the electronic device further comprising: a receiving unit configured to receive a first input from an input unit for interacting with an active user interface element, the receiving unit being coupled to the processing unit, wherein the processing unit is further configured to: in response to the first input, interact with the first user interface element in accordance with the first input.

Example 116: The electronic device of preceding example 115, wherein: the user interface further includes a second user interface element, a location of a cursor associated with the input device is coincident with the second user interface element, and designating the first user interface element as the active user interface element comprises ignoring the location of the cursor in designating the first user interface element as the active user interface element.

Example 117: An electronic device, comprising: a receiving unit configured to receive an output from a microphone on a sound-receiving device; and a processing unit coupled to the receiving unit and configured to: generate a first sound for playback on a sound-playback device; determine whether the sound-receiving device is present at the sound-playback device based on a plurality of presence criteria, including: sound-detection criteria that is satisfied when the output from the microphone on the sound-receiving device corresponds to the first sound for playback on the sound-playback device; and verification criteria that is satisfied when a presence of the sound-receiving device at the sound-playback device is verified using a quantity other than the first sound; and in accordance with a determination that the plurality of presence criteria are satisfied, designate a user of the sound-receiving device as being present at the sound-playback device.

Example 118: The electronic device of preceding example 117, wherein designating the user of the sound-receiving device as being present at the sound-playback device comprises determining a user associated with the sound-receiving device, and designating the user as being present at the sound-playback device.

Example 119: The electronic device of any of examples 117-118, further comprising a transmitting unit coupled to the processing unit and the receiving unit, and configured to, prior to the processing unit generating the first sound for playback on the sound-playback device, transmit a wake command to the sound-receiving device for turning on the microphone on the sound-receiving device.

Example 120: The electronic device of any of examples 117-119, wherein the verification criteria include a criterion that is satisfied when a face of the user of the sound-receiving device is recognized at the sound-playback device.

Example 121: The electronic device of any of examples 117-120, wherein the verification criteria include a criterion that is satisfied when the sound-receiving device has sensed motion during a most recent time period.

Example 122: The electronic device of any of examples 117-121, wherein the verification criteria include a criterion that is satisfied when the sound-receiving device resides on a same wireless network as the sound-playback device.

Example 123: The electronic device of any of examples 117-122, wherein the processing unit is further configured to: detect motion of the sound-receiving device; and in accordance with a determination that the motion exceeds a predefined threshold, re-evaluate the plurality of presence criteria to determine whether the sound-receiving device remains at the sound-playback device.

Example 124: The electronic device of any of examples 117-123, wherein: the sound-playback device is configured to transition from a first state to a second state in response to one or more transition criteria being satisfied at the sound-playback device, and the processing unit is further configured to: in accordance with the determination that the plurality of presence criteria are satisfied, forgo transitioning from the first state of the sound-playback device to the second state of the sound-playback device in response to the one or more transition criteria being satisfied at the sound-playback device.

Example 125: An electronic device, comprising: a processing unit configured to: determine whether a person is further than a threshold distance from a display device or closer than the threshold distance from the display device; in accordance with a determination that the person is further than the threshold distance from the display device, provide a first user interface for display on the display device; and in accordance with a determination that the person is closer than the threshold distance from the display device, provide a second user interface for display on the display device, wherein the second user interface is different than the first user interface.

Example 126: The electronic device of preceding example 125, wherein determining whether the person is further than the threshold distance from the display device or closer than the threshold distance from the display device is based on information received from one or more optical sensors, the electronic device further comprising a receiving unit coupled to the processing unit and configured to receive the information from the one or more optical sensors.

Example 127: The electronic device of preceding example 126, wherein the processing unit is further configured to identify a face of the person based on the information received from the one or more optical sensors, wherein determining whether the person is further than the threshold distance from the display device or closer than the threshold distance from the display device is based on a size of the face of the person.

Example 128: The electronic device of any of examples 125-127, wherein the person is determined to be further than the threshold distance from the display device, and the processing unit is further configured to: while the first user interface is displayed on the display device, detect movement of the person to a distance closer than the threshold distance from the display device; and in response to detecting the movement of the person to the distance closer than the threshold distance, provide the second user interface for display on the display device.

Example 129: The electronic device of any of examples 125-127, wherein the person is determined to be closer than the threshold distance from the display device, and the processing unit is further configured to: while the second user interface is displayed on the display device, detect movement of the person to a distance further than the threshold distance from the display device; and in response to detecting the movement of the person to the distance further than the threshold distance, provide the first user interface for display on the display device.

Example 130: The electronic device of any of examples 125-128, wherein: the person is further than the threshold distance from the display device, the first user interface is provided for display on the displace device, the first user interface including a first user interface element and a second user interface element, and the processing unit is further configured to: while the first user interface is displayed on the display device: determine a gaze location in the first user interface, wherein the gaze location comprises a location in the first user interface to which the person's gaze is directed; detect movement of the person to a distance closer than the threshold distance from the display device; and in response to detecting the movement of the person, provide the second user interface for display on the display device, the second user interface including information based on the gaze location.

Example 131: The electronic device of preceding example 130, wherein the processing unit is further configured to: determine whether the gaze location coincides with the first user interface element or the second user interface element in the first user interface, and in response to detecting the movement of the person to the distance closer than the threshold distance from the display device: in accordance with a determination that the gaze location coincides with the first user interface element, provide the second user interface for display on the display device, the second user interface including information associated with the first user interface element, and in accordance with a determination that the gaze location coincides with the second user interface element, provide the second user interface for display on the display device, the second user interface including information associated with the second user interface element.

Example 132: The electronic device of any of examples 125-127 and 129, wherein: the person is closer than the threshold distance from the display device, the person is logged into one or more areas on the electronic device, and the processing unit is further configured to: detect movement of the person to a distance further than the threshold distance from the display device; and in response to detecting the movement of the person to the distance further than the threshold distance from the display device, log out of the one or more areas on the electronic device.

Example 133: The electronic device of any of examples 125-132, wherein the first user interface includes a user interface element at a first size, and the second user interface includes the user interface element at a second size, smaller than the first size.

Example 134: The electronic device of any of examples 125-133, wherein the first user interface includes summary information about a first quantity, and the second user interface includes detailed information about the first quantity.

Example 135: The electronic device of any of examples 125-134, wherein the first user interface includes a first set of user interface elements, and the second user interface includes the first set of user interface elements and a second set of user interface elements.

Example 136: A first device, comprising: a processing unit configured to: play media content on the first device, wherein the media content is included in a user interface for display on a display device; determine whether one or more presence criteria are satisfied, wherein the one or more presence criteria include a criterion that is satisfied while a first person is present at the display device; and in accordance with a determination that the one or more presence criteria are not satisfied, modify the playing of the media content in a first manner.

Example 137: The first device of preceding example 136, wherein the processing unit is further configured to, in accordance with a determination that the one or more presence criteria are satisfied, maintain the playing of the media content in the user interface.

Example 138: The first device of any of examples 136-137, wherein the processing unit is further configured to, in accordance with the determination that the one or more presence criteria are not satisfied, determine a second device associated with the first person, wherein modifying the playing of the media content in the first manner comprises transferring the playing of the media content to the second device, the first device further comprising a transferring unit coupled to the processing unit and configured to transfer the playing of the media content to the second device.

Example 139: The first device of any of examples 136-138, wherein the processing unit is further configured to, in accordance with a determination that the one or more presence criteria are satisfied: determine a relative location of the first person with respect to the display device, and modify the playing of the media content in a second manner based on the relative location of the first person, wherein the second manner is different from the first manner.

Example 140: The first device of any of examples 136-139, wherein the processing unit is further configured to, in accordance with a determination that the one or more presence criteria are satisfied: determine a distance of the first person from the display device, and modify the playing of the media content in a second manner based on the distance of the first person from the display device, wherein the second manner is different from the first manner.

Example 141: The first device of any of examples 136-140, wherein the one or more presence criteria include a criterion that is satisfied when the first person is oriented towards the display device.

Example 142: The first device of any of examples 136-141, wherein the one or more presence criteria include a criterion that is satisfied when the first person's gaze is directed at the display device.

Example 143: The first device of any of examples 136-142, wherein the processing unit is further configured to: while displaying the media content to a single person, detect that two or more people are present at the display device; and in accordance with a determination that two or more people are present at the display device, modify the playing of the media content in a second manner by increasing a visibility of the media content in the user interface.

Example 144: The first device of any of examples 136-142, wherein the processing unit is further configured to: while displaying the media content to a single person, detect that two or more people are present at the display device; and in accordance with a determination that two or more people are present at the display device: determine whether the media content is designated as private media content, and in accordance with a determination that the media content is designated as private media content, modify the playing of the media content in a second manner by reducing a visibility of the media content in the user interface.

Example 145: The first device of preceding example 144, wherein the processing unit is further configured to: in accordance with a determination that the media content is not designated as private media content, modify the playing of the media content in a third manner by increasing the visibility of the media content in the user interface.

Example 146: The first device of any of examples 136-145, wherein the processing unit is further configured to, in accordance with a determination that the one or more presence criteria are satisfied: determine whether a second device is present at the display device with the first person, and whether a specified type of activity is being performed on the second device; and in accordance with a determination that the second device is present at the display device with the first person and that the specified type of activity is being performed on the second device, perform an action on the first device based on the activity being performed on the second device.

Example 147: The first device of any of examples 136-146, wherein determining whether the one or more presence criteria are satisfied is based on information received from one or more optical sensors, the first device further comprising a receiving unit coupled to the processing unit and configured to receive the information from the one or more optical sensors.

Example 148: The first device of any of examples 136-147, wherein: at a first point in time, the one or more presence criteria are not satisfied, and the playing of the media content is modified in the first manner, and the processing unit is further configured to: at a second point in time, after the modification of the playing of the media content in the first manner, determine that the one or more presence criteria are satisfied; and in response to determining that the one or more presence criteria are satisfied, reverse the modification of the playing of the media content in the first manner.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with one or more processors and memory:
generating a user interface for display on a display device, wherein the user interface includes a content item being played; and
while displaying the user interface via the display device:
in accordance with a determination that a face of a first person is detected at the electronic device, performing an action on the electronic device in accordance with the detection of the face of the first person, including associating the playing of the content item with the first person;
receiving a second image, wherein the second image is received at least a first time threshold after receiving a first image; and
after receiving the second image, determining whether the second image includes the face of the first person:
in accordance with a determination that the second image does not include the face of the first person, canceling the association of the playing of the content item with the first person; and
in accordance with a determination that the second image includes the face of the first person, confirming the association of the playing of the content item with the first person.

2. The method of claim 1, wherein the user interface includes a second image that includes a face of a second person, the face of the second person being different from the face of the first person, the method further comprising:
identifying the face of the second person from the second image, wherein performing the action on the electronic device in accordance with the identification of the face of the first person comprises replacing the face of the second person in the second image with the face of the first person.

3. The method of claim 1, further comprising:
identifying, based on the face of the first person, a first profile on the electronic device that is associated with the face of the first person, wherein associating the playing of the content item with the first person comprises associating the playing of the content item with the first profile.

4. The method of claim 3, wherein associating the playing of the content item with the first profile comprises updating a play count of the content item in the first profile.

5. The method of claim 1, wherein a first image received by the electronic device includes a face of a second person, the method further comprising:
identifying the face of the second person from the first image;
identifying, based on the face of the second person in the first image, a second profile on the electronic device that is associated with the face of the second person; and
associating the playing of the content item with the second profile.

6. The method of claim 1, further comprising:
receiving a second image including the face of the first person;
identifying the face of the first person from the second image;
in response to identifying the face of the first person from the second image, continuing to associate the playing of the content item with the first person;
receiving a third image including the face of the first person and a face of a second person, wherein the third image was captured after the second image was captured;
identifying the face of the first person and the face of the second person from the third image; and
in response to identifying the face of the first person and the face of the second person from the third image:
continuing to associate the playing of the content item with the first person, and associating the playing of the content item with the second person.

7. The method of claim 1, further comprising:
determining an orientation of the face of the first person in with respect to the display device, wherein performing the action on the electronic device in accordance with the detection of the face of the first person comprises aligning the user interface for display on the display device with the orientation of the face of the first person in the first image.

8. The method of claim 7, wherein aligning the user interface with the orientation of the face of the first person comprises forgoing aligning the user interface based on an orientation of the electronic device detected by one or more sensors of the electronic device.

9. The method of claim 7, wherein aligning the user interface with the orientation of the face of the first person includes aligning a top of a user interface element with a top of the face of the first person, and aligning a bottom of the user interface element with a bottom of the face of the first person.

10. The method of claim 7, wherein when determining the orientation of the face of the first person with respect to the display device, a user interface element has a first orientation relative to the display device, and aligning the user interface for display on the display device with the orientation of the face of the first person includes rotating the user interface element.

11. The method of claim 7, wherein aligning the user interface with the orientation of the face of the first person comprises, in accordance with a determination that a first edge of the electronic device is oriented downward with respect to gravity:
   in accordance with a determination that the face of the first person is aligned with a second edge, different from the first edge, of the electronic device, displaying the user interface as aligned with the second edge of the electronic device; and
   in accordance with a determination that the face of the first person is not detected, displaying the user interface as aligned with the first edge of the electronic device.

12. An electronic device, comprising:
   one or more processors;
   memory; and
   one or more programs, wherein the one or more programs are stored in the memory and configured to be executed by the one or more processors, the one or more programs including instructions for:
      generating a user interface for display on a display device, wherein the user interface includes a content item being played; and
      while displaying the user interface via the display device:
         in accordance with a determination that a face of a first person is detected at the electronic device, performing an action on the electronic device in accordance with the detection of the face of the first person, including associating the playing of the content item with the first person;
         receiving a second image, wherein the second image is received at least a first time threshold after receiving a first image; and
         after receiving the second image, determining whether the second image includes the face of the first person:
            in accordance with a determination that the second image does not include the face of the first person, canceling the association of the playing of the content item with the first person; and
            in accordance with a determination that the second image includes the face of the first person, confirming the association of the playing of the content item with the first person.

13. A non-transitory computer readable storage medium storing one or more programs, the one or more programs comprising instructions, which when executed by an electronic device with one or more processors and memory, cause the electronic device to:
   generate a user interface for display on a display device, wherein the user interface includes a content item being played; and
   while displaying the user interface via the display device:
      in accordance with a determination that a face of a first person is detected at the electronic device, perform an action on the electronic device in accordance with the detection of the face of the first person, including associating the playing of the content item with the first person;
   receive a second image, wherein the second image is received at least a first time threshold after receiving a first image; and
   after receiving the second image, determining whether the second image includes the face of the first person:
      in accordance with a determination that the second image does not include the face of the first person, canceling the association of the playing of the content item with the first person; and
      in accordance with a determination that the second image includes the face of the first person, confirming the association of the playing of the content item with the first person.

* * * * *